(12) United States Patent
Yasui et al.

(10) Patent No.: US 7,568,454 B2
(45) Date of Patent: Aug. 4, 2009

(54) INTAKE AIR AMOUNT CONTROL SYSTEM FOR INTERNAL COMBUSTION ENGINE

(75) Inventors: Yuji Yasui, Saitama-ken (JP); Noriaki Fujii, Saitama-ken (JP); Hisao Sakai, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 10/574,804

(22) PCT Filed: Oct. 13, 2004

(86) PCT No.: PCT/JP2004/015065

§ 371 (c)(1),
(2), (4) Date: Apr. 5, 2006

(87) PCT Pub. No.: WO2005/038221

PCT Pub. Date: Apr. 28, 2005

(65) Prior Publication Data

US 2007/0131186 A1 Jun. 14, 2007

(30) Foreign Application Priority Data

Oct. 20, 2003 (JP) .............................. 2003-359810

(51) Int. Cl.
F01L 1/34 (2006.01)
(52) U.S. Cl. .................. 123/90.15; 123/90.16; 123/346; 123/404
(58) Field of Classification Search .............. 123/90.15, 123/90.16, 90.17, 90.18, 90.39, 90.44, 345, 123/346, 347, 348, 399, 403, 404, 405, 319, 123/321, 322; 464/1, 2, 160; 701/103, 105, 701/110
See application file for complete search history.

(56) References Cited

U.S. PATENT DOCUMENTS

| 7,121,238 | B2 * | 10/2006 | Minami et al. | ........... 123/90.15 |
| 7,210,450 | B2 * | 5/2007 | Arinaga et al. | ......... 123/339.19 |
| 7,331,317 | B2 * | 2/2008 | Yasui et al. | .............. 123/90.15 |
| 2003/0075128 | A1 | 4/2003 | Shimizu et al. | |

FOREIGN PATENT DOCUMENTS

EP 1 063 407 A1 12/2000

(Continued)

Primary Examiner—Ching Chang
(74) Attorney, Agent, or Firm—Arent Fox LLP

(57) ABSTRACT

There is provided an intake air amount control system for an internal combustion engine, which controls the amount of intake air by executing both cam phase control and valve lift control, and is capable of enhancing response and accuracy of the intake air amount control, while avoiding interaction between the cam phase control and the valve lift control. In the intake air amount control system 1, an ECU 2 controls the amount of intake air according to a target valve lift Liftin_cmd and a target cam phase Cain_cmd. The Liftin_cmd and Cain_cmd are respectively calculated as the sums of master values Liftin_cmd_ms and Cain_cmd_ms for causing an actual intake air amount Gcyl to converge to a target intake air amount Gcyl_cmd, and slave values Liftin_cmd_sl and Cain_cmd_sl set according to the master values Liftin_cmd_ms and Cain_cmd_ms (steps 56 and 64). In a lift master mode, Cain_cmd_ms is set such that Cain_cmd_ms=0 holds (step 63), and in a phase master mode, Liftin_cmd_ms is set such that Liftin_cmd_ms=0 holds (step 55).

12 Claims, 45 Drawing Sheets

FOREIGN PATENT DOCUMENTS

| | | |
|---|---|---|
| EP | 1 234 958 A2 | 8/2002 |
| EP | 1 234 967 A2 | 8/2002 |
| JP | 2002-285871 A | 10/2002 |
| JP | 2003-21001 A | 1/2003 |
| JP | 2003-041954 | 2/2003 |
| JP | 2003-65135 A | 3/2003 |
| JP | 2003-129871 A | 5/2003 |
| JP | 2003-184589 | 7/2003 |
| JP | 2003-241803 A | 8/2003 |

\* cited by examiner

FIG. 6
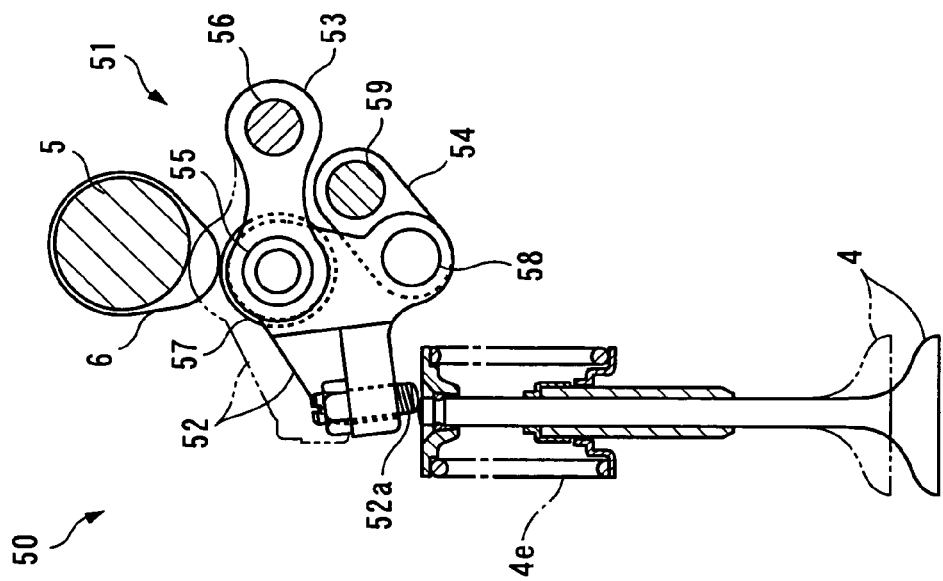
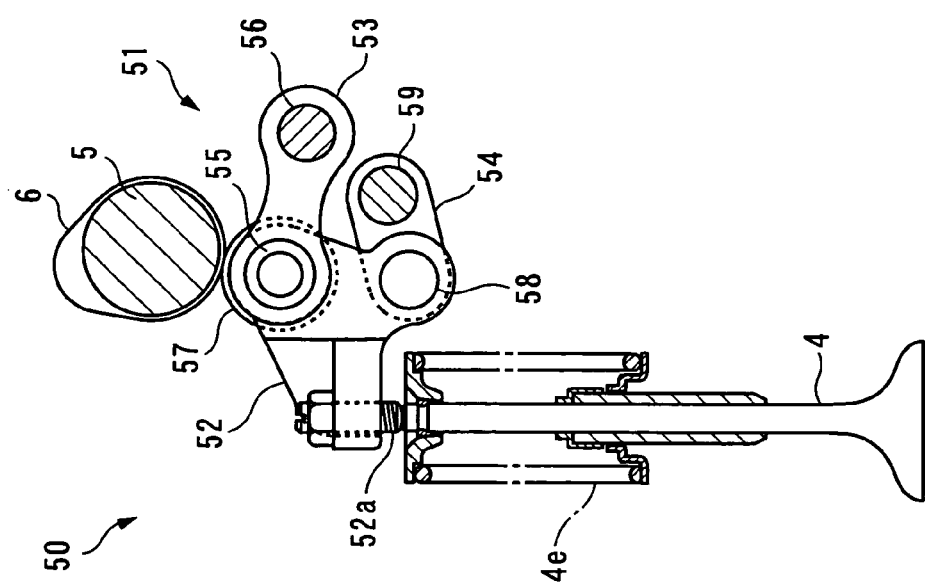

F I G. 7
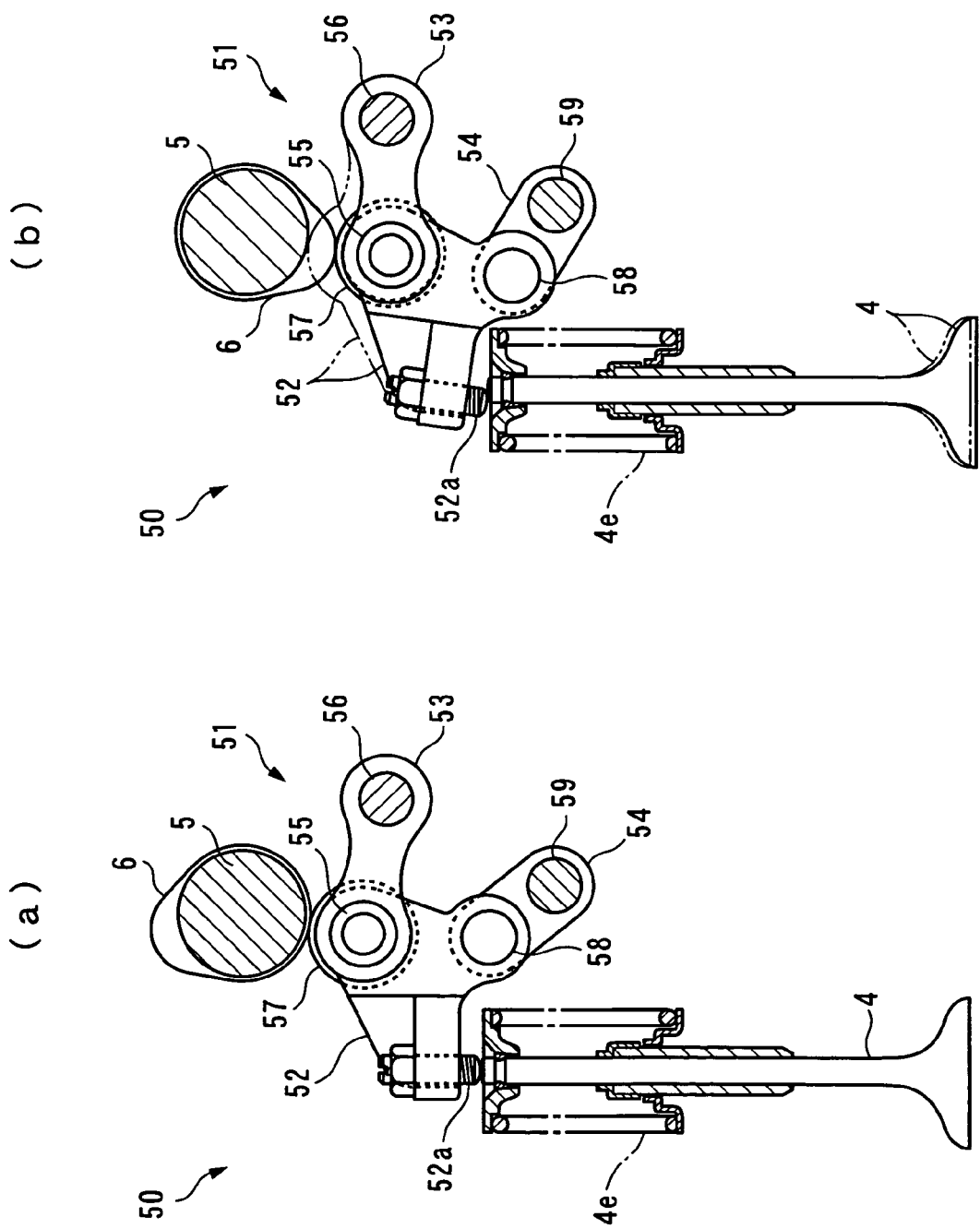

F I G. 1 5
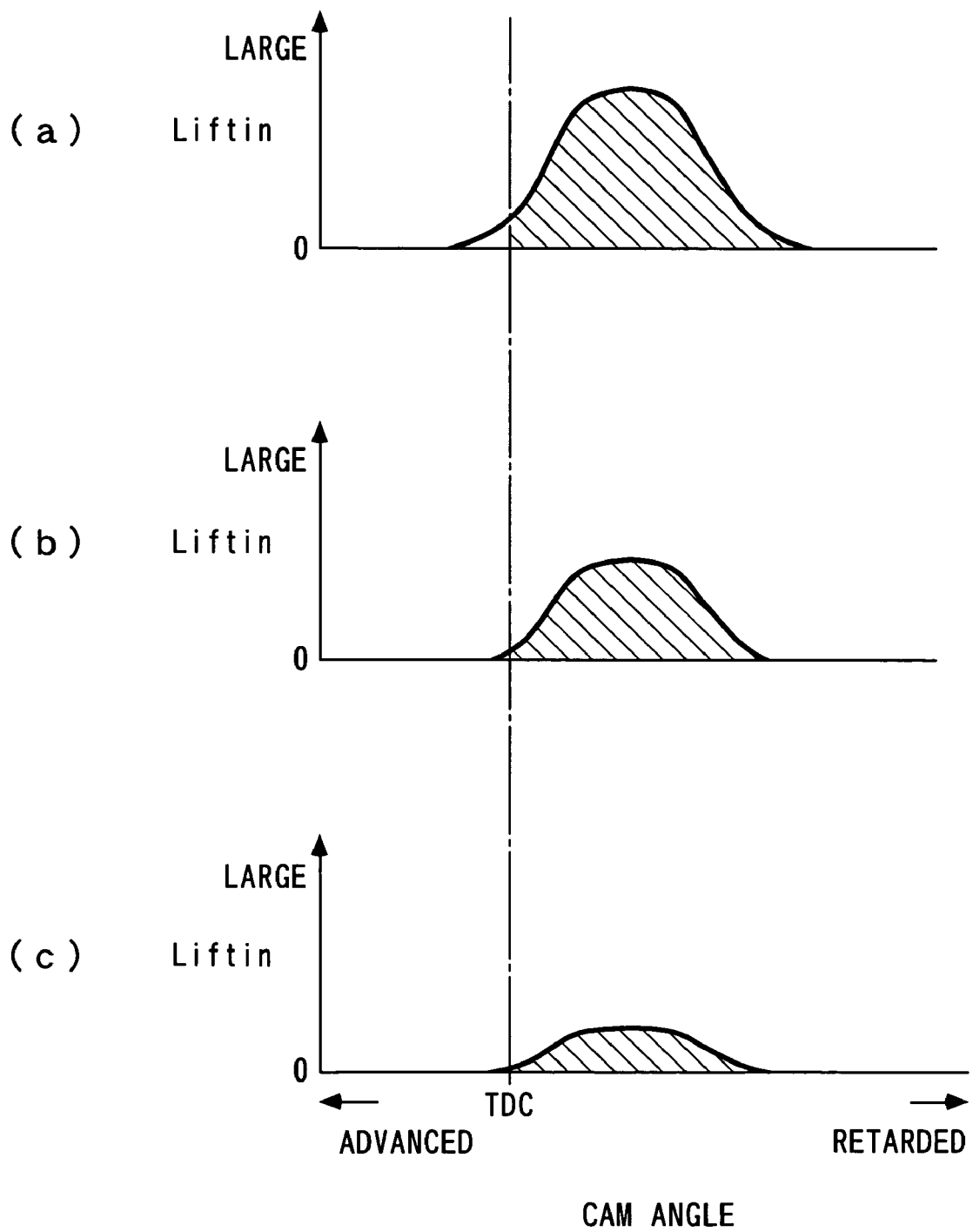

F I G. 1 9

$$Gcyl(k) = Gth(k) - \frac{VB \cdot [PBA(k) - PBA(k-1)]}{R \cdot TB} \quad \cdots (1)$$

$$Gcyl\_cmd\_f(k) = -POLE\_f \cdot Gcyl\_cmd\_f(k-1) + (1 + POLE\_f) \cdot Gcyl\_cmd(k)$$
$$\cdots (2)$$

$$Liftin\_cmd\_ms(k) = Ueq(k) + Urch(k) \quad \cdots (3)$$

$$Ueq(k) = \frac{1}{b1} \{(1 - a1 - POLE) \cdot Gcyl(k) + (POLE - a2) \cdot Gcyl(k-1)$$
$$- b2 \cdot Liftin\_cmd\_ms(k-1) - c1(k) + Gcyl\_cmd\_f(k+1)$$
$$+ (POLE - 1) \cdot Gcyl\_cmd\_f(k) - POLE \cdot Gcyl\_cmd\_f(k-1)\}$$
$$\cdots (4)$$

$$Urch(k) = -\frac{Krch}{b1} \cdot \sigma(k) \quad \cdots (5)$$

$$\sigma(k) = Egc(k) + POLE \cdot Egc(k-1) \quad \cdots (6)$$

$$Egc(k) = Gcyl(k) - Gcyl\_cmd\_f(k) \quad \cdots (7)$$

$$Gcyl(k+1) = a1 \cdot Gcyl(k) + a2 \cdot Gcyl(k-1)$$
$$+ b1 \cdot Liftin\_cmd(k) + b2 \cdot Liftin\_cmd(k-1) \quad \cdots (8)$$

$$Gcyl(k+1) = a1 \cdot Gcyl(k) + a2 \cdot Gcyl(k-1)$$
$$+ b1 \cdot Liftin\_cmd\_ms(k) + b2 \cdot Liftin\_cmd\_ms(k-1) \quad \cdots (9)$$

FIG. 20

$$c1(k) = c1(k-1) + \frac{Pdov}{1+Pdov} \cdot e\_dov(k) \quad \cdots (10)$$

$$e\_dov(k) = Gcyl(k) - Gcyl\_hat(k) \quad \cdots (11)$$

$$Gcyl\_hat(k) = \theta(k-1)^T \cdot \zeta(k) \quad \cdots (12)$$

$$\theta(k)^T = [a1, a2, b1, b2, c1(k)] \quad \cdots (13)$$

$$\zeta(k)^T = [Gcyl(k-1), Gcyl(k-2), Liftin\_cmd\_ms(k-1), Liftin\_cmd\_ms(k-2), 1]$$
$$\cdots (14)$$

$$\begin{aligned}c1(k) = &-Krch \cdot \sigma(k) + (1-a1-POLE) \cdot Gcyl(k) + (POLE-a2) \cdot Gcyl(k-1) \\ &-b2 \cdot Liftin\_cmd\_ms(k-1) + Gcyl\_cmd\_f(k+1) \\ &+(POLE-1) \cdot Gcyl\_cmd\_f(k) - POLE \cdot Gcyl\_cmd\_f(k-1) \quad \cdots (15)\end{aligned}$$

FIG. 23

$$Gcyl\_cmd\_f(k) = -POLE\_f \cdot Gcyl\_cmd\_f(k-1) + (1+POLE\_f) \cdot Gcyl\_cmd(k)$$
$$\cdots\cdots (16)$$

$$Cain\_cmd\_ms(k) = Ueq'(k) + Urch'(k) \qquad \cdots\cdots (17)$$

$$Ueq'(k) = \frac{1}{b1'}\{(1-a1'-POLE') \cdot Gcyl(k) + (POLE'-a2') \cdot Gcyl(k-1)$$
$$- b2' \cdot Cain\_cmd\_ms(k-1) - c1'(k) + Gcyl\_cmd\_f(k+1)$$
$$+ (POLE'-1) \cdot Gcyl\_cmd\_f(k) - POLE' \cdot Gcyl\_cmd\_f(k-1)\}$$
$$\cdots\cdots (18)$$

$$Urch'(k) = -\frac{Krch'}{b1'} \cdot \sigma'(k) \qquad \cdots\cdots (19)$$

$$\sigma'(k) = Egc(k) + POLE' \cdot Egc(k-1) \qquad \cdots\cdots (20)$$

$$Egc(k) = Gcyl(k) - Gcyl\_cmd\_f(k) \qquad \cdots\cdots (21)$$

$$Gcyl(k+1) = a1' \cdot Gcyl(k) + a2' \cdot Gcyl(k-1)$$
$$+ b1' \cdot Cain\_cmd(k) + b2' \cdot Cain\_cmd(k-1) \qquad \cdots\cdots (22)$$

$$Gcyl(k+1) = a1' \cdot Gcyl(k) + a2' \cdot Gcyl(k-1)$$
$$+ b1' \cdot Cain\_cmd\_ms(k) + b2' \cdot Cain\_cmd\_ms(k-1)$$
$$\cdots\cdots (23)$$

F I G. 2 4

$$c1'(k) = c1'(k-1) + \frac{Pdov'}{1+Pdov'} \cdot e\_dov'(k) \quad \cdots\cdots (24)$$

$$e\_dov'(k) = Gcyl(k) - Gcyl\_hat'(k) \quad \cdots\cdots (25)$$

$$Gcyl\_hat'(k) = \theta'(k-1)^T \cdot \zeta'(k) \quad \cdots\cdots (26)$$

$$\theta'(k)^T = [a1', a2', b1', b2', c1'(k)] \quad \cdots\cdots (27)$$

$$\zeta'(k)^T = [Gcyl(k-1), Gcyl(k-2), Cain\_cmd\_ms(k-1), Cain\_cmd\_ms(k-2), 1]$$
$$\cdots\cdots (28)$$

$$\begin{aligned}c1'(k) = &-Krch' \cdot \sigma'(k) + (1-a1'-POLE') \cdot Gcyl(k) + (POLE'-a2') \cdot Gcyl(k-1) \\ &-b2' \cdot Cain\_cmd\_ms(k-1) + Gcyl\_cmd\_f(k+1) \\ &+ (POLE'-1) \cdot Gcyl\_cmd\_f(k) - POLE' \cdot Gcyl\_cmd\_f(k-1) \quad \cdots\cdots (29)\end{aligned}$$

F I G. 2 6

$$Liftin(n+1) = a1'' \cdot Liftin(n) + a2'' \cdot Liftin(n-1)$$
$$+ b1'' \cdot Uliftin(n-dx) + b2'' \cdot Uliftin(n-dx-1)$$
$$\cdots (30)$$

$$A = \begin{bmatrix} a1'' & a2'' \\ 1 & 0 \end{bmatrix} \cdots (31)$$

$$B = \begin{bmatrix} b1'' & b2'' \\ 0 & 0 \end{bmatrix} \cdots (32)$$

$$Liftin(n+dx) = \alpha1(n) \cdot Liftin(n) + \alpha2(n) \cdot Liftin(n-1)$$
$$+ \beta1(n) \cdot Uliftin(n-1) + \beta2(n) \cdot Uliftin(n-2)$$
$$+ \cdots + \beta dx(n) \cdot Uliftin(n-dx)$$
$$+ \beta dx+1(n) \cdot Uliftin(n-dx-1) \quad \cdots (33)$$

$\alpha1$ : 1ST ROW-1ST COLUMN COMPONENT OF $A^{dx}$
$\alpha2$ : 1ST ROW-2ND COLUMN COMPONENT OF $A^{dx}$ $$\beta j \atop (j=1 \sim dx+1) : \begin{cases} \text{1ST ROW-1ST COLUMN COMPONENT (j=1) OF } A^{j-1} B \\ \text{1ST ROW-1ST COLUMN COMPONENT OF } A^{j-1} B \\ +\text{1ST ROW-2ND COLUMN COMPONENT (j=2} \sim \text{dx) OF } A^{j-2} B \\ \text{1ST ROW-2ND COLUMN COMPONENT (j=dx+1) OF } A^{j-2} B \end{cases}$$

$$Pre\_Liftin(n) = \alpha1(n) \cdot Liftin(n) + \alpha2(n) \cdot Liftin(n-1)$$
$$+ \beta1(n) \cdot Uliftin(n-1) + \beta2(n) \cdot Uliftin(n-2)$$
$$+ \cdots + \beta dx(n) \cdot Uliftin(n-dx)$$
$$+ \beta dx+1(n) \cdot Uliftin(n-dx-1)$$
$$+ \gamma1(n) \quad \cdots (34)$$

FIG. 27

$$\theta x(n) = \theta x(n-1) + KP(n) \cdot ide(n) \quad \cdots \cdots (35)$$

$$KP(n) = \frac{P(n) \cdot \zeta x(n)}{1 + \zeta x(n)^T \cdot P(n) \cdot \zeta x(n)} \quad \cdots \cdots (36)$$

$$P(n+1) = \frac{1}{\lambda 1} \left[ I - \frac{\lambda 2 \cdot P(n) \cdot \zeta x(n) \cdot \zeta x(n)^T}{\lambda 1 + \lambda 2 \cdot \zeta x(n)^T \cdot P(n) \cdot \zeta x(n)} \right] \cdot P(n) \quad \cdots \cdots (37)$$

$I$ : UNIT MATRIX OF ORDER $dx+2$
$\lambda 1, \lambda 2$ : WEIGHTING PARAMETER $$\begin{aligned} ide(n) &= Liftin\_hat(n) - Liftin(n) \\ &= \theta x(n-1)^T \cdot \zeta x(n) - Liftin(n) \end{aligned} \quad \cdots \cdots (38)$$

$$\theta x(n)^T = [\alpha 1(n), \alpha 2(n), \beta 1(n), \beta 2(n), \cdots, \beta dx+1(n), \gamma 1(n)] \quad \cdots \cdots (39)$$

$$\begin{aligned} \zeta x(n)^T = [&Liftin(n-dx), Liftin(n-dx-1), Uliftin(n-dx-1), \\ &Uliftin(n-dx-2), \cdots\cdots, Uliftin(n-2dx-1), 1] \end{aligned} \quad \cdots \cdots (40)$$

F I G. 28

$$\text{Liftin\_cmd\_f}(n) = -\text{POLE\_f}" \cdot \text{Liftin\_cmd\_f}(n-1) \\ + (1+\text{POLE\_f}") \cdot \text{Liftin\_cmd}(n) \quad \cdots \cdot (41)$$

$$\text{Uliftin}(n) = \text{Ueq}"(n) + \text{Urch}"(n) \quad \cdots \cdot (42)$$

$$\text{Ueq}"(n) = \frac{1}{\beta1(n)} \{-\text{POLE}" \cdot \text{Pre\_Liftin}(n) + \text{Pre\_Liftin}(n-1) \\ + \text{POLE}" \cdot \text{Pre\_Liftin}(n-2) - \alpha1(n) \cdot \text{Pre\_Liftin}(n-dx+1) \\ - \alpha2(n) \cdot \text{Pre\_Liftin}(n-dx) - \beta2(n) \cdot \text{Uliftin}(n-1) \\ - \cdots - \beta dx(n) \cdot \text{Uliftin}(n-dx+1) \\ - \beta dx+1(n) \cdot \text{Uliftin}(n-dx) - \gamma1(n) \\ + \text{Liftin\_cmd\_f}(n) + \text{POLE}" \cdot \text{Liftin\_cmd\_f}(n-1) \\ - \text{Liftin\_cmd\_f}(n-1) - \text{POLE}" \cdot \text{Liftin\_cmd\_f}(n-2)\}$$

$$\cdots \cdot (43)$$

$$\text{Urch}"(n) = -\frac{\text{Krch}"}{\beta1(n)} \cdot \text{Pre\_}\sigma"(n) \quad \cdots \cdot (44)$$

$$\text{Pre\_}\sigma"(n) = \text{Pre\_E\_lf}(n) + \text{POLE}" \cdot \text{Pre\_E\_lf}(n-1) \quad \cdots \cdot (45)$$

$$\text{Pre\_E\_lf}(n) = \text{Pre\_Liftin}(n) - \text{Liftin\_cmd\_f}(n) \quad \cdots \cdot (46)$$

FIG. 30

$$Cain(n+1) = a1^* \cdot Cain(n) + a2^* \cdot Cain(n-1)$$
$$+ b1^* \cdot Ucain(n-dy) + b2^* \cdot Ucain(n-dy-1)$$
$$\cdots (47)$$

$$Ay = \begin{bmatrix} a1^* & a2^* \\ 1 & 0 \end{bmatrix} \quad \cdots (48)$$

$$By = \begin{bmatrix} b1^* & b2^* \\ 0 & 0 \end{bmatrix} \quad \cdots (49)$$

$$Cain(n+dy) = \alpha 1^*(n) \cdot Cain(n) + \alpha 2^*(n) \cdot Cain(n-1)$$
$$+ \beta 1^*(n) \cdot Ucain(n-1) + \beta 2^*(n) \cdot Ucain(n-2)$$
$$+ \cdots + \beta dy^*(n) \cdot Ucain(n-dy)$$
$$+ \beta dy+1^*(n) \cdot Ucain(n-dy-1) \quad \cdots (50)$$

$\alpha 1^*$: 1ST ROW–1ST COLUMN COMPONENT OF $Ay^{dy}$
$\alpha 2^*$: 1ST ROW–2ND COLUMN COMPONENT OF $Ay^{dy}$ $\beta j^*$ : $\begin{cases} \text{1ST ROW–1ST COLUMN COMPONENT}(j=1) \text{ OF } Ay^{j-1} By \\ \text{1ST ROW–1ST COLUMN COMPONENT OF } Ay^{j-1} By \\ +\text{1ST ROW–2ND COLUMN COMPONENT}(j=2 \sim dy) \text{ OF } Ay^{j-2} By \\ \text{1ST ROW–2ND COLUMN COMPONENT } (j=dy+1) \text{ OF } Ay^{j-2} By \end{cases}$
$(j=1 \sim dy+1)$ $$Pre\_Cain(n) = \alpha 1^*(n) \cdot Cain(n) + \alpha 2^*(n) \cdot Cain(n-1)$$
$$+ \beta 1^*(n) \cdot Ucain(n-1) + \beta 2^*(n) \cdot Ucain(n-2)$$
$$+ \cdots + \beta dy^*(n) \cdot Ucain(n-dy)$$
$$+ \beta dy+1^*(n) \cdot Ucain(n-dy-1)$$
$$+ \gamma 1^*(n) \quad \cdots (51)$$

F I G. 3 1

$$\theta^*(n) = \theta^*(n-1) + KP^*(n) \cdot ide^*(n) \quad \cdots\cdots (52)$$

$$KP^*(n) = \frac{P^*(n) \cdot \zeta^*(n)}{1 + \zeta^*(n)^T \cdot P^*(n) \cdot \zeta^*(n)} \quad \cdots\cdots (53)$$

$$P^*(n+1) = \frac{1}{\lambda 1^*} \left[ I - \frac{\lambda 2^* \cdot P^*(n) \cdot \zeta^*(n) \cdot \zeta^*(n)^T}{\lambda 1^* + \lambda 2^* \cdot \zeta^*(n)^T \cdot P^*(n) \cdot \zeta^*(n)} \right] \cdot P^*(n) \quad \cdots\cdots (54)$$

$I$ : UNIT MATRIX OF ORDER $dy+2$
$\lambda 1^*, \lambda 2^*$ : WEIGHTING PARAMETER $$\begin{aligned}ide^*(n) &= Cain\_hat(n) - Cain(n) \\ &= \theta^*(n-1)^T \cdot \zeta^*(n) - Cain(n)\end{aligned} \quad \cdots\cdots (55)$$

$$\theta^*(n)^T = [\alpha 1^*(n), \alpha 2^*(n), \beta 1^*(n), \beta 2^*(n), \cdots, \beta dy+1^*(n), \gamma 1^*(n)]$$
$$\cdots\cdots (56)$$

$$\zeta^*(n)^T = [Cain(n-dy), Cain(n-dy-1), Cain(n-dy-2), \cdots, Cain(n-2dy-1), 1]$$
$$\cdots\cdots (57)$$

FIG. 32

$$Cain\_cmd\_f(n) = -POLE\_f^* \cdot Cain\_cmd\_f(n-1) + (1+POLE\_f^*) \cdot Cain\_cmd(n)$$

$$\cdots\cdots (58)$$

$$Ucain(n) = Ueq^*(n) + Urch^*(n) \qquad \cdots\cdots (59)$$

$$\begin{aligned} Ueq^*(n) = \frac{1}{\beta 1^*(n)} \{ &-POLE^* \cdot Pre\_Cain(n) + Pre\_Cain(n-1) \\ &+ POLE^* \cdot Pre\_Cain(n-2) - \alpha 1^*(n) \cdot Pre\_Cain(n-dy+1) \\ &- \alpha 2^*(n) \cdot Pre\_Cain(n-dy) - \beta 2^*(n) \cdot Ucain(n-1) \\ &- \cdots - \beta dy^*(n) \cdot Ucain(n-dy+1) \\ &- \beta dy+1^*(n) \cdot Ucain(n-dy) - \gamma 1^*(n) \\ &+ Cain\_cmd\_f(n) + POLE^* \cdot Cain\_cmd\_f(n-1) \\ &- Cain\_cmd\_f(n-1) - POLE^* \cdot Cain\_cmd\_f(n-2) \} \end{aligned}$$

$$\cdots\cdots (60)$$

$$Urch^*(n) = -\frac{Krch^*}{\beta 1^*(n)} \cdot Pre\_\sigma^*(n) \qquad \cdots\cdots (61)$$

$$Pre\_\sigma^*(n) = Pre\_E\_ca^*(n) + POLE^* \cdot Pre\_E\_ca^*(n-1) \qquad \cdots\cdots (62)$$

$$Pre\_E\_ca^*(n) = Pre\_Cain(n) - Cain\_cmd\_f(n) \qquad \cdots\cdots (63)$$

FIG. 33
(a) 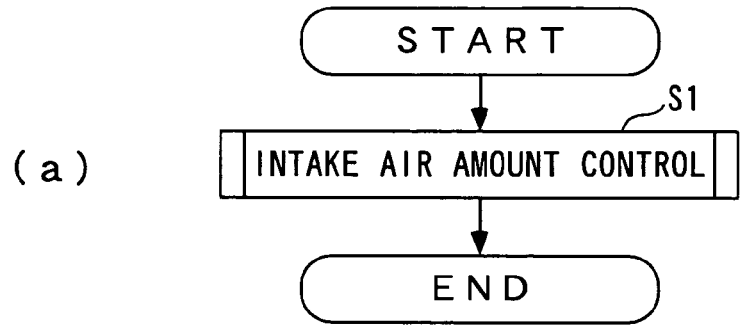
(b) 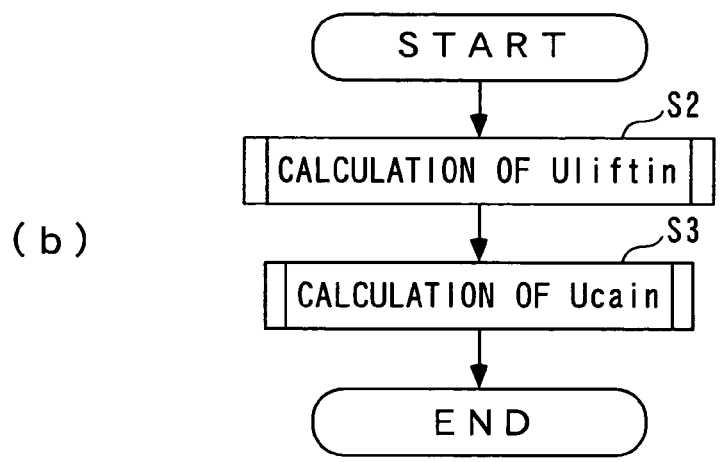
(c) 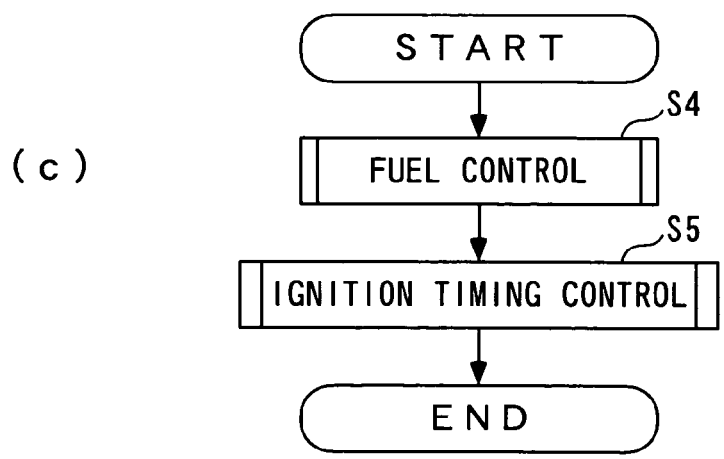

FIG. 49

$$Ig\_ast = Ig\_ast\_base - Krch^{\#} \cdot \sigma^{\#}(m) - Kadp^{\#} \sum_{i=0}^{m} \cdot \sigma^{\#}(i) \quad \cdots \cdots (64)$$

$$\sigma^{\#}(m) = Enast(m) + POLE^{\#} \cdot Enast(m-1) \quad \cdots \cdots (65)$$

$$Enast(m) = NE(m) - NE\_ast \quad \cdots \cdots (66)$$

$$Ig\_fs = Ig\_fs\_base - Krch^{\#\#} \cdot \sigma^{\#\#}(m) - Kadp^{\#\#} \sum_{i=0}^{m} \cdot \sigma^{\#\#}(i) \quad \cdots \cdots (67)$$

$$\sigma^{\#\#}(m) = Enfs(m) + POLE^{\#\#} \cdot Enfs(m-1) \quad \cdots \cdots (68)$$

$$Enfs(m) = NE(m) - NE\_fs \quad \cdots \cdots (69)$$

FIG. 50

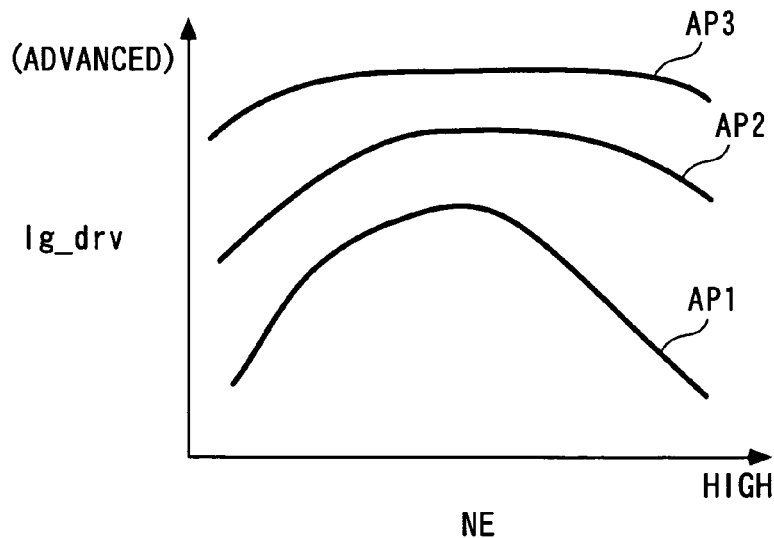

F I G. 5 1

$$Gcyl\_cmd\_f(k) = -POLE\_f \cdot Gcyl\_cmd\_f(k-1) + (1+POLE\_f) \cdot Gcyl\_cmd(k)$$
$$\cdots\cdots (70)$$

$$Liftin\_cmd\_ms(k) = Urch(k) + Uadp(k) \qquad \cdots\cdots (71)$$

$$Urch(k) = -\frac{Krch}{b1} \cdot \sigma(k) \qquad \cdots\cdots (72)$$

$$Uadp(k) = -\frac{Kadp}{b1} \cdot \omega(k) \qquad \cdots\cdots (73)$$

$$\omega(k) = \omega(k-1) + \sigma(k) \qquad \cdots\cdots (74)$$

$$\omega(k) = -\frac{Krch}{Kadp} \cdot \sigma(k) \qquad \cdots\cdots (75)$$

$$\sigma(k) = Egc(k) + POLE \cdot Egc(k-1) \qquad \cdots\cdots (76)$$

$$Egc(k) = Gcyl(k) - Gcyl\_cmd\_f(k) \qquad \cdots\cdots (77)$$

F I G. 5 2

$$\text{Gcyl\_cmd\_f}(k) = -\text{POLE\_f} \cdot \text{Gcyl\_cmd\_f}(k-1) + (1+\text{POLE\_f}) \cdot \text{Gcyl\_cmd}(k) \quad \cdots (78)$$

$$\text{Cain\_cmd\_ms}(k) = \text{Urch'}(k) + \text{Uadp'}(k) \quad \cdots (79)$$

$$\text{Urch'}(k) = -\frac{\text{Krch'}}{b1} \cdot \sigma'(k) \quad \cdots (80)$$

$$\text{Uadp'}(k) = -\frac{\text{Kadp'}}{b1} \cdot \omega'(k) \quad \cdots (81)$$

$$\omega'(k) = \omega'(k-1) + \sigma'(k) \quad \cdots (82)$$

$$\omega'(k) = -\frac{\text{Krch'}}{\text{Kadp'}} \cdot \sigma'(k) \quad \cdots (83)$$

$$\sigma'(k) = \text{Egc}(k) + \text{POLE'} \cdot \text{Egc}(k-1) \quad \cdots (84)$$

$$\text{Egc}(k) = \text{Gcyl}(k) - \text{Gcyl\_cmd\_f}(k) \quad \cdots (85)$$

INTAKE AIR AMOUNT CONTROL SYSTEM FOR INTERNAL COMBUSTION ENGINE

CROSS-REFERENCE TO RELATED APPLICATION

This application is a National Stage entry of International Application No. PCT/JP2004/015065, filed Oct. 13, 2004, the entire specification claims and drawings of which are incorporated herewith by reference.

FIELD OF THE INVENTION

The present invention relates to an intake air amount control system for an internal combustion engine, for controlling an intake air amount by variably controlling both the valve lift and the cam phase, that is, the valve timing, of intake valves.

BACKGROUND ART

Conventionally, as an intake air amount control system for an internal combustion engine, provided for controlling an intake air amount, one described in Patent Literature 1 is known. This engine includes a variable valve lift mechanism and a variable cam phase mechanism, and the valve lift of intake valves is changed by the variable valve lift mechanism, and the cam phase of an intake cam shaft relative to a crankshaft is changed by the variable cam phase mechanism, whereby the valve timing of the intake valve is varied.

In this intake air amount control system, the cam phase and the valve lift of each intake valve are both variably controlled by the variable cam phase mechanism and the variable valve lift mechanism, whereby the intake air amount is controlled. More specifically, a target valve lift, which is a target value of the valve lift, and a target cam phase, which is a target value of the cam phase, are set according to load on the engine and the like, and feedback control is carried out based on the target values. Further, the target cam phase or the target valve lift is corrected so as to avoid interaction between the intake valve and a piston. More specifically, for example, the difference between a valve lift detected by a sensor and the target valve lift is compared with a predetermined threshold value, and when the difference is equal to or larger than the threshold value, the target cam phase is corrected such that it is more retarded (example shown in FIG. 10 in Patent Literature 1).

[Patent Literature 1] Japanese Laid-Open Patent Publication (Kokai) No. 2002-332876

DISCLOSURE OF THE INVENTION

When the variable valve lift mechanism and the variable cam phase mechanism are both driven for control of the intake air amount, as in the above conventional intake air amount control system, that is, when both valve lift control and cam phase control are executed for control of the intake air amount, the valve lift control and the cam phase control interact with each other due to the differences between the dynamic characteristics of the two variable mechanisms, which can result in the degraded control accuracy and response of the intake air amount control. More specifically, when the valve lift is controlled by the variable valve lift mechanism, the intake air amount can be changed more quickly than when the cam phase is controlled by the variable cam phase mechanism, whereby it is possible secure high responsiveness of the intake air amount control. On the other hand, when the variable cam phase mechanism is employed, the intake air amount can be more finely controlled by a smaller amount of change, whereby it is possible to secure higher control accuracy. As described above, the valve lift control and the cam phase control are different in control characteristics of the intake air amount, so that when they interact with each other, it is impossible to properly control the intake air amount. For example, when high control accuracy is required, as in the case of the engine being in a low-load region, the intake air amount cannot be finely controlled by the valve lift control, and hence when the valve lift control interacts with the cam phase control, control accuracy is degraded by the adverse influence of the interaction.

The present invention has been made to provide a solution to the above-described problems, and an object thereof is to provide an intake air amount control system for an internal combustion engine, which controls the amount of intake air by executing both cam phase control and valve lift control, and is capable of enhancing response and accuracy of the intake air amount control, while avoiding interaction between the cam phase control and the valve lift control.

To attain the above object, the invention as claimed in claim 1 provides an intake air amount control system 1 for an internal combustion engine 3, which variably controls a cam phase Cain of an intake cam shaft 5 for opening and closing an intake valve 4, relative to a crankshaft 3b by a variable cam phase mechanism 70, and variably controls a valve lift Liftin of the intake valve 4 by a variable valve lift mechanism 50, to thereby control an amount of intake air drawn into a cylinder of the engine 3, comprising target intake air amount-setting means (ECU 2, target intake air amount-calculating section 90, steps 20 and 21) for setting a target intake air amount Gcyl_cmd to which the amount of intake air is to be controlled, according to a load parameter (engine speed NE, accelerator pedal opening AP) indicative of load on the engine 3, intake air amount-detecting means (ECU 2, air flow sensor 22, intake pipe absolute pressure sensor 23) for detecting the amount of intake air (intake air amount, actual intake air amount Gcyl), first control value-calculating means (ECU 2, first and second ACTASS controllers 100 and 200, steps 37 and 38) for calculating a first control value (target valve lift Liftin_cmd, target cam phase Cain_cmd) for use in controlling one of the cam phase and the valve lift such that the detected intake air amount converges to the target intake air amount, and second control value-calculating means (ECU 2, first and second slave value-calculating sections 110 and 210, steps 51, 52, 56, 60, and 64) for calculating a second control value (target valve lift Liftin_cmd, target cam phase Cain_cmd, slave values Liftin_cmd_sl, Cain_cmd_sl) for use in controlling the other of the cam phase and the valve lift based on the first control value calculated by the first control value-calculating means.

According to this intake air amount control system, the target intake air amount to which the amount of intake air is to be controlled is set according to a load parameter indicative of load on the engine; the first control value for controlling one of a cam phase and a valve lift is calculated such that the detected intake air amount converges to the target intake air amount, and the second control value for controlling the other of the cam phase and the valve lift is calculated based on the first control value. Thus, the second control value is calculated based on the first control value for causing the intake air amount to converge to the target intake air amount, and therefore it is possible to calculate the second control value as a value which does not obstruct the convergence of the intake air amount to the target intake air amount by the first control value. As a result, e.g. when the cam phase is controlled by the first control value, and the valve lift is controlled by the second control value, it is possible to finely control the intake air amount by a very small amount of change while avoiding interaction between the cam phase control and the valve lift control, thereby enhancing the accuracy of the control. On the other hand, when the valve lift is controlled by the first control value, and the cam phase is controlled by the second control value, it is possible to reduce dead time in the intake air amount control, thereby enhancing the response of the intake air amount control, while avoiding interaction between the cam phase control and the valve lift control;

The invention as claimed in claim 2 is an intake air amount control system 1 as claimed in claim 1, wherein the first control value includes a feedback control value (master value Liftin_cmd_ms, Cain_cmd_ms) for causing the intake air amount to converge to the target intake air amount, and wherein the first control value-calculating means calculates the feedback control value with a two-degree-of-freedom control algorithm [equations (2) to (7), (10) to (14), (16) to (21), (24) to (28)].

According to this intake air amount control system, the feedback control value included in the first control value is calculated with a two-degree-of-freedom control algorithm, so that e.g. when a target value filter-type two-degree-of-freedom control algorithm is used as the two-degree-of-freedom control algorithm, it is possible to properly set the convergence rate of the intake air amount to the target intake air amount with a target value filter algorithm, and properly set the convergence behavior of the intake air amount to the target intake air amount with a feedback control algorithm.

The invention as claimed in claim 3 is an intake air amount control system 1 as claimed in claim 1 or 2, further comprising control input-calculating means (ECU 2, valve lift controller 120, cam phase controller 220, steps 2 and 3) for calculating a control input (phase control input Ucain, lift control input Uliftin) to one of the variable cam phase mechanism 70 and the variable valve lift mechanism 50 according to the first control value (target valve lift Liftin_cmd, target cam phase Cain_cmd), and calculating a control input (phase control input Ucain, lift control input Uliftin) to the other of the variable cam phase mechanism 70 and the variable valve lift mechanism 50 according to the second control value, and wherein a calculation period (control period $\Delta T1$) at which the first control value-calculating means and the second control value-calculating means calculate is set to be longer than a calculation period (control period $\Delta T2$) at which the control input-calculating means calculates.

According to this intake air amount control system, a control input to one of the variable cam phase mechanism and the variable valve lift mechanism is calculated according to the first control value, and a control input to the other of the variable cam phase mechanism and the variable valve lift mechanism is calculated according to the second control value, while the calculation period at which the first control value-calculating means and the second control value-calculating means calculate is set to be longer than the calculation period at which the control input-calculating means calculates. When the intake air amount is controlled by the variable cam phase mechanism and the variable valve lift mechanism, generally, the response speed of the intake air amount is made relatively slower due to the response speeds of the variable mechanisms, and hence the calculation period at which the first and second control value-calculating means calculate is properly set such that it is coincident with the above response speeds, whereby it is possible to accurately control a transitional change in the intake air amount. Further, since the calculation period at which the control input-calculating means calculates is shorter than the calculation period at which the first and second control value-calculating means calculate, the control inputs to the variable cam phase mechanism and the variable valve lift mechanism can be calculated more quickly than the first and second control values. This makes it possible to enhance the stability of the intake air amount control, and even when the variable mechanisms both have a nonlinear characteristic, it is possible to suppress the adverse influence of the nonlinear characteristic on the intake air amount control, thereby making it possible to further enhance the stability of the intake air amount control.

To attain the above object, the invention as claimed in claim 4 provides an intake air amount control system 1 for an internal combustion engine 3, which variably controls a cam phase Cain of an intake cam shaft 5 for opening and closing an intake valve 4, relative to a crankshaft $3b$ by a variable cam phase mechanism 70, and variably controls a valve lift Liftin of the intake valve 4 by a variable valve lift mechanism 50, to thereby control an amount of intake air drawn into a cylinder of the engine 3, comprising target intake air amount-setting means (ECU 2, target intake air amount-calculating section 90, steps 20 and 21) for setting a target intake air amount Gcyl_cmd to which the amount of intake air is to be controlled, according to a first load parameter (engine speed NE, accelerator pedal opening AP) indicative of load on the engine, intake air amount-detecting means (ECU 2, air flow sensor 22, intake pipe absolute pressure sensor 23) for detecting the amount of intake air (intake air amount, actual intake air amount Gcyl), first control means (ECU 2, first ACTASS controller 100, first slave value-calculating section 110, steps 51, 52, 54, 56, 60, 63, and 64) for controlling the valve lift Liftin such that the detected intake air amount (actual intake air amount Gcyl) converges to the target intake air amount Gcyl_cmd, and controlling the cam phase Cain with a predetermined first control algorithm so as to assist the valve lift control, second control means (ECU 2, second ACTASS controller 200, second slave value-calculating section 210, steps 51, 52, 55, 56, 60, 62, and 64) for controlling the cam phase Cain such that the detected intake air amount converges to the target intake air amount, and controlling the valve lift Liftin with a predetermined second control algorithm so as to assist the cam phase control, and control selection means (ECU 2, master/slave-selecting section 230, steps 34 to 36, and 39) for selecting one of the first control means and the second control means according to a second load parameter (target valve lift Liftin_cmd, target cam phase Cain_cmd) indicative of load on the engine 3, and causing control to be executed by the selected one of the first control means and the second control means.

According to this intake air amount control system, the target intake air amount-setting means sets the target intake air amount to which the amount of intake air is to be controlled, according to the first load parameter indicative of the load on the engine. Further, the first control means controls the valve lift such that the detected intake air amount converges to the target intake air amount, while controlling the cam phase with the predetermined first control algorithm so as to assist the valve lift control. Thus, the first control means controls the intake air amount mainly by the valve lift control, and uses the cam phase control for assisting the valve lift control, which makes it possible to avoid interaction between the cam phase control and the valve lift control. Further, the second control means controls the cam phase such that the detected intake air amount converges to the target intake air amount, while controlling the valve lift with the predetermined second control algorithm so as to assist the cam phase control. Thus, the second control means controls the intake air amount mainly by the cam phase control, and uses the valve lift control for assisting the cam phase control, which makes it possible to avoid interaction between the cam phase control and the valve lift control. Furthermore, the control selection means selects one of the first control means and the second control means according to the second load parameter indicative of the load on the engine, and causes control to be executed by the selected one of the first control means and the second control means. Therefore, if the system is configured, for example, such that the second control means is selected when the load on the engine is low, the cam phase control makes it possible to finely control the intake air amount by a very small amount of change while avoiding interaction between the cam phase control and the valve lift control, thereby making it possible to enhance the accuracy of the control. On the other hand, if the system is configured such that the first control means is selected when the load on the engine is high, the valve lift control makes it possible to reduce dead time in the intake air amount control while avoiding interaction between the cam phase control and the valve lift control, thereby making it possible to enhance the response of the control.

The invention as claimed in claim 5 is an intake air amount control system 1 as claimed in claim 4, wherein the predetermined first control algorithm for the first control means is an algorithm (steps 60 and 64) which controls the cam phase Cain according to a state of control of the valve lift (target valve lift Liftin_cmd), and wherein the predetermined second control algorithm for the second control means is an algorithm (steps 51, 52, and 56) which controls the valve lift Liftin according to a state of control of the cam phase (target cam phase Cain_cmd).

According to this intake air amount control system, since the first control means controls the cam phase according to a state of control of the valve lift, it is possible to control the cam phase such that the cam phase does not obstruct the convergence of the intake air amount to the target intake air amount by the valve lift control, thereby making it possible to positively enhance the response of the intake air amount control. Further, since the second control means controls the valve lift according to a state of control of the cam phase, it is possible to control the valve lift such that the valve lift does not obstruct the convergence of the intake air amount to the target intake air amount by the cam phase control, thereby making it possible to reliably enhance the accuracy of the intake air amount control.

The invention as claimed in claim 6 is an intake air amount control system 1 as claimed in claim 4 or 5, wherein the control selection means selects the second control means (step 35) when the load on the engine 3 indicated by the second load parameter is in a predetermined first load region (if the answer to the question of the step 34 is negative (NO) or if the answer to the question of the step 39 is affirmative (YES)), and selects the first control means (step 36) when the load on the engine 3 indicated by the second load parameter is in a predetermined second load region higher than the predetermined first load region (if the answer to the question of the step 34 is affirmative (YES) or if the answer to the question of the step 39 is negative (NO)).

According to this intake air amount control system, the control selection means selects the second control means when the load on the engine is in the predetermined first load region, and selects the first control means when the load on the engine is in the predetermined second load region higher than the predetermined first load region. Therefore, during the intake air amount control, in a low-load region requiring high control accuracy, it is possible to properly secure the control accuracy, and in a high-load region requiring high responsiveness of the intake air amount control, it is possible to properly secure the responsiveness.

The invention as claimed in claim 7 is an intake air amount control system 1 as claimed in claim 6, wherein the control selection means comprises acceleration determining means (ECU 2, step 31) for determining whether or not the engine 3 is in an accelerating state, load region-determining means (ECU 2, steps 34 to 36) for determining that the load on the engine 3 is in the predetermined second load region when the second load parameter (target cam phase Cain_cmd) is smaller than a predetermined threshold value Cain_mssw_lmt, while determining that the load on the engine 3 is in the predetermined first load region when the second load parameter is not smaller than the predetermined threshold value, and threshold value-setting means (step 32) for setting the predetermined threshold value Cain_mssw_lmt to a larger value (predetermined acceleration value Cain_mssw1) when the engine 3 is determined to be in an accelerating state by the acceleration determining means (if the answer to the question of the step 31 is affirmative (YES)), than otherwise.

According to this intake air amount control system, the acceleration determining means determines whether or not the engine is in an accelerating state; the load region-determining means determines that the load on the engine is in the predetermined second load region when the second load parameter is smaller than the predetermined threshold value, and determines that the load on the engine is in the predetermined first load region when the second load parameter is not smaller than the predetermined threshold value; and the threshold value-setting means sets the predetermined threshold value to a larger value when the engine is determined to be in the accelerating state by the acceleration determining means, than otherwise. Thus, when the engine is in the accelerating state, i.e. when high responsiveness of the intake air amount control is required, the load region where the load on the engine is determined to be in the predetermined second load region is expanded. This makes it easier to select the first control means, whereby it is possible to quickly and properly secure high responsiveness of the intake air amount control.

The invention as claimed in claim 8 is an intake air amount control system 1 as claimed in claim 6, wherein the control selection means comprises acceleration determining means (ECU 2, step 50) for determining whether or not the engine 3 is in an accelerating state, second load parameter-setting means (ECU 2, step 51) for setting the second load parameter (target valve lift Liftin_cmd) to a larger value when the engine 3 is determined to be in the accelerating state by the acceleration determining means (if the answer to the question of the step 50 is affirmative (YES)), than otherwise, and load region-determining means (ECU 2, steps 35, 36, and 39) for determining that the load on the engine 3 is in the predetermined first load region when the set second load parameter (target valve lift Liftin_cmd) is not larger than a predetermined threshold value Liftin_mssw, while determining that the load on the engine 3 is in the predetermined second load region when the second load parameter is larger than the predetermined threshold value Liftin_mssw.

According to this intake air amount control system, the acceleration determining means determines whether or not the engine is in an accelerating state, and the second load parameter-setting means sets the second load parameter to a larger value when the engine is determined to be in the accelerating state by the acceleration determining means, than otherwise. Further, the load region-determining means determines that the load on the engine is in the predetermined second load region when the second load parameter is larger than a predetermined threshold value, and determines that the load on the engine is in the predetermined first load region when the second load parameter is not larger than the predetermined threshold value. Thus, when the engine is in the accelerating state, i.e. when high responsiveness of the intake air amount control is required, the load region where the load on the engine is determined to be in the predetermined second load region is expanded. This makes it easier to select the first control means, whereby it is possible to quickly and properly secure high responsiveness of the intake air amount control.

The invention as claimed in claim 9 is an intake air amount control system 1 as claimed in any one of claims 4 to 8, wherein each of the first control means and the second control means comprises cam phase control value-calculating means (ECU 2, step 38) for calculating a cam phase control value (target cam phase Cain_cmd) for use in controlling the cam phase Cain, and valve lift control value-calculating means (ECU 2, step 37) for calculating a valve lift control value (target valve lift Liftin_cmd) for use in controlling the valve lift Liftin, wherein the cam phase control value-calculating means calculates the cam phase control value (target cam phase Cain_cmd) as a sum of a cam phase feedback control value (master value Cain_cmd_ms of target cam phase) for causing the intake air amount to converge to the target intake air amount, and a cam phase-setting value (slave value Cain_cmd_sl of target cam phase) set according to the valve lift control value, wherein the valve lift control value-calculating means calculates the valve lift control value (target valve lift Liftin_cmd) as a sum of a valve lift feedback control value (master value Liftin_cmd_ms of target valve lift) for causing the intake air amount to converge to the target intake air amount, and a valve lift-setting value (slave value Liftin_cmd_sl of target valve lift) set according to the cam phase control value, wherein the cam phase control value-calculating means of the first control means sets the cam phase feedback control value to a value of 0 (steps 61 and 63) when the first control means is selected by the control selection means, and wherein the valve lift control value-calculating means of the second control means sets the valve lift feedback control value to a value of 0 (steps 53 and 55) when the second control means is selected by the control selection means.

According to this intake air amount control system, a cam phase control value for use in controlling the cam phase is calculated as the sum of a cam phase feedback control value for causing the intake air amount to converge to the target intake air amount, and a cam phase-setting value set according to the valve lift control value, and a valve lift control value for use in controlling the valve lift is calculated as the sum of a valve lift feedback control value for causing the intake air amount to converge to the target intake air amount, and a valve lift-setting value set according to the cam phase control value. Further, the cam phase feedback control value is calculated as a value of 0 when the first control means is selected by the control selection means, and the valve lift feedback control value is calculated as a value of 0 when the second control means is selected by the control selection means. As a result, for example, when the first control means has been switched to the second control means by the control selection means, the cam phase feedback control value before the switching has been calculated as a value of 0, so that the cam phase feedback control value after the switching is calculated with a value of 0 as an initial value thereof, whereby it is possible to avoid a sudden change in the cam phase control value. Inversely, when the second control means has been switched to the first control means by the control selection means, the valve lift feedback control value before the switching has been calculated as a value of 0, so that the valve lift feedback control value after the switching is calculated with a value of 0 as an initial value thereof, whereby it is possible to avoid a sudden change in the valve lift control value. As described above, when one of the first control means and the second control means is switched to the other by the control selection means, it is possible to avoid a sudden change in the cam phase control value and the valve lift control value, thereby making it possible to avoid a sudden change in the state of control of the intake air amount. As a result, it is possible to avoid occurrence of a torque step or the like.

The invention as claimed in claim 10 is an intake air amount control system 1 as claimed in claim 9, wherein the cam phase control value-calculating means calculates the cam phase feedback control value (master value Cain_cmd_ms of target cam phase) with a two-degree-of-freedom control algorithm [equations (2) to (7) and (10) to (14)], and the valve lift control value-calculating means calculates the valve lift feedback control value (master value Liftin_cmd_ms of target valve lift) with a two-degree-of-freedom control algorithm [equations (16) to (21) and (24) to (28)].

According to this intake air amount control system, the cam phase feedback control value and the valve lift feedback control value are calculated with two-degree-of-freedom control algorithms, and hence e.g. when target value filter-type two-degree-of-freedom control algorithms are used as the two-degree-of-freedom control algorithms, it is possible to properly set the convergence rate of the intake air amount to the target intake air amount with target value filter algorithms, and properly set the convergence behavior of the intake air amount to the target intake air amount with feedback control algorithms.

The invention as claimed in claim 11 is an intake air amount control system 1 as claimed in claim 9 or 10, wherein the cam phase control value-calculating means sets the cam phase-setting value (slave value Cain_cmd_sl of target cam phase) to such a value as makes earlier the valve-opening timing of the intake valve 4 (step 60) as the valve lift control value (target valve lift Liftin_cmd) is such a value as makes the valve lift Liftin smaller, and the valve lift control value-calculating means sets the valve lift-setting value (slave value Liftin_cmd_sl of target valve lift) to such a value as makes the valve lift Liftin smaller (steps 51 and 52) as the cam phase control value (target cam phase Cain_cmd) is such a value as makes earlier the valve-opening timing of the intake valve 4.

According to this intake air amount control system, as the valve lift control value is such a value as makes the valve lift smaller, the cam phase-setting value is set to such a value as makes earlier the valve-opening timing of the intake valve, and hence e.g. when the cam phase-setting value is set to such a value as makes the valve-opening timing of the intake valve earlier than the TDC position at the start of the intake stroke, the valve-opening timing of the intake valve can be properly controlled such that it is made earlier in accordance with the valve lift which is controlled to a smaller value as the load on the engine is lower to make smaller the target intake air amount. More specifically, the direction of control of the intake air amount by the cam phase control can be matched with the direction of control of the intake air amount by the valve lift control, whereby it is possible to more positively avoid the cam phase control from interacting with the valve lift control. Further, as the cam phase control value is such a value as makes earlier the valve-opening timing of the intake valve, the valve lift-setting value is set to such a value as makes the valve lift smaller, and hence as described hereinabove, if the cam phase-setting value is set to such a value as makes the valve-opening timing of the intake valve earlier than the TDC position at the start of the intake stroke, valve lift as well can be properly controlled such that it is made smaller in accordance with the valve-opening timing of the intake valve, which is controlled such that it is made earlier as the load on the engine is lower to make smaller the target intake air amount. More specifically, the direction of control of the intake air amount by the valve lift control can be matched with the direction of control of the intake air amount by the cam phase control, whereby it is possible to more positively avoid the valve lift control from interacting with the cam phase control. Further, although as the valve-opening timing of the intake valve is made earlier (i.e. more advanced), the internal EGR amount is increased to decrease the combustion speed, by controlling the valve lift to a smaller value to increase the fluidity of the mixture within the cylinder, it is possible to compensate for the decrease in the combustion speed to attain stable combustion. Furthermore, when the valve-opening timing of the intake valve is more advanced, the valve lift is controlled such that it is necessarily made smaller, and hence when the intake air amount control system is applied to an engine configured such that an intake valve and an exhaust valve thereof are brought into abutment with each other when they are simultaneously opened, it is possible to reliably avoid the above abutment.

The invention as claimed in claim 12 is an intake air amount control system 1 as claimed in any one of claims 9 to 11, further comprising control input-calculating means (ECU 2, valve lift controller 120, cam phase controller 220) for calculating a control input (phase control input Ucain) to the variable cam phase mechanism 70 according to the cam phase control value (target cam phase Cain_cmd), and calculating a control input (lift control input Uliftin) to the variable valve lift mechanism 50 according to the valve lift control value (target valve lift Liftin_cmd), and wherein a calculation period (control period ΔT1) at which the cam phase control value-calculating means and the valve lift control value-calculating means calculates is set to be longer than a calculation period (control period ΔT2) at which the control input-calculating means calculates.

According to this intake air amount control system, a control input to the variable cam phase mechanism is calculated according to the cam phase control value, and a control input to the variable valve lift mechanism is calculated according to the valve lift control value, while the calculation period at which the cam phase control value-calculating means and the valve lift control value-calculating means calculate is set to be longer than the calculation period at which the above control inputs are calculated. As described above, when the intake air amount is controlled by the variable cam phase mechanism and the variable valve lift mechanism, generally, the response speed of the intake air amount is made relatively slower due to the response speeds of the variable mechanisms, and hence the calculation period at which the cam phase control value-calculating means and the valve lift control value-calculating means calculate is properly set such that it is coincident with the above response speeds, whereby it is possible to accurately control a transitional change in the intake air amount. Further, since the calculation period at which the control input-calculating means calculates is shorter than the calculation period at which the first and second control value-calculating means calculate, the control inputs to the variable cam phase mechanism and the variable valve lift mechanism can be calculated more quickly than the cam phase control value and the valve lift control value. This makes it possible to enhance the stability of the intake air amount control, and even when the variable mechanisms both have a nonlinear characteristic, it is possible to suppress the adverse influence of the nonlinear characteristics on the intake air amount control, thereby making it possible to further enhance the stability of the intake air amount control.

BRIEF DESCRIPTION OF THE DRAWINGS

FIG. 6(a) is a diagram showing an intake valve placed in a closed state when a lower link of the variable valve lift mechanism is in a maximum lift position, and FIG. 6(b) is a diagram showing the intake valve placed in an open state at a maximum lift;

FIG. 7(a) is a diagram showing the intake valve placed in a closed state when the lower link of the variable valve lift mechanism is in a minimum lift position, and FIG. 7(b) is a diagram showing the intake valve placed in an open state at a maximum lift;

FIG. 15 is a diagram which is useful in explaining changes in an intake air amount caused by changes in the valve lift alone;

FIG. 19 is a diagram showing an algorithm for calculating an actual intake air amount Gcyl, control algorithms for a target value filter and a sliding mode controller of the first ACTASS controller, and a plant model for use in deriving the control algorithm for the sliding mode controller;

FIG. 20 is a diagram showing a control algorithm for an adaptive disturbance observer of the first ACTASS controller;

FIG. 23 is a diagram showing control algorithms for a target value filter and a sliding mode controller of the second ACTASS controller, and a plant model for use in deriving the control algorithm for the sliding mode controller;

FIG. 24 is a diagram showing a control algorithm for an adaptive disturbance observer of the second ACTASS controller;

FIG. 26 is a diagram showing a state-predicting algorithm for a state predictor of the valve lift controller and equations for deriving the state-predicting algorithm;

FIG. 27 is a diagram showing an identification algorithm for an onboard identifier of the valve lift controller;

FIG. 28 is a diagram showing a control algorithm for a two-degree-of-freedom sliding mode controller of the valve lift controller;

FIG. 30 is a diagram showing a state-predicting algorithm for a state predictor of the cam phase controller and equations for deriving the state-predicting algorithm;

FIG. 31 is a diagram showing an identification algorithm for an onboard identifier of the cam phase controller;

FIG. 32 is a diagram showing a control algorithm for a two-degree-of-freedom sliding mode controller of the cam phase controller;

FIG. 33 is a flowchart showing a main control process of an engine control process;

FIG. 49 is a diagram showing a control algorithm for use in calculation of a catalyst warmup value and a failure-time value of ignition timing;

FIG. 50 is a diagram showing an example of a map for use in calculation of a normal operation value of the ignition timing;

FIG. 51 is a diagram showing a variation of a control algorithm for the first ACTASS controller;

FIG. 52 is a diagram showing a variation of a control algorithm for the second ACTASS controller.

BEST MODE FOR CARRYING OUT THE INVENTION

Figure 2:
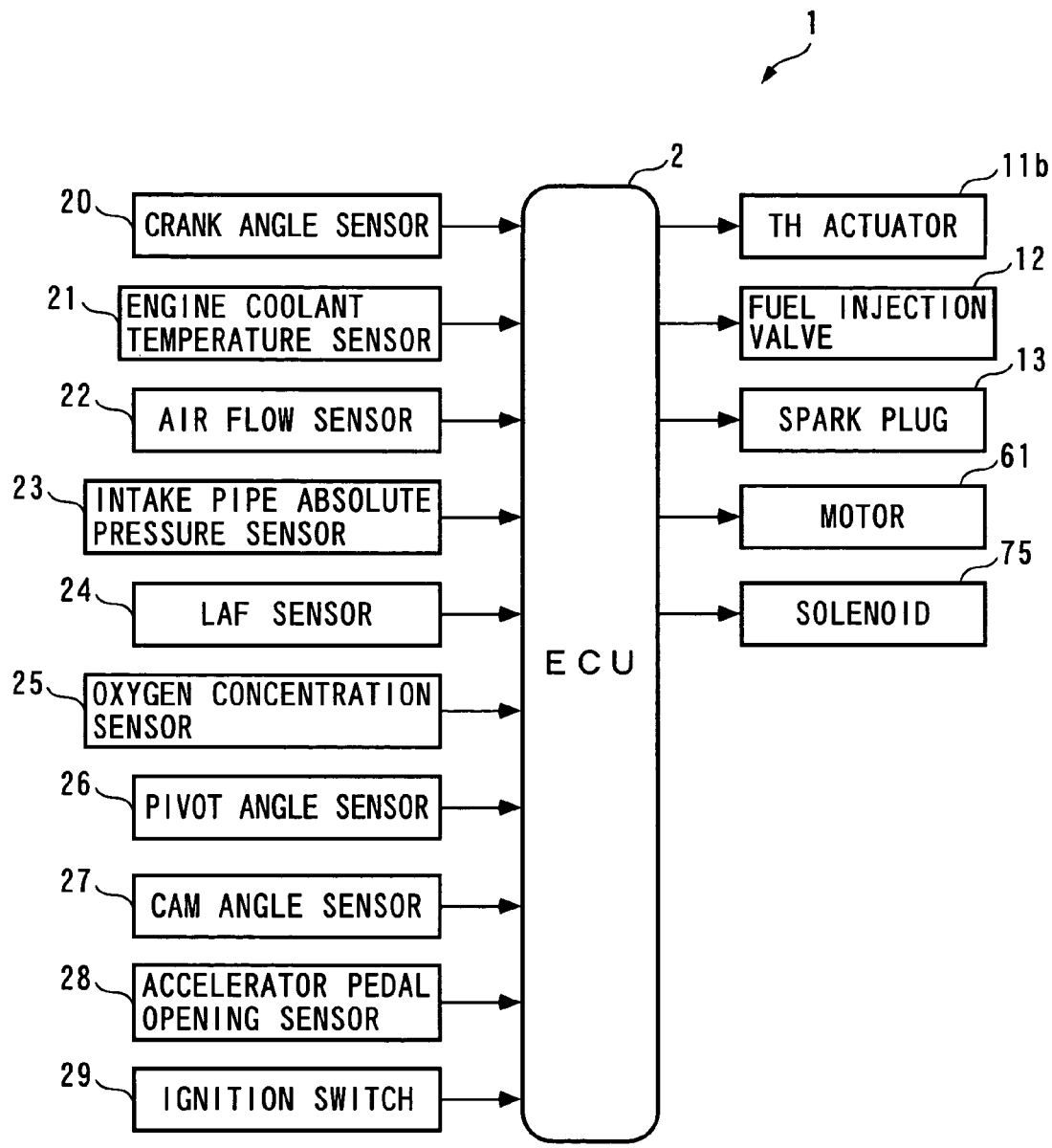
FIG. 2 is a block diagram schematically showing the configuration of the intake air amount control system.

Hereafter, an intake air amount control system for an internal combustion engine, according to an embodiment of the present invention will be described with reference to the drawings. The intake air amount control system 1 includes an ECU 2, as shown in FIG. 2. As described hereinafter, the ECU 2 carries out control processes, including an intake air amount control process, depending on operating conditions of the internal combustion engine (hereinafter simply referred to as "the engine") 3.

Figure 1:
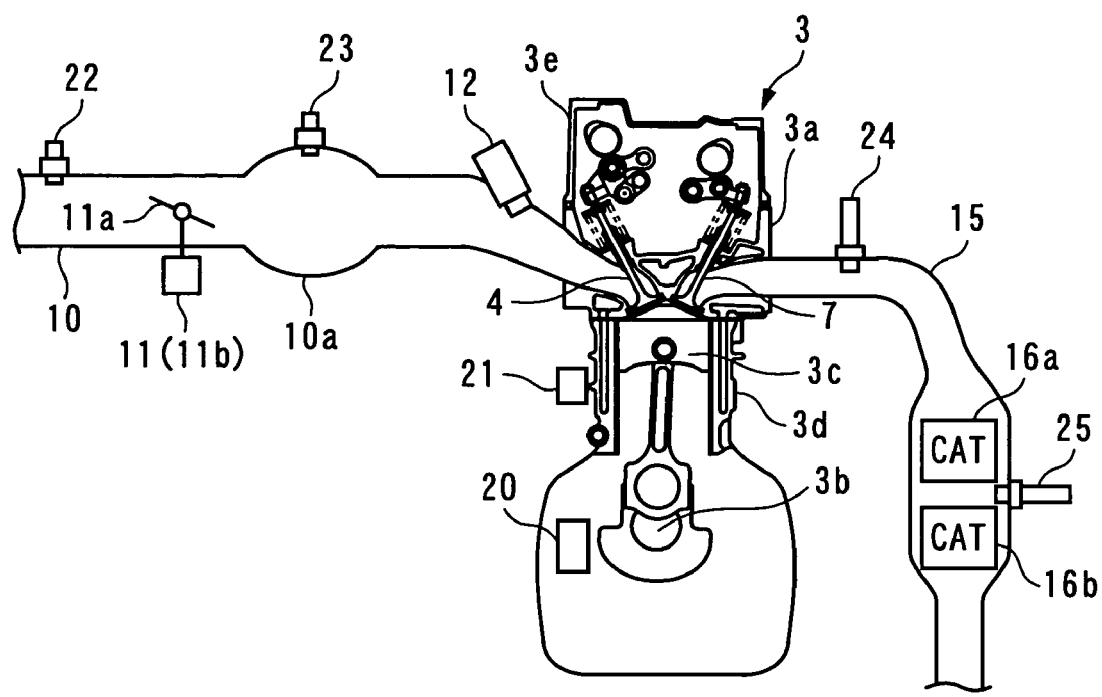
FIG. 1 is a diagram schematically showing the arrangement of an internal combustion engine to which is applied an intake air amount control system according to an embodiment of the present invention.
Figure 3:
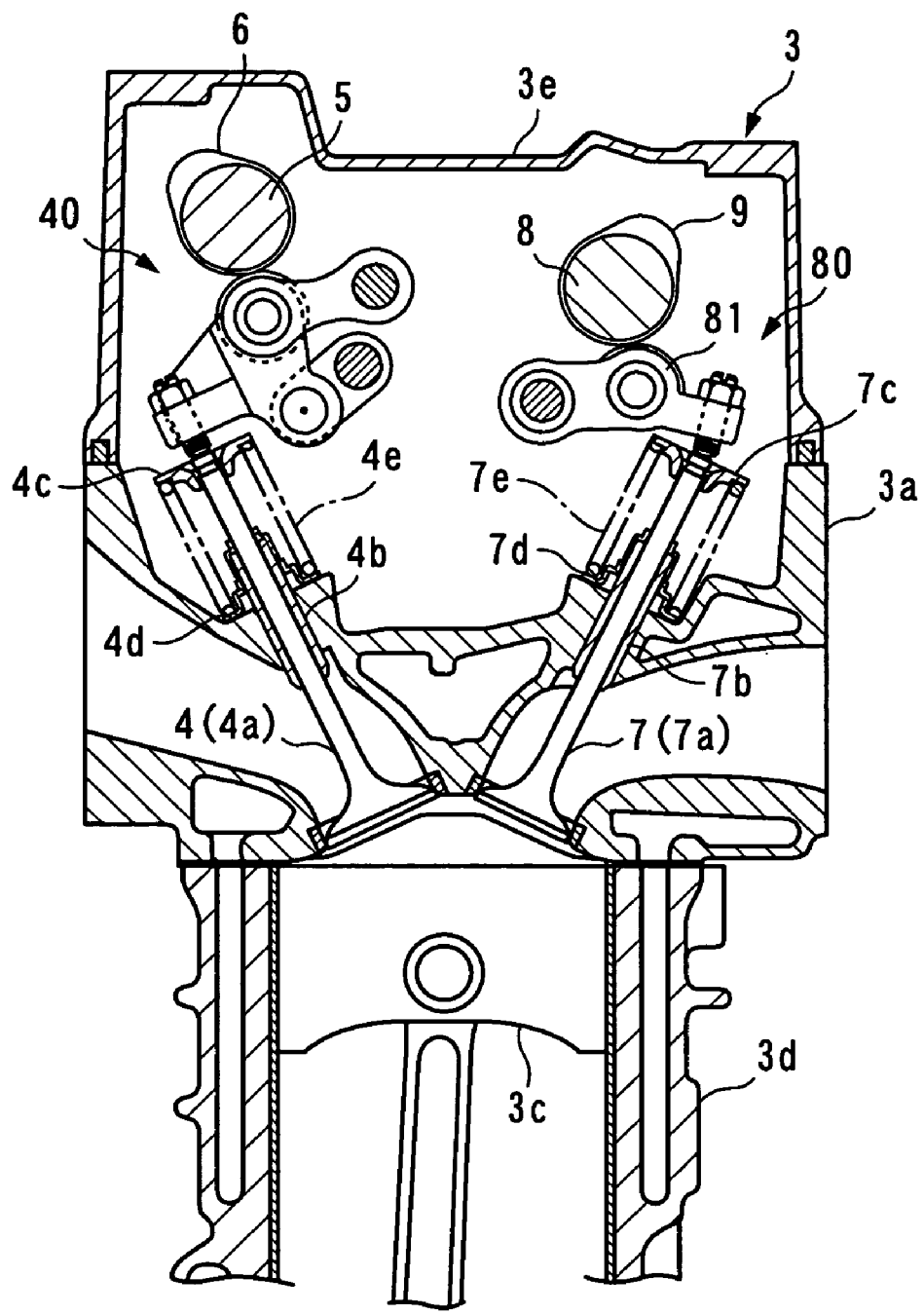
FIG. 3 is a cross-sectional view schematically showing the arrangement of a variable intake valve-actuating mechanism and an exhaust valve-actuating mechanism of the engine.

The engine 3 is an in-line four-cylinder gasoline engine (only one cylinder is shown) installed on a vehicle, not shown. Referring to FIGS. 1 and 3, the engine 3 includes an intake valve 4 and an exhaust valve 7 provided for each cylinder, for opening and closing an intake port and an exhaust port thereof, respectively, an intake camshaft 5 and intake cams 6 for actuating the intake valves 4, a variable intake valve-actuating mechanism 40 that actuates the intake valves 4 to open and close the same, an exhaust camshaft 8 and exhaust cams 9 for actuating the exhaust valves 7, an exhaust valve-actuating mechanism 80 that actuates the exhaust valves 7 to open and close the same, and so forth.

Figure 4:
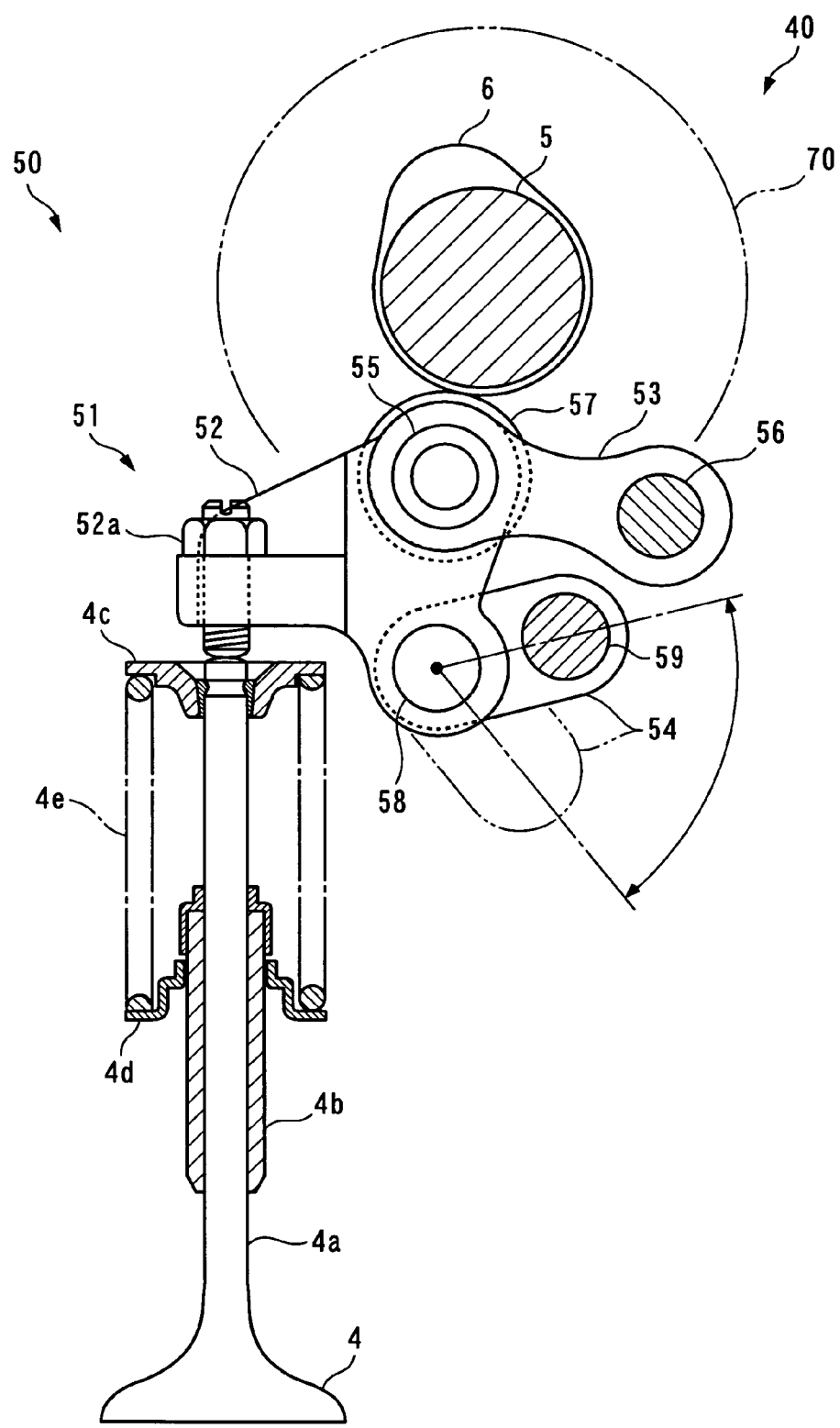
FIG. 4 is a cross-sectional view schematically showing the construction of a variable valve lift mechanism of the variable intake valve-actuating mechanism.

The intake valve 4 has a stem 4a thereof slidably fitted in a guide 4b. The guide 4b is rigidly fixed to a cylinder head 3a. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3a via holders, not shown. The intake camshaft 5 has a sprocket 5a (see FIG. 9) coaxially and rotatably fitted thereon. The sprocket 5a is connected to a crankshaft 3b via a timing belt, not shown, and connected to the intake camshaft 5 via a variable cam phase mechanism 70, described hereinafter. With the above configuration, the intake camshaft 5 performs one rotation per two rotations of the crankshaft 3b. Further, the intake cam 6 is provided on the intake camshaft 5 for each cylinder such that the intake cam 6 rotates in unison with the intake camshaft 5.

Furthermore, the variable intake valve-actuating mechanism 40 is provided for actuating the intake valve 4 of each cylinder so as to open and close the same, in accordance with rotation of the intake camshaft 5, and changing the lift and the valve timings of the intake valve 4, which will be described in detail hereinafter. It should be noted that in the present embodiment, "the lift of the intake valve 4" represents the maximum lift of the intake valve 4.

On the other hand, the exhaust valve 7 has a stem 7a thereof slidably fitted in a guide 7b. The guide 7b is rigidly fixed to the cylinder head 3a. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has a sprocket (not shown) integrally formed therewith, and is connected to the crankshaft 3b by the sprocket and a timing belt, not shown, whereby the exhaust camshaft 8 performs one rotation per two rotations of the crankshaft 3b. Further, the exhaust cam 9 is provided on the exhaust camshaft 8 for each cylinder such that the exhaust cam 9 rotates in unison with the exhaust camshaft 8.

Further, the exhaust valve-actuating mechanism 80 includes exhaust rocker arms 81. Each exhaust rocker arms 81 is pivotally moved in accordance with rotation of the associated exhaust cam 9 to thereby actuate the exhaust valve 7 for opening and closing the same against the urging force of the valve spring 7e.

On the other hand, the engine 3 is provided with a crank angle sensor 20 and an engine coolant temperature sensor 21. The crank angle sensor 20 delivers a CRK signal and a TDC signal, which are both pulse signals, to the ECU 2 in accordance with rotation of the crankshaft 3b. Each pulse of the CRK signal is generated whenever the crankshaft 3b rotates through a predetermined angle (e.g. 30 degrees). The ECU 2 calculates the rotational speed NE of the engine 3 (hereinafter referred to as "the engine speed NE") based on the CRK signal. Further, the TDC signal indicates that each piston 3c in the associated cylinder is in a predetermined crank angle position slightly before the TDC position at the start of the intake stroke, and each pulse of the TDC signal is generated whenever the crankshaft 3b rotates through a predetermined crank angle. It should be noted that in the present embodiment, the engine speed NE corresponds to a load parameter and a first load parameter.

On the other hand, the engine coolant temperature sensor 21 is implemented e.g. by a thermistor mounted in a cylinder block 3d of the engine 3, and detects an engine coolant temperature TW, which is the temperature of an engine coolant circulating through the cylinder block 3d of the engine 3, to deliver a signal indicative of the sensed engine coolant temperature TW to the ECU 2.

Further, in an intake pipe 10 of the engine 3, there are arranged an air flow sensor 22, a throttle valve mechanism 11, an intake pipe absolute pressure sensor 23, a fuel injection valve 12, and so forth, from upstream to downstream in the mentioned order at respective locations of the intake pipe 10.

The air flow sensor 22 (intake air amount-detecting means) is formed by a hot-wire air flow meter, for detecting an amount Gth of intake air (hereinafter referred to as "the TH passing intake air amount Gth") flowing through the throttle valve 11a, described hereinafter, and delivering a signal indicative of the sensed TH passing intake air amount Gth to the ECU 2.

The throttle valve mechanism 11 includes a throttle valve 11a, and a TH actuator 11b that actuates the throttle valve 11a to open and close the same. The throttle valve 11a is pivotally disposed across an intermediate portion of the intake pipe 10 such that the degree of opening thereof is changed by the pivotal motion thereof to thereby change the TH passing intake air amount Gth. The TH actuator 11b is implemented by a combination of a motor, not shown, connected to the ECU 2, and a gear mechanism, not shown, and driven by a control input from the ECU 2 to thereby change the degree of opening of the throttle valve 11a.

The ECU 2 holds the throttle valve 11a in a fully-open state during normal operation of the engine 3, and controls the degree of opening of the throttle valve 11a when the variable intake valve-actuating mechanism 40 is faulty, or when negative pressure is supplied to a master back (not shown).

Further, a portion of the intake pipe 10 downstream of the throttle valve 11a forms a surge tank 10a into which is inserted an intake pipe absolute pressure sensor 23. The intake pipe absolute pressure sensor 23 (intake air amount-detecting means) is implemented e.g. by a semiconductor pressure sensor, and detects an absolute pressure PBA in the intake pipe 10 (hereinafter referred to as "the intake pipe absolute pressure PBA"), to deliver a signal indicative of the sensed intake pipe absolute pressure PBA to the ECU 2.

The fuel injection valve 12 is driven by an input signal indicative of a fuel injection amount TOUT, supplied from the ECU 2, and injects fuel into the intake pipe 10.

On the other hand, arranged in the exhaust pipe 15 of the engine 3 are a first catalytic device 16a and a second catalytic device 16b from upstream to downstream in the mentioned order at respective locations of the exhaust pipe 15. NOx, HC, CO, and so forth in exhaust gases are reduced by the catalytic devices 16a and 16b.

An oxygen concentration sensor (hereinafter referred to as "the O2 sensor") 25 is inserted into the exhaust pipe 15 between the first and second catalytic devices 16a and 16b. The O2 sensor 25 is comprised of a zirconia layer and platinum electrodes, and detects the concentration of oxygen contained in exhaust gases downstream of the first catalytic device 16a, to deliver a signal indicative of the detected oxygen concentration to the ECU 2.

Further, a LAF sensor 24 is mounted at a location upstream of the first catalytic device 16a of the exhaust pipe 15. The LAF sensor 24 is formed by combining a sensor similar to the O2 sensor 25 and a detection circuit, such as a linearizer, and detects the concentration of oxygen contained in exhaust gases linearly over a wide range of the air-fuel ratio ranging from a rich region to a lean region, thereby delivering a detection signal proportional to the sensed oxygen concentration to the ECU 2. The ECU 2 carries out air-fuel ratio control based on the detection signals delivered from the LAF sensor 24 and the O2 sensor 25.

Furthermore, spark plugs 13 (see FIG. 2) are mounted through respective cylinder heads 3e of the engine 3. Each spark plug 13 is connected to the ECU 2. When the spark plug 13 has a high voltage applied thereto based on a signal from the ECU 2 in timing corresponding to ignition timing Iglog, the spark plug 13 causes a spark discharge, thereby burning a mixture within a combustion chamber.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 is provided for actuating the intake valves 4 to open and close the same, in accordance with rotation of the intake camshaft 5, and continuously changing the valve lift Liftin within a predetermined range (between a maximum value Liftinmax and a minimum value Liftinmin, described hereinafter). The variable valve lift mechanism 50 is comprised of rocker arm mechanisms 51 of a four joint link type, provided for the respective cylinders, and a lift actuator 60 simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When intake valve 4 is in a closed state, the adjusting bolt 52a has a predetermined valve clearance between a lower end face thereof and an upper end face of the stem 4a of the intake valve 4, and when the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection pin 59 pivotally mounted thereto. The lower link 54 is connected to a short arm 65, described hereinafter, of the lift actuator 60 by the connection pin 59.

Figure 5:
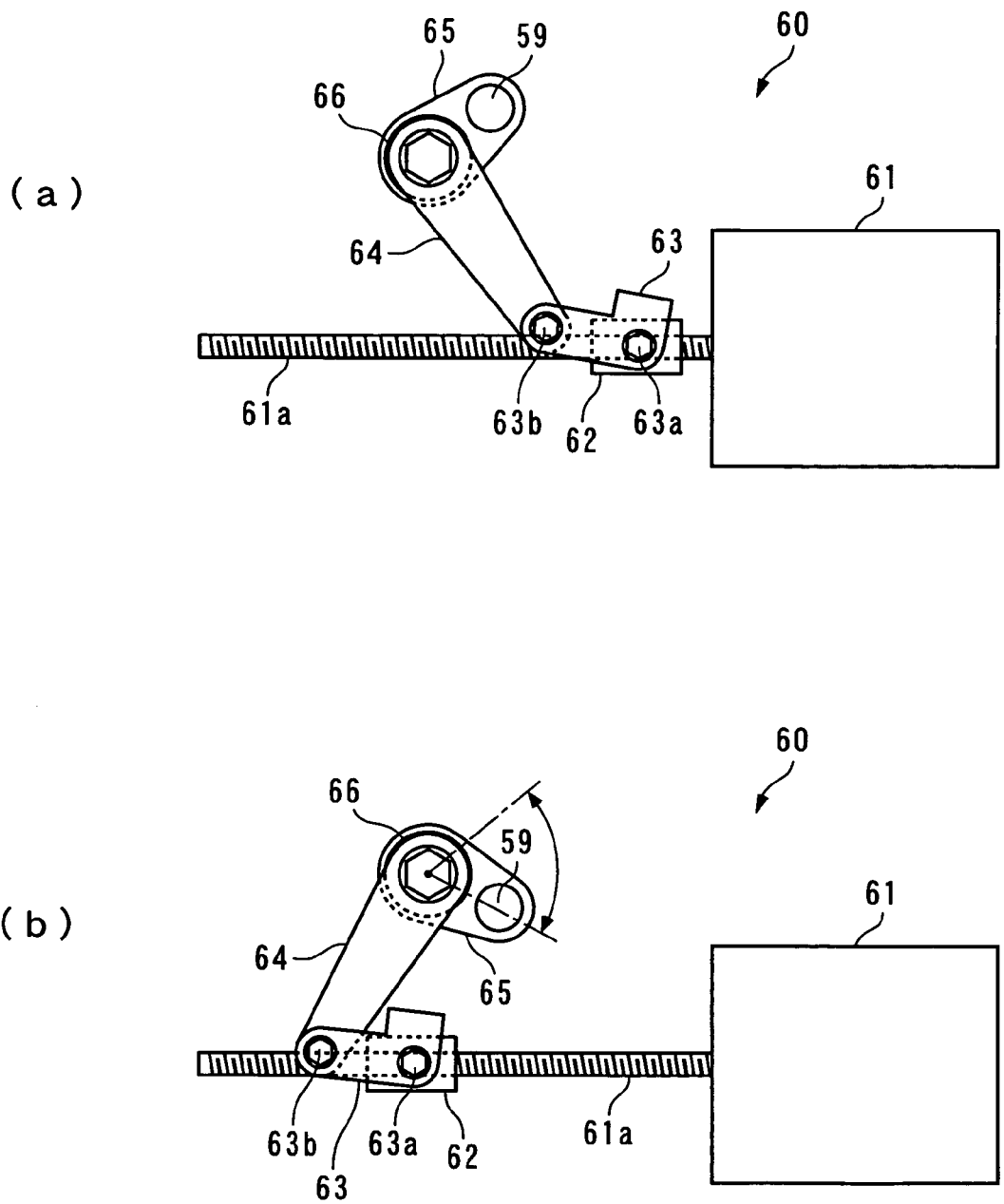
FIG. 5(a) is a diagram showing a lift actuator in a state in which a short arm thereof is in a maximum lift position.
FIG. 5(b) is a diagram showing the lift actuator in a state in which the short arm thereof is in a minimum lift position.

On the other hand, as shown in FIG. 5, the lift actuator 60 is comprised of a motor 61, a nut 62, a link 63, a long arm 64, and the short arm 65. The motor 61 is connected to the ECU 2 (see FIG. 2), and disposed outside a head cover 3e of the engine 3. The rotational shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross-section, and extends through the head cover 3e of the engine 3 such that it is pivotally supported by the head cover 3e. The long arm 64 and the short arm 65 are pivotally moved in unison with the pivot shaft 66 in accordance with pivotal motion of the pivot shaft 66.

Furthermore, the aforementioned connection pin 59 pivotally extends through the other end of the short arm 65, whereby the short arm 65 is connected to the lower link 54 by the connection pin 59.

Next, a description will be given of the operation of the variable valve lift mechanism 50 configured as above. In the variable valve lift mechanism 50, when a lift control input Uliftin, described hereinafter, is input from the ECU 2 to the motor 61 of the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

In the process, under the feedback control of the ECU 2, the range of pivotal motion of the short arm 65 is restricted between a maximum lift position shown in FIG. 5(a) and a minimum lift position shown in FIG. 5(b), whereby the range of pivotal motion of the lower link 54 is also restricted between a maximum lift position indicated by a solid line in FIG. 4 and a minimum lift position indicated by a two-dot chain line in FIG. 4.

The four joint link formed by the rocker arm shaft 56, the upper and lower pins 55 and 58, and the connection pin 59 is configured such that when the lower link 54 is in the maximum lift position, the distance between the center of the upper pin 55 and the center of the lower pin 58 becomes shorter than the distance between the center of the rocker arm shaft 56 and the center of the connection pin 59, whereby as shown in FIG. 6, when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes longer than the distance between the center of the rocker arm shaft 56 and the center of the connection pin 59, whereby as shown in FIGS. 7(a) and 7(b), when the intake cam 6 rotates, the amount of movement of the adjusting bolt 52a becomes smaller than the amount of movement of the contact point where the intake cam 6 and the roller 57 are in contact with each other.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 8, and the valve lift Liftin assumes its maximum value Liftinmax. On the other hand, when the lower link 54 is in the minimum lift position, the intake valve 4 is opened according to a valve lift curve indicated by a two-dot chain line in FIG. 8, and the valve lift Liftin assumes its minimum value Liftinmin. It should be noted that in FIG. 8, the horizontal axis represents the cam phase which is the rotational angle of the intake camshaft 5.

Figure 8:
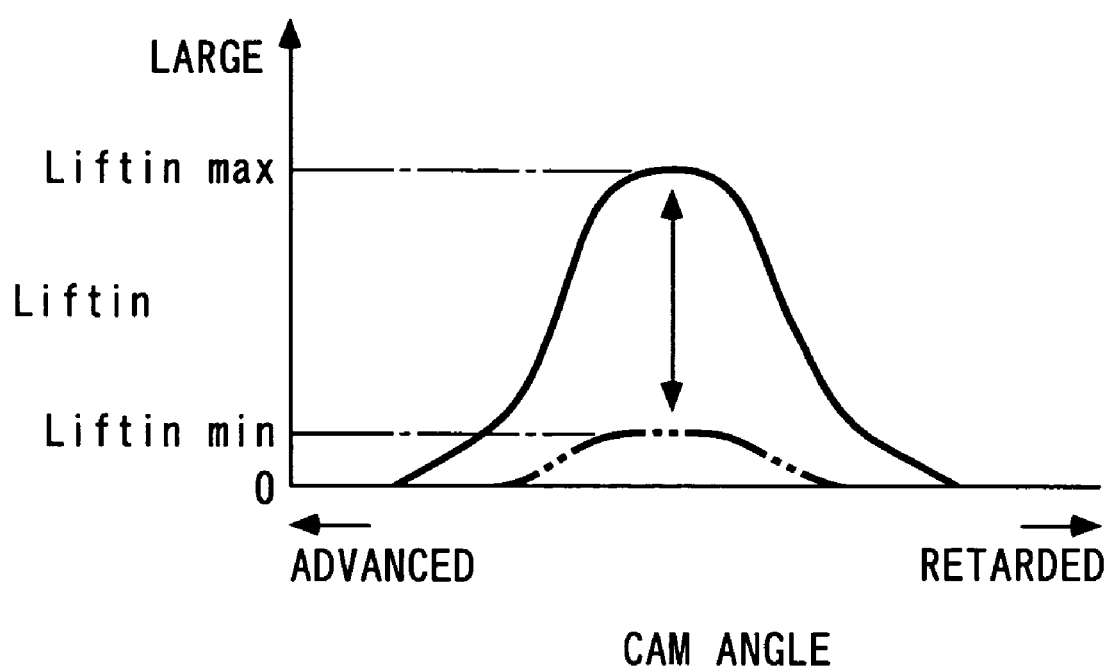
FIG. 8 is a diagram showing a valve lift curve which the valve lift of the intake valve assumes when the lower link of the variable valve lift mechanism is in the maximum lift position, and a valve lift curve which the valve lift of the intake valve assumes when the lower link of the variable valve lift mechanism is in the minimum lift position.

Therefore, in the variable valve lift mechanism 50, the lower link 54 is pivotally moved by the motor 61 between the maximum lift position and the minimum lift position, whereby it is possible to continuously change the valve lift Liftin of the intake valve 4 between the maximum value Liftinmax and the minimum value Liftinmin. It should be noted that as shown in FIG. 8, the valve-opening timing of the intake valve 4 becomes more retarded when the valve lift Liftin assumes its minimum value Liftinmin than when it assumes its maximum value Liftinmax. This is because the gradient of rise of the valve lift curve becomes smaller as the valve lift Liftin is smaller, so that the start of opening of the intake valve 4 is retarded by the influence of the valve clearance.

The engine 3 is provided with a pivot angle sensor 26 (see FIG. 2). The pivot angle sensor 26 detects a pivot angle of the pivot shaft 66, i.e. the short arm 65, and delivers a signal indicative of the sensed pivot angle to the ECU 2. The ECU 2 calculates the valve lift Liftin of the intake valve 4 based on the signal output from pivot angle sensor 25.

Figure 9:
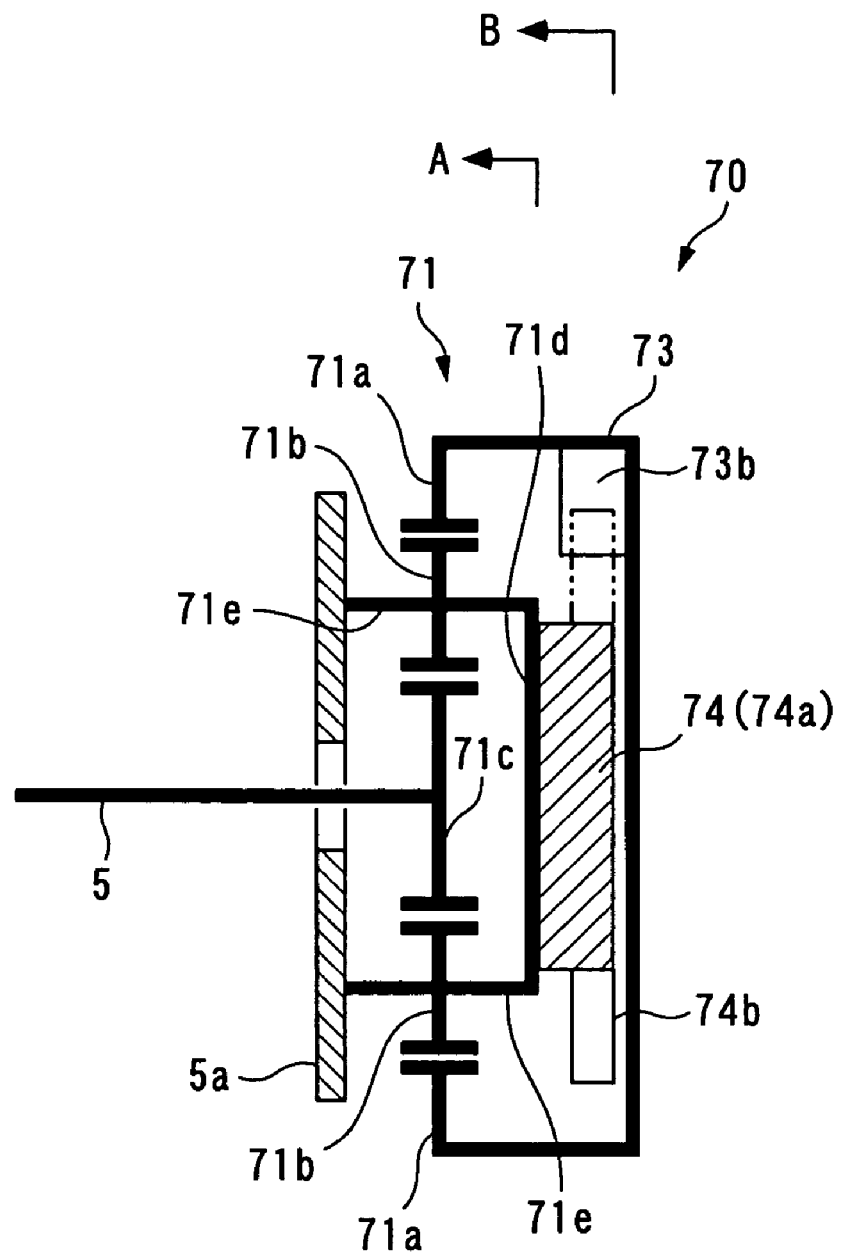
FIG. 9 is a cross-sectional view schematically showing the arrangement of a variable cam phase mechanism.
Figure 10:
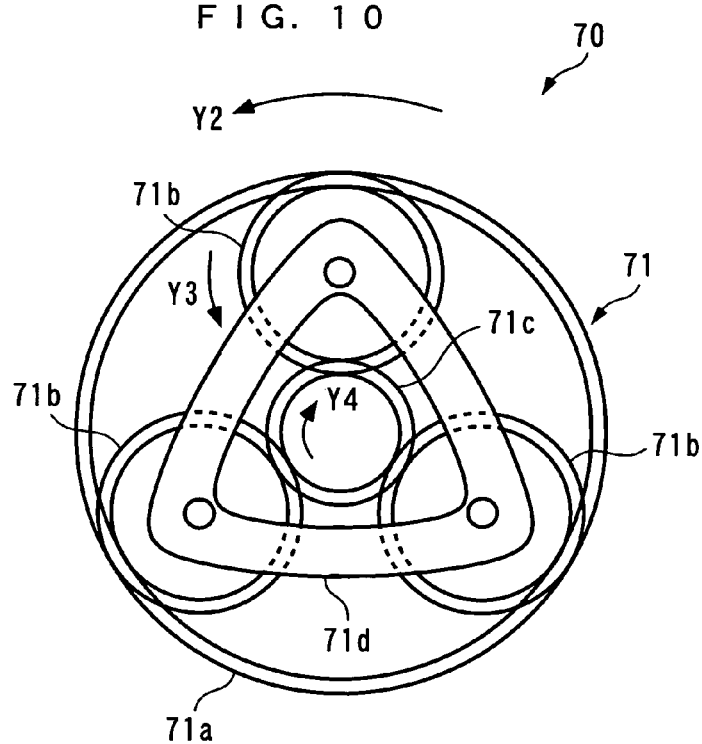
FIG. 10 is a schematic diagram of a planetary gear unit taken on line A-A of FIG. 9.
Figure 11:
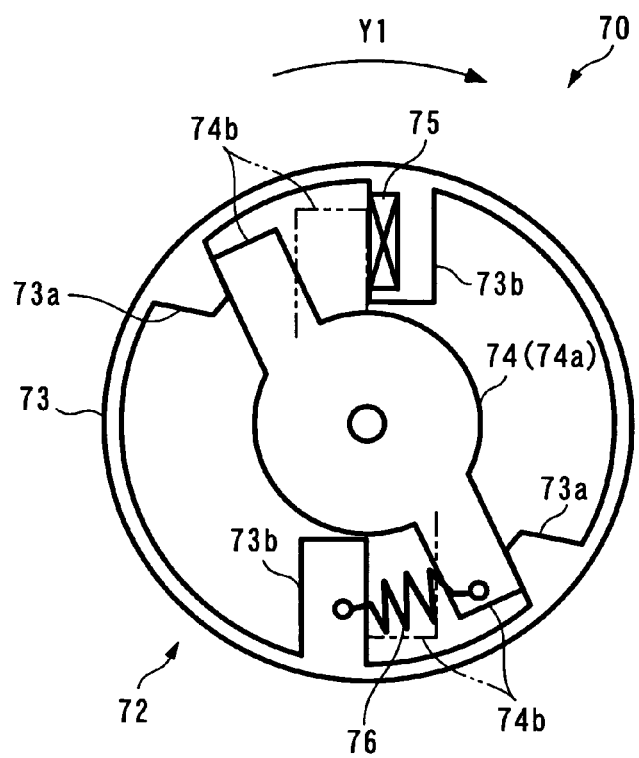
FIG. 11 is a schematic diagram of an electromagnetic brake taken on line B-B of FIG. 9.

Next, a description will be given of the aforementioned variable cam phase mechanism 70. The variable cam phase mechanism 70 is of an electromagnetic type, and as described hereinbelow, provided for continuously changing a phase Cain of the intake cam 6, i.e. the intake camshaft 5, with respect to the crankshaft 3b (hereinafter referred to as "the cam phase Cain") within a predetermined range (range between a most retarded value Cainrt and a most advanced value Cainad, described hereinafter) by an electromagnetic force Fsol, to thereby continuously change the valve timing of the intake valve 4. As shown in FIGS. 9 to 11, the variable cam phase mechanism 70 includes a planetary gear unit 71 and an electromagnetic brake 72.

The planetary gear unit 71 transmits rotation between the intake camshaft 5 and the sprocket 5a, and is comprised of a ring gear 71a, three planetary pinion gears 71b, a sun gear 71c, and a planetary carrier 71d. The ring gear 71a is connected to an outer casing 73, referred to hereinafter, of the electromagnetic brake 72, and rotated coaxially in unison with the outer casing 73. Further, the sun gear 71c is coaxially attached to a foremost end of the intake camshaft 5 for rotation in unison therewith.

On the other hand, the planetary carrier 71d has a generally triangular shape in cross-section, and includes shafts 71e protruding from the three corners thereof. The planetary carrier 71d is connected to the sprocket 5a via these shafts 71e, such that it rotates coaxially in unison with the sprocket 5a.

Further, each planetary pinion gear 71b is rotatably supported on an associated one of the shafts 71e of the planetary carrier 71d, and is disposed between the sung gear 71c and the ring gear 71a, in constant mesh with these gears.

Further, the electromagnetic brake 72, referred to hereinbefore, is comprised of an outer casing 73, a core 74, a solenoid 75, and a return spring 76. The outer casing 73 is formed to be hollow, and the core 74 is disposed therein in a manner rotatable relative to the outer casing 73. The core 74 is comprised of a root portion 74a circular in cross-section, and two arms 74b and 74b extending radially from the root portion 74a. The core 74 has its root portion 74a mounted on the planetary carrier 71d for coaxial rotation in unison with the planetary carrier 71d.

On the other hand, on the inner peripheral surface of the outer casing 73, there are provided two pairs of stoppers 73a and 73b, at spaced intervals, each pair formed by a stopper 73a defining the most retarded position and a stopper 73b defining the most advanced position. The arms 74b of the core 74 are disposed between the respective pairs of stoppers 73a and 73b, whereby the core 74 is rotatable relative to the outer casing 73 between the most retarded position (indicated by solid lines in FIG. 11) in which the arms 74b are brought into contact with the most retarded position stoppers 73a and stopped thereat, and the most advanced position (indicated by two-dot chain lines in FIG. 11) in which the arms 74b are brought into contact with the most advanced position stoppers 73b and stopped thereat.

Further, the return spring 76 is interposed in a compressed state between one of the most advanced position stoppers 73b and the opposed one of the arms 74b, and the urging force of the return spring 76 urges the arms 74b toward the most retarded position stoppers 73a.

On the other hand, the solenoid 75 is attached to one of the most advanced position stoppers 73b on a side opposite to the return spring 76, such that it is flush with an end of the most advanced position stopper 73b opposed to the arm 74b. The solenoid 75 is electrically connected to the ECU 2, and when the solenoid 75 is energized by a phase control input Ucain (voltage signal) from the ECU 2, the electromagnetic force Fsol thereof attracts the opposed one of the arms 74b against the urging force of the return spring 76 to pivotally move the same toward the most advanced position stopper 73b.

A description will be given of the operation of the variable cam phase mechanism 70 constructed as described above. In the variable cam phase mechanism 70, when the solenoid 75 of the electromagnetic brake 72 is not energized, the core 74 is held by the urging force of the return spring 76 at the most retarded position in which the arm 74b abuts the most retarded position stopper 73a, whereby the cam phase Cain is held at the most retarded value Cainrt (see FIG. 12).

In this state, as the sprocket 5a rotates in a direction indicated by an arrow Y1 in FIG. 11, the planetary carrier 71d and the ring gear 71a rotate in unison therewith, whereby the planetary pinion gears 71b are inhibited from rotation but the sun gear 71c rotates in unison with the planetary carrier 71d and the ring gear 71a. That is, the sprocket 5a and the intake camshaft 5 rotate in unison.

Further, in a state in which the core 74 is held at the most retarded position, if the solenoid 75 is energized by the phase control input Ucain from the ECU 2, the arm 74b of the core 74 is attracted by the electromagnetic force Fsol of the solenoid 75 toward the most advanced position stopper 73b, i.e. toward the most advanced position, against the urging force of the return spring 76, to be pivotally moved to a position where the electromagnetic force Fsol and the urging force are balanced with each other. In other words, the outer casing 73 rotates relative to the core 74 in a direction opposite to the direction indicated by the arrow Y1.

This causes the ring gear 71a to rotate relative to the planetary carrier 71d in a direction indicated by an arrow Y2 in FIG. 10, and along therewith, the planetary pinion gears 71b rotate in a direction indicated by an arrow Y3 in FIG. 10, whereby the sun gear 71c rotates in a direction indicated by an arrow Y4 in FIG. 10. As a result, the intake camshaft 5 rotates relative to the sprocket 5a in the direction of the rotation of the sprocket 5a (i.e. a direction opposite to the direction indicated by the arrow Y2 in FIG. 10), whereby the cam phase Cain is advanced.

In this case, the pivotal motion of the outer casing 73 is transmitted to the intake camshaft 5 via the ring gear 71a, the planetary pinion gears 71b, and the sun gear 71c, and therefore the speed-increasing action of the planetary gear unit 70 causes the intake camshaft 5 to rotate relative to the sprocket 5a by an amplified or increased amount of angle of rotation of the outer casing 73. That is, the amount of advance of the cam phase Cain of the intake cam 6 is configured to be equal to an amplified value of angle of rotation of the outer casing 73. This is because the electromagnetic force Fsol of the solenoid 75 has a limit beyond which it is not effective, and hence it is necessary to cause the cam phase Cain to vary through a wider range by compensating for the limit.

Figure 12:
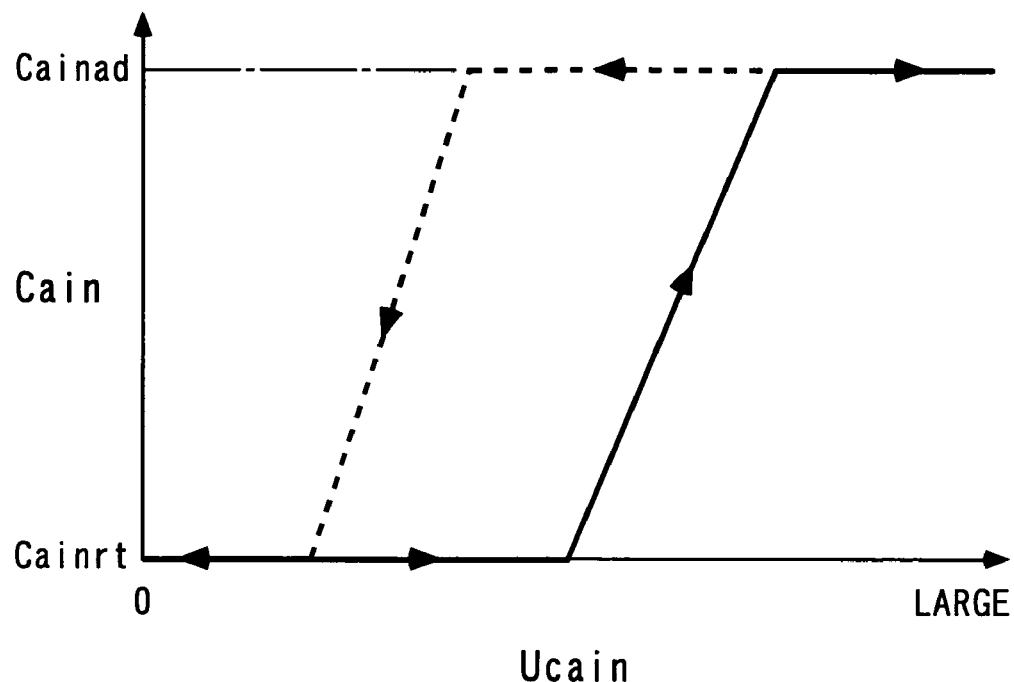
FIG. 12 is a characteristic curve indicative of an operating characteristic of the variable cam phase mechanism.
Figure 13:
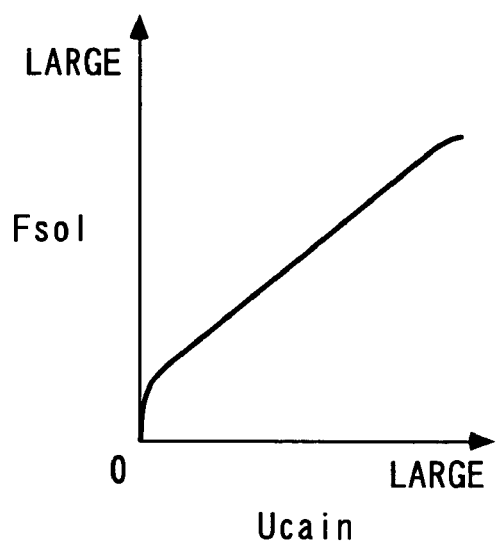
FIG. 13 is a characteristic curve indicative of an operating characteristic of a solenoid of the variable cam phase mechanism.

During the above-described operation of the variable cam phase mechanism 70, as shown in FIG. 12, the cam phase Cain is continuously varied by the phase control input Ucain to the solenoid 75 between the most retarded value Cainrt (0°) and the most advanced value Cainad (e.g. 55°), and a solid curve indicative of values of the cam phase Cain assumed when the phase control input Ucain is increasing, and a broken line indicative of values of the cam phase assumed when the phase control input Ucain is decreasing are different from each other, i.e. the cam phase Cain exhibits a hysteresis characteristic. This is due to the fact that the solenoid 75 has the characteristic that the electromagnetic force Fsol generated by the solenoid 75 is slow in rising when the solenoid 75 is energized by the phase control input Ucain at the start of operation thereof, as shown in FIG. 13.

Figure 14:
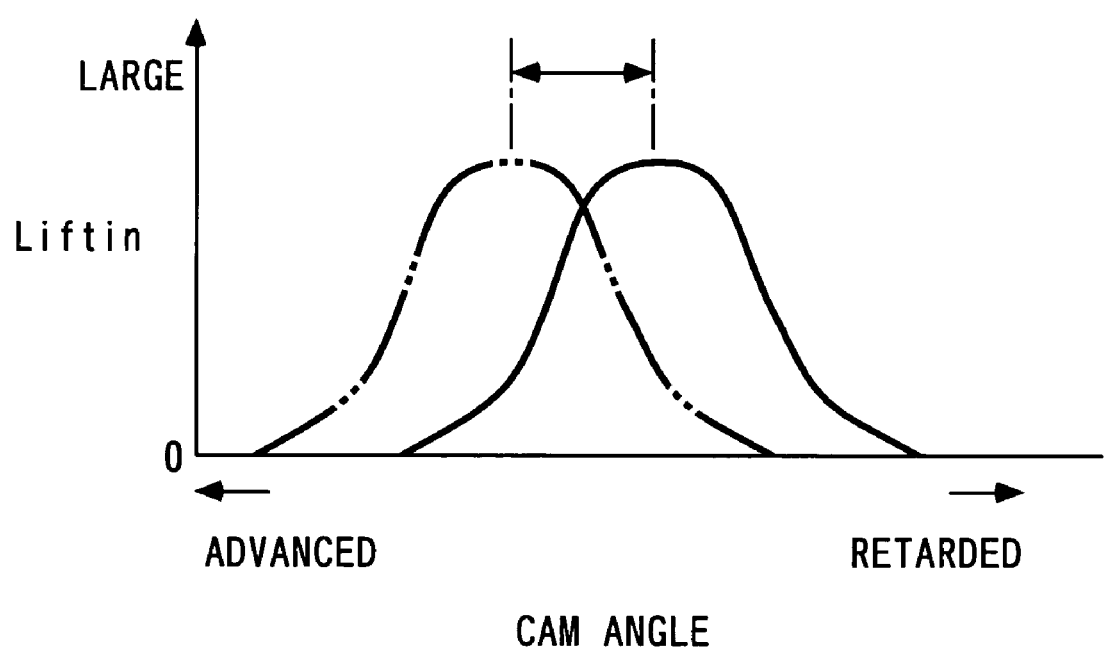
FIG. 14 is a diagram showing an example of a cam phase-changing operation carried out by the variable cam phase mechanism.

Further, as described hereinabove, the cam phase Cain is continuously varied between the most retarded value Cainrt and the most advanced value Cainad, whereby the valve timings of the intake valve 4 are steplessly varied between the most retarded timing indicated by a solid line in FIG. 14 and the most advanced timing indicated by a two-dot chain line in FIG. 14.

It should be noted that the reason for using, in the present embodiment, the variable cam phase mechanism 70 described above in place of the conventional hydraulic variable cam phase mechanism is as follows: The conventional hydraulic variable cam phase mechanism has characteristics that it takes time before an oil pressure pump is started, and the hydraulic pressure is thereby sufficiently increased to make the cam phase Cain controllable; the response of the mechanism is degraded when the oil temperature is very low; dead time is long; and responsiveness is low. In contrast, the variable cam phase mechanism 70 used in the present embodiment is advantageous in that it is neither required to wait for the hydraulic pressure to rise nor affected by oil temperature, but is capable of properly controlling the cam phase Cain from the start thereof, and further is short in dead time and ensures higher responsiveness. The variable cam phase mechanism 30 is used to make use of these advantages.

As described above, in the variable intake valve-actuating mechanism 40 used in the present embodiment, the valve lift Liftin of the intake valve 4 is continuously changed by the variable valve lift mechanism 50, and the cam phase Cain, i.e. the valve timing of the intake valve 4 is continuously changed by the variable cam phase mechanism 70. Further, as described hereinafter, the valve lift Liftin and the cam phase Cain are controlled by the ECU 2 via the variable valve lift mechanism 50 and the variable cam phase mechanism 70, respectively. For execution of the control, the variable intake valve-actuating mechanism 40 is configured such that e.g. even when the valve lift Liftin is controlled to its maximum value Liftinmax and the cam phase Cain is controlled to the most retarded value Cainrt, the intake valve 4 is opened in timing before the TDC position at the start of the intake stroke.

On the other hand, a cam angle sensor 27 (see FIG. 2) is disposed at an end of the intake camshaft 5 opposite from the variable cam phase mechanism 70. The cam angle sensor 27 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal described above.

Furthermore, as shown in FIG. 2, connected to the ECU 2 are an accelerator pedal opening sensor 28, and an ignition switch (hereinafter referred to as "the IG·SW") 29. The accelerator pedal opening sensor 28 detects an opening or stepped-on amount of an accelerator pedal, not shown, (hereinafter referred to as "the accelerator pedal opening AP") AP and delivers a signal indicative of the detected accelerator pedal opening AP to the ECU 2. Further, the IG·SW 29 is turned on or off by operation of an ignition key, not shown, and delivers a signal indicative of the ON/OFF state thereof to the ECU 2. It should be noted that in the present embodiment, the accelerator pedal opening AP corresponds to the load parameter and the first load parameter.

The ECU 2 is implemented by a microcomputer including an I/O interface, a CPU, a RAM, a ROM. The ECU 2 determines operating conditions of the engine 3, based on the detection signals delivered from the above-mentioned sensors 20 to 28, the ON/OFF signal from the IG·SW 29, and the like, and controls the intake air amount. More specifically, as will be described in detail hereinafter, the ECU 2 controls the valve lift Liftin and the cam phase Cain via the variable valve lift mechanism 50 and the variable cam phase mechanism 70, respectively, whereby the amount of intake air is controlled.

In general, in the intake air amount control, it is possible to secure higher responsiveness when the valve lift Liftin is controlled than when the cam phase Cain is controlled. In other words, when the cam phase Cain is controlled, the amount of intake air can be controlled more finely by a smaller amount of change, whereby it is possible to secure higher control accuracy than when the valve lift Liftin is controlled. This is due to the following reason:

Referring to FIGS. 15($a$) to 15($c$), when only the valve lift Liftin is changed, the area of a hatched portion in FIG. 15($a$) decreases two-dimensionally as the valve lift Liftin is decreased. It is understood that at this time, the intake air amount is changed in proportion to the area of the hatched portion, and therefore an increase or a decrease in the valve lift Liftin can cause a steep increase or decrease in the intake air amount, thereby making it possible to ensure high responsiveness.

Figure 16:
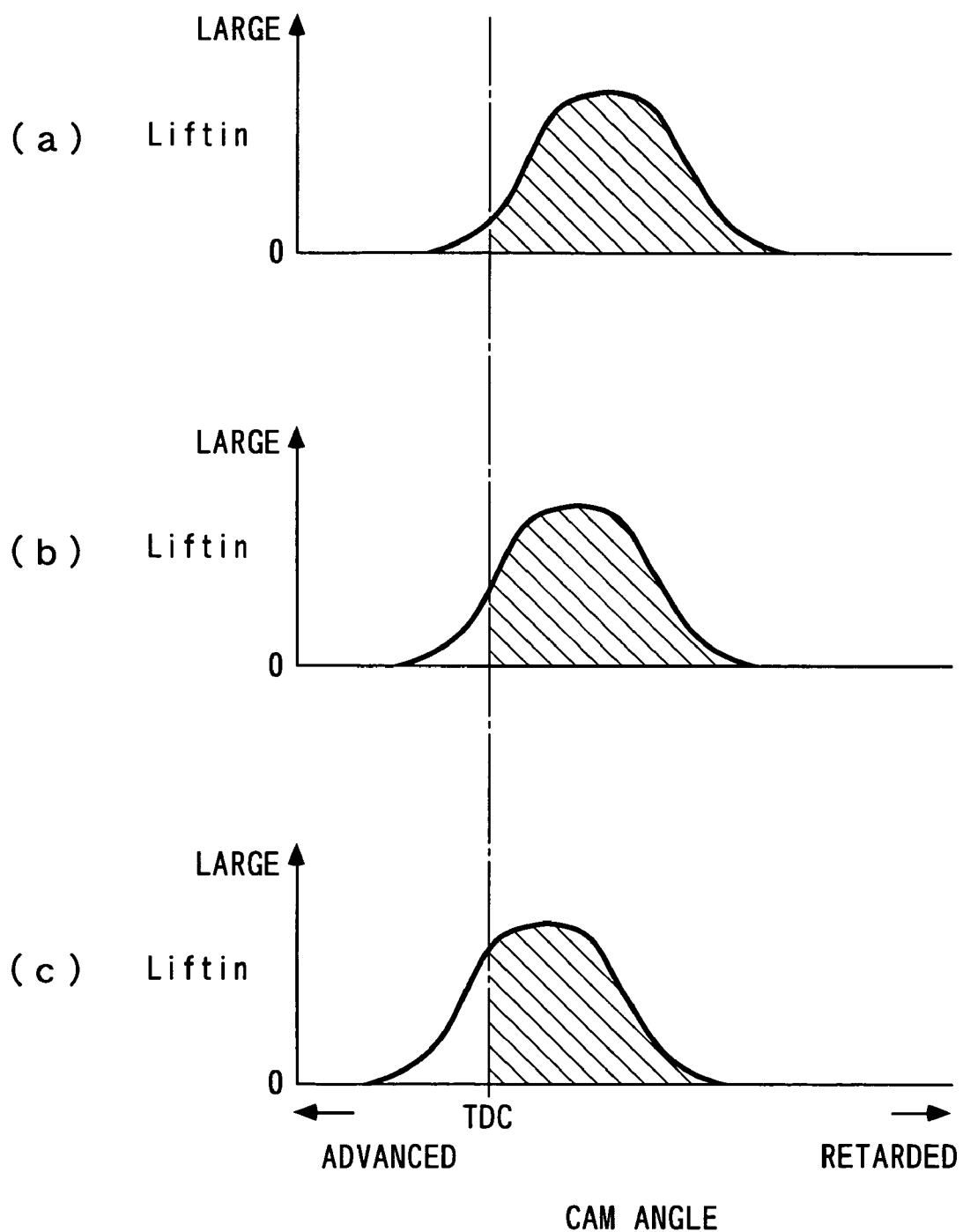
FIG. 16 is a diagram which is useful in explaining changes in the intake air amount caused by changes in the cam phase alone.

On the other hand, as shown in FIGS. 16($a$) to 16($c$), when only the cam phase Cain is changed, the area of a hatched portion in FIG. 16($a$) changes substantially one-dimensionally as the cam phase Cain is advanced. This tendency becomes marked in a state of the valve lift Liftin being very small. At this time, as described hereinabove, the intake air amount changes in proportion to the area of the hatched portion, and therefore it is understood that by advancing and retarding the cam phase Cain, the intake air amount can be finely increased and decreased by a very small amount of change, thereby making it possible to secure high control accuracy.

Therefore, in the intake air amount control according to the present embodiment, for the aforementioned reason, master/slave control in which one of valve lift control and cam phase control is set to a master and the other to a slave is carried out, as described hereinafter. More specifically, in the intake air amount control, when high responsiveness is required, such as in a high-load operating condition of the engine 3, the valve lift control is set to the master, and the cam phase control to the slave, respectively, whereas when high control accuracy is required, such as in a low-load operating condition of the engine 3, the valve lift control is set to the slave, and the cam phase control to the master, respectively.

It should be noted in the following description, a control mode in which the valve lift control is set to the master, and the cam phase control to the slave is referred to as "the lift master mode", whereas a control mode in which the valve lift control is set to the slave, and the cam phase control to the master is referred to as "the phase master mode".

Further, in the present embodiment, the ECU 2 implements target intake air amount-setting means, intake air amount-detecting means, first control value-calculating means, second control value-calculating means, control input-calculating means, first control means, second control means, control selection means, load region-determining means, second load parameter-setting means, cam phase control value-calculating means, and a valve lift control value-calculating means.

Figure 17:
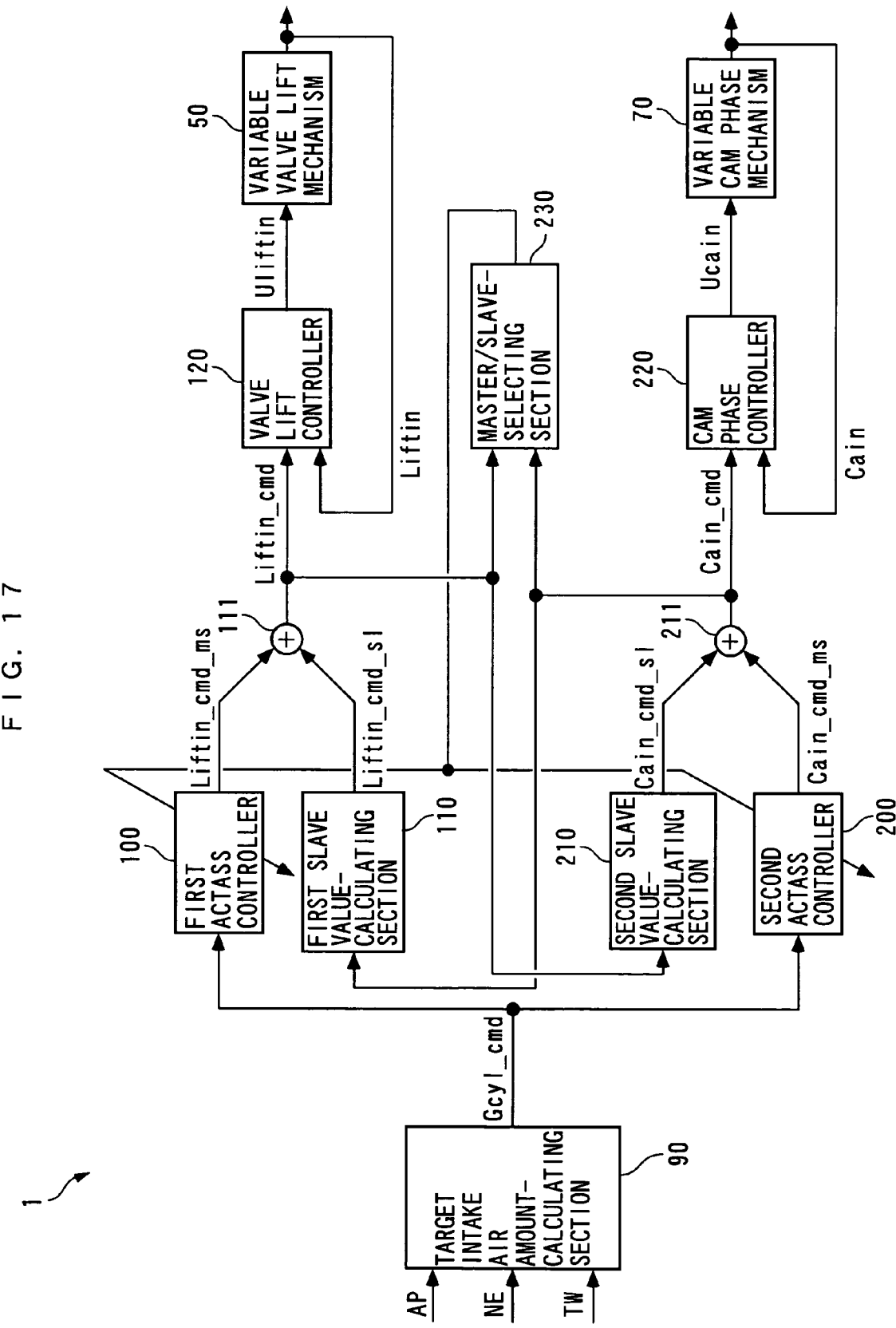
FIG. 17 is a functional block diagram schematically showing the configuration of the intake air amount control system

Next, the intake air amount control system 1 according to the present embodiment will be described with reference to FIG. 17. As shown in the figure, the intake air amount control system 1 is comprised of a target intake air amount-calculating section 90, a first ACTASS controller 100, a first slave value-calculating section 110, a target valve lift-calculating section 111, a valve lift controller 120, a second ACTASS controller 200, a second slave value-calculating section 210, a target cam phase-calculating section 211, a cam phase controller 220, and a master/slave-selecting section 230, all of which are implemented buy the ECU 2.

In the intake air amount control system 1, as described hereinafter, the lift control input Uliftin and the phase control input Ucain are calculated, and the control inputs Uliftin and Ucain are input to the variable valve lift mechanism 50 and the variable cam phase mechanism 70, respectively, whereby an actual intake air amount Gcyl is controlled such that it converges to a target intake air amount Gcyl_cmd.

The actual intake air amount Gcyl is an intake air amount estimated to be actually sucked into the cylinders. More specifically, it is calculated by an equation (1) in FIG. 19. In the equation (1), VB and R represent the internal volume of the intake pipe, and a predetermined gas constant, respectively. Further, in the equation (1), discrete data with a symbol (k) indicates that it is data sampled (or calculated) in synchronism with a predetermined control period ΔT1. The symbol k indicates a position in the sequence of sampling cycles of respective discrete data. For example, the symbol k indicates that discrete data therewith is a value sampled in the current control timing, and a symbol k−1 indicates that discrete data therewith is a value sampled in the immediately preceding control timing. This applies to the following discrete data. It should be noted that in the following description, the symbol (k) and the like provided for the discrete data are omitted as deemed appropriate.

Further, the control period ΔT1 is set to a predetermined value (e.g. 10 msec) capable of properly reflecting the dynamic characteristic of the intake air amount on a plant model [equations (8) and (22)], described hereinafter. Furthermore, in the present embodiment, the control period ΔT1 corresponds to a calculation period for the first and second control value-calculating means.

In the intake air amount control system 1, first, the target intake air amount-calculating section 90 (target intake air amount-setting means) calculates the target intake air amount Gcyl_cmd according to the accelerator pedal opening AP, the engine speed NE, the engine coolant temperature TW, and so forth.

The, the first ACTASS controller 100 (first control value-calculating means, and first control means) calculates a master value Liftin_cmd_ms of the target valve lift with a control algorithm, referred to hereinafter, according to the target intake air amount Gcyl_cmd, and the first slave value-calculating section 110 (second control value-calculating means, and first control means) calculates a slave value Liftin_cmd_sl of the target valve lift by searching a table, referred to hereinafter, according to a target cam phase Cain_cmd.

Furthermore, the target valve lift-calculating section 111 calculates the target valve lift Liftin_cmd as the sum of the master value Liftin_cmd_ms and the slave value Liftin_cmd_sl thereof, and the valve lift controller 120 (control input-calculating means) calculates the lift control input Uliftin, which is a control input to the variable valve lift mechanism 50, with a control algorithm, referred to hereinafter, according to the target valve lift Liftin_cmd and the valve lift Liftin.

On the other hand, the second ACTASS controller 200 (first control value-calculating means, and second control means) calculates a master value Cain_cmd_ms of the target cam phase with a control algorithm, referred to hereinafter, according to the target intake air amount Gcyl_cmd, and the second slave value-calculating section 210 (second control value-calculating means, and second control means) calculates a slave value Cain_cmd_sl of the target cam phase by searching a table, referred to hereinafter, according to the target valve lift Liftin_cmd.

Further, the target cam phase-calculating section 211 calculates the target cam phase Cain_cmd as the sum of the master value Cain_cmd_ms and the slave value Cain_cmd_sl thereof, and the cam phase controller 220 (control input-calculating means) calculates the phase control input Ucain, which is a control input to the variable cam phase mechanism 70, with a control algorithm, referred to hereinafter, according to the target cam phase Cain_cmd and the cam phase Cain.

Further, as described hereinafter, the master/slave-selecting section 230 (control selection means) selects an algorithm with which the first ACTASS controller 100 calculates the master value Liftin_cmd_ms of the target valve lift based on the target valve lift Liftin_cmd or the target cam phase Cain_cmd, and an algorithm with which the second ACTASS controller 200 calculates the master value Cain_cmd_ms of the target cam phase.

It should be noted that in the present embodiment, the target cam phase Cain_cmd corresponds to the first control value, the second control value, a second load parameter, a parameter representing the state of the cam phase control, and a cam phase control value. Further, the master value Cain_cmd_ms of the target cam phase corresponds to a feedback control value and a cam phase feedback control value, and the slave value Cain_cmd_sl of the target cam phase corresponds to the second control value and a cam phase-setting value.

Further, the target valve lift Liftin_cmd corresponds to the first control value, the second control value, the second load parameter, a parameter representing the state of the valve lift control, and a valve lift control value. Further, the master value Liftin_cmd_ms of the target valve lift corresponds to the feedback control value and a valve lift feedback control value, and the slave value Liftin_cmd_sl of the target valve lift corresponds to the second control value and a valve lift-setting value.

Figure 18:
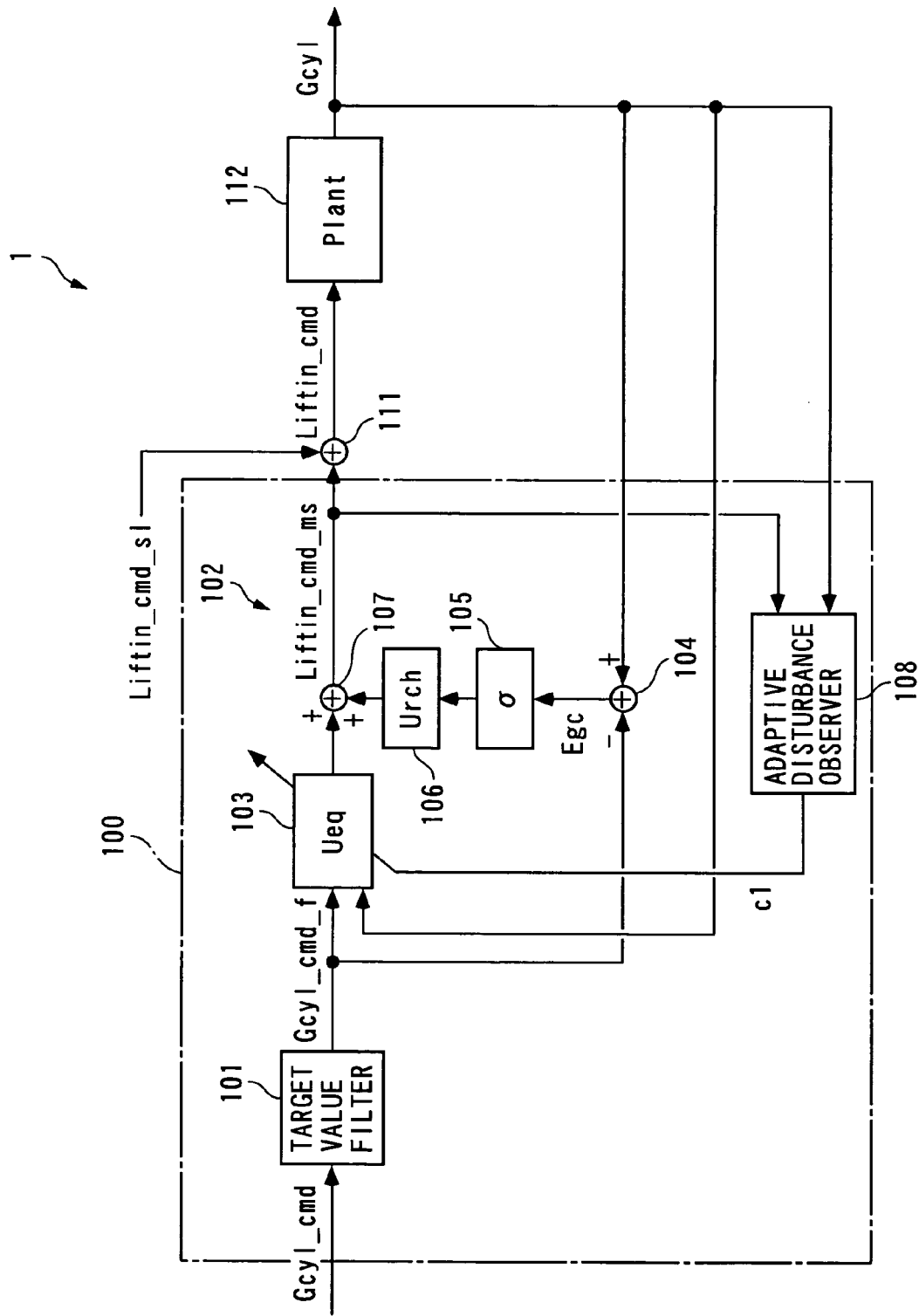
FIG. 18 is a block diagram schematically showing the configuration of a first ACTASS controller.

Next, the aforementioned first ACTASS controller 100 will be described with reference to FIG. 18. The first ACTASS controller 100 calculates the master value Liftin_cmd_ms of the target valve lift with a target value filter-type two-degree-of-freedom sliding mode control algorithm [equations (2) to (7) shown in FIG. 19], and is comprised of a target value filter 101, a sliding mode controller 102, and an adaptive disturbance observer 108.

The target value filter 101 calculates a filtered value Gcyl_cmd_f of the target intake air amount with a first-order lag filter algorithm expressed by the equation (2) shown in FIG. 19. In the equation (2), POLE_f represents a target value filter-setting parameter set to a value satisfying the relationship of −1<POLE_f<0.

Then, a description will be given of the sliding mode controller 102. The sliding mode controller 102 calculates the master value Liftin_cmd_ms of the target valve lift with a sliding mode control algorithm, described hereinafter, and is comprised of an equivalent control input-calculating section 103, a follow-up error-calculating section 104, a switching function-calculating section 105, a reaching law input-calculating section 106, and a master value-calculating section 107.

First, the equivalent control input-calculating section 103 calculates an equivalent control input Ueq by the equation (4) shown in FIG. 19. In the equation (4), POLE represents a switching function-setting parameter, described hereinafter, a1, a2, b1, and b2 model parameters of a model, described hereinafter, and c1 a disturbance estimate which is calculated by the adaptive disturbance observer 108, as described hereinafter.

Further, the follow-up error-calculating section 104 calculates a follow-up error Egc by the equation (7) in FIG. 19, and the switching function-calculating section 105 calculates a switching function σ by the equation (6) shown in FIG. 19. In the equation (6), the switching function-setting parameter POLE is set to a value satisfying the relationship of −1<POLE<0.

Furthermore, the reaching law input-calculating section 106 calculates a reaching law input Urch by the equation (5) shown in FIG. 19. In the equation (5), Krch represents a reaching law gain, which is set to a predetermined value. The master value-calculating section 107 calculates the master value Liftin_cmd_ms of the target valve lift.

As described above, the sliding mode controller 102 calculates the master value Liftin_cmd_ms of the target valve lift with the sliding mode control algorithm expressed by the equations (3) to (7) in FIG. 19. It should be noted that the above equations (3) to (7) are derived as follows:

First, a plant 112 (see FIG. 18) is defined as a system to which is inputted the target valve lift Liftin_cmd and from which is outputted the actual intake air amount Gcyl, and modeled into a discrete-time system model, whereby the equation (8) shown in FIG. 19 is obtained. In the equation (8), a1, a2, b1, and b2 represent model parameters, which are set to predetermined values.

The equation (8) represents a relation in dynamic characteristics between the target valve lift Liftin_cmd and the actual intake air amount Gcyl. Here, it is considered that the relation in dynamic characteristics therebetween, and a relation in dynamic characteristics between the master value Liftin_cmd_ms, as a feedback component of the target valve lift Liftin_cmd, and the actual intake air amount Gcyl are substantially the same, and therefore when the target valve lift Liftin_cmd in the equation (8) is replaced by the master value Liftin_cmd_ms of the target valve lift, a model expressed by an equation (9) in FIG. 19 is derived. Then, when the sliding mode control algorithm is applied to the model such that the actual intake air amount Gcyl converges to the filtered value Gcyl_cmd_f of the target intake air amount, the aforementioned equations (3) to (7) in FIG. 19 are derived.

On the other hand, as described hereinafter, the adaptive disturbance observer 108 calculates the disturbance estimate c1, and an algorithm for calculating the disturbance estimate c1 is selected by the aforementioned master/slave-selecting section 230 based on the target valve lift Liftin_cmd or the target cam phase Cain_cmd.

More specifically, as described hereinabove, during the lift master mode of the intake air amount control, the disturbance estimate c1 is calculated with an identification algorithm expressed by equations (10) to (14) in FIG. 20. In the equation (10), Pdov represents a predetermined identification gain, and e_dov an identification error. The identification error e_dov is calculated by the equation (11). Further, in the equation (11), Gcyl_hat represents an identified value of the actual intake air amount Gcyl, which is calculated by the equation (12). In the equation (12), θ represents a vector the transposed matrix of which is represented by the equation (13), and ζ represents a vector the transposed matrix of which is represented by the equation (14).

On the other hand, during the phase master mode, the disturbance estimate c1 is calculated by an equation (15) shown in FIG. 20. As is apparent from the equation (15), if the disturbance estimate c1 calculated by the equation (15) is applied to the aforementioned equation (4), Ueq=−Urch is obtained. As a result, the master value Liftin_cmd_ms of the target valve lift as the feedback component of the valve lift control is equal to a value of 0. That is, in the phase master mode, Liftin_cmd=Liftin_cmd_sl holds.

As described above, in the first ACTASS controller 100, when the control mode of the intake air amount is the lift master mode, the master value Liftin_cmd_ms of the target valve lift is calculated with the algorithm for the lift master mode [the equations (2) to (7), and (10) to (14)], whereas when the control mode is the phase master mode, the master value Liftin_cmd_ms is calculated with the algorithm for the phase master mode [the equations (2) to (7), and (15)].

As described above, when the master value Liftin_cmd_ms of the target valve lift is calculated with the algorithm for the lift master mode, it is possible to secure both the follow-up property of the actual intake air amount Gcyl to the target intake air amount Gcyl_cmd and a disturbance-suppressing capability at respective high levels with the aforementioned filter-type two-degree-of-freedom sliding mode control algorithm. Particularly, by setting the target value filter-setting parameter POLE_f in the range of −1<POLE_f<0, as desired, it is possible to freely specify the follow-up property, and by setting the switching function-setting parameter POLE in the range of −1<POLE<0, as desired, it is possible to freely specify disturbance-suppressing capability.

Now, the above-mentioned securing of the follow-up property and the disturbance-suppressing capability will be described in detail with reference to FIG. 21. In the figure, out of curves representing the actual intake air amount Gcyl, curves in solid lines represent curves obtained when the target value filter-setting parameter POLE_f and the switching function-setting parameter POLE are both set to values close to 0, and curves in two-dot chain lines represent curves obtained when the target value filter-setting parameter POLE_f and the switching function-setting parameter POLE are both set to values close to −1.

Figure 21:
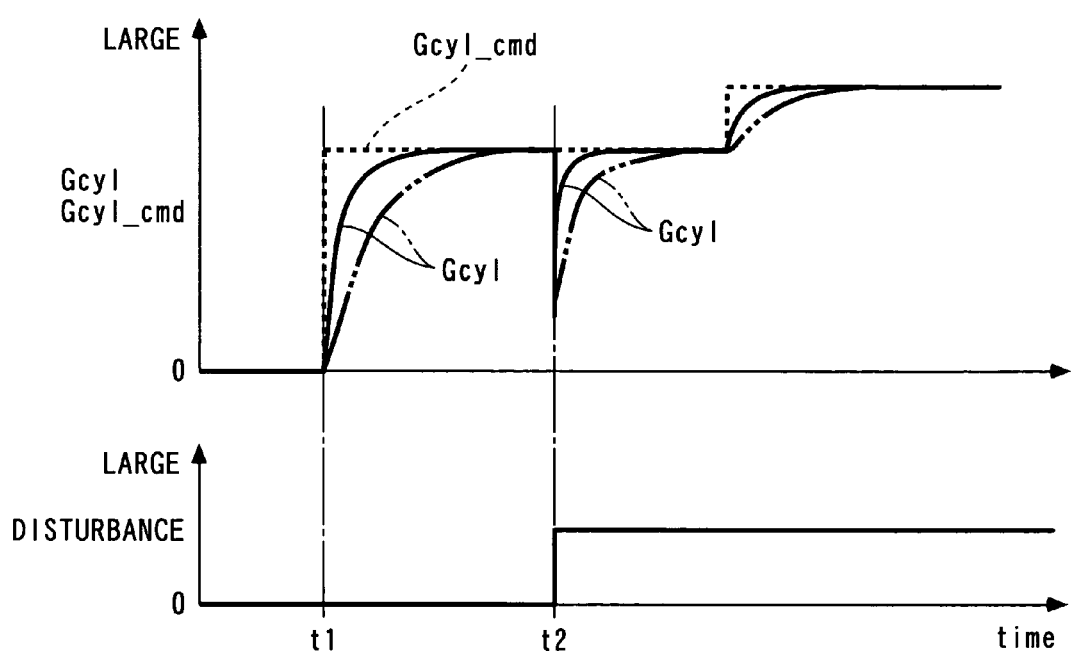
FIG. 21 is a timing diagram useful in explaining controllability of the first ACTASS controller.

When comparison is made between the solid lines and the two-dot chain lines after the target intake air amount Gcyl_cmd is changed from a value of 0 (after time t1) in FIG. 21, it is clear that the follow-up property of the actual intake air amount Gcyl to the target intake air amount Gcyl_cmd is improved when the target value filter-setting parameter POLE_f is set to a value close to 0 than when it is set to a value close to −1. Further, when comparison is made between the solid lines and the two-dot chain lines after disturbance is applied to the first ACTASS controller 100 (after time t2), it is clear that the disturbance-suppressing capability is improved when the switching function-setting parameter POLE is set to a value close to 0 than when it is set to a value close to −1.

As described above, if the target value filter-setting parameter POLE_f is set to a value close to 0 within the aforementioned range, it is possible to enhance the follow-up property, and if the switching function-setting parameter POLE is set to a value close 0 within the aforementioned range, it is possible to enhance the disturbance-suppressing capability. This means that even when a demanded torque of the engine 3 is suddenly changed, it is possible to avoid overshooting and an oscillating behavior in the intake air amount control. Moreover, since the two-degree-of-freedom sliding mode control algorithm is used, it is possible to set the target value filter-setting parameter POLE_f and the switching function-setting parameter POLE separately from each other. This makes it possible to secure high disturbance-suppressing capability, e.g. even when the follow-up property of the actual intake air amount Gcyl to the target intake air amount Gcyl_cmd (convergence rate) is set to be gentle so as to avoid overshooting.

Figure 22:
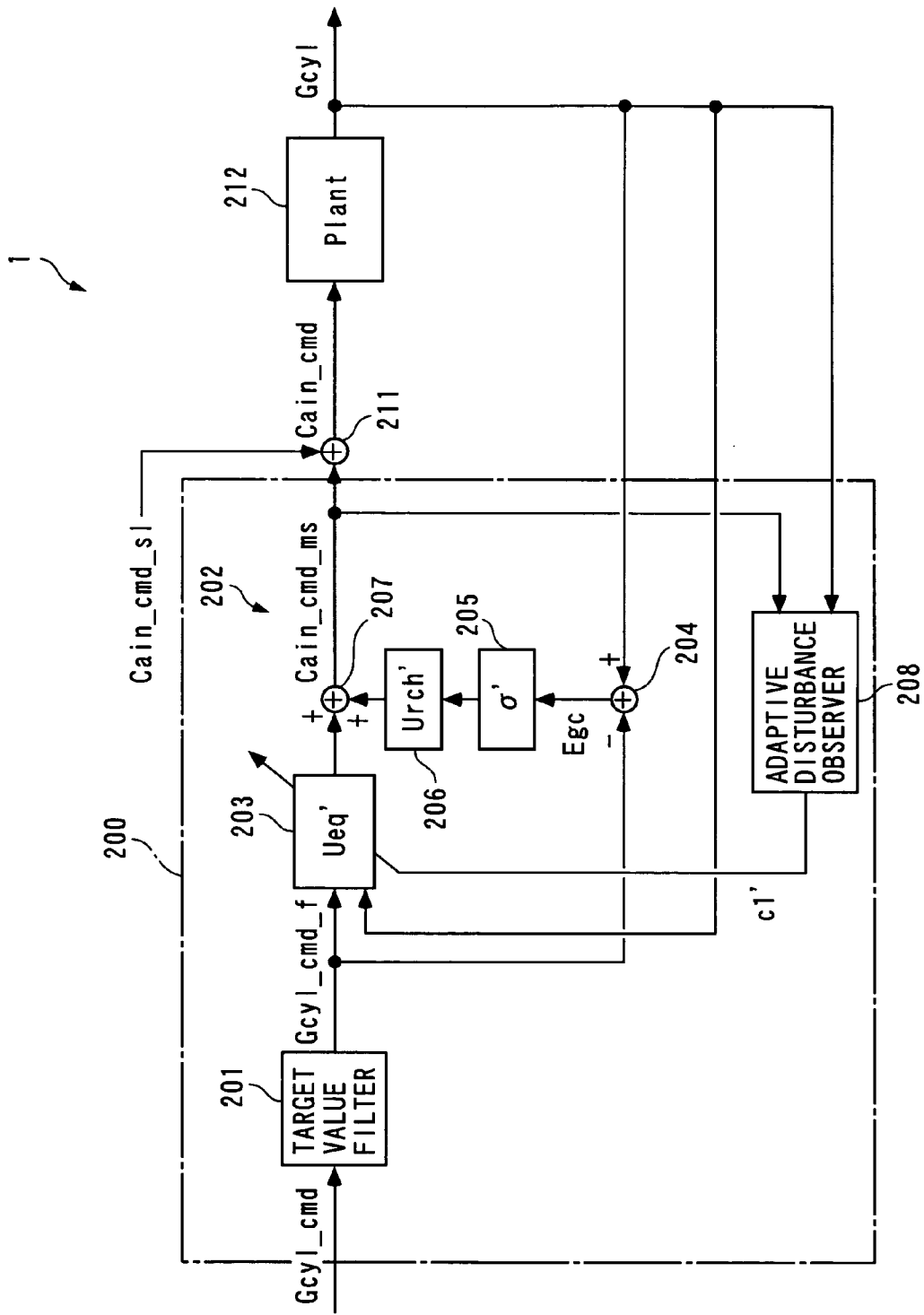
FIG. 22 is a block diagram schematically showing the configuration of a second ACTASS controller.

Next, the aforementioned second ACTASS controller 200 will be described with reference to FIG. 22. Similarly to the aforementioned first ACTASS controller 100, the second ACTASS controller 200 calculates the master value Cain_cmd_ms of the target cam phase with a target value filter-type two-degree-of-freedom sliding mode control algorithm [equations (16) to (21) shown in FIG. 23], and is comprised of a target value filter 201, a sliding mode controller 202, and an adaptive disturbance observer 208.

The target value filter 201 calculates the filtered value Gcyl_cmd_f of the target intake air amount by the equation

(16) shown in FIG. 23, that is, with the same first-order lag filter algorithm as expressed by the aforementioned equation (2).

Then, a description will be given of the sliding mode controller 202. Similarly to the above-described sliding mode controller 102, the sliding mode controller 202 calculates the master value Cain_cmd_ms of the target cam phase with a sliding mode control algorithm, described hereinafter, and is comprised of an equivalent control input-calculating section 203, a follow-up error-calculating section 204, a switching function-calculating section 205, a reaching law input-calculating section 206, and a master value-calculating section 207.

First, the equivalent control input-calculating section 203 calculates an equivalent control input Ueq' by the equation (18) shown in FIG. 23. In the equation (18), POLE' represents a switching function-setting parameter described hereinafter, a1', a2', b1', and b2' model parameters of a model, described hereinafter, and c1' a disturbance estimate calculated by the adaptive disturbance observer 208, as described hereinafter.

Further, the follow-up error-calculating section 204 calculates the follow-up error Egc by the equation (21) in FIG. 23, i.e. by the same equation as the aforementioned equation (7), and the switching function-calculating section 205 calculates a switching function σ' by the equation (20) shown in FIG. 23. In the equation (20), the switching function-setting parameter POLE' is set to a value satisfying the relationship of $-1 < POLE' < 0$.

Furthermore, the reaching law input-calculating section 206 calculates a reaching law input Urch' by the equation (19) shown in FIG. 23. In the equation (19), Krch' represents a reaching law gain, which is set to a predetermined value. The master value-calculating section 207 calculates the master value Cain_cmd_ms of the target cam phase.

As described above, the sliding mode controller 202 calculates the master value Cain_cmd_ms of the target cam phase with the sliding mode control algorithm expressed by the equations (17) to (21) in FIG. 23. The above equations (17) to (21) are derived as follows:

First, a plant 212 (see FIG. 22) is defined as a system to which is inputted the target cam phase Cain_cmd and from which is outputted the actual intake air amount Gcyl, modeled into a discrete-time system model, whereby the equation (22) shown in FIG. 23 is obtained. In the equation (22), a1', a2', b1', and b2' represent model parameters, which are set to predetermined values.

When the target cam phase Cain_cmd in the equation (22) is replaced by the master value Cain_cmd_ms of the target cam phase, a model expressed by an equation (23) in FIG. 23 is derived. Furthermore, when the sliding mode control algorithm is applied to the model such that the actual intake air amount Gcyl converges to the filtered value Gcyl_cmd_f of the target intake air amount, the aforementioned equations (17) to (21) are derived.

On the other hand, as described hereinafter, the adaptive disturbance observer 208 calculates the disturbance estimate c1', and an algorithm for calculating the disturbance estimate c1' is selected by the aforementioned master/slave-selecting section 230 based on the target valve lift Liftin_cmd or the target cam phase Cain_cmd.

More specifically, during the phase master mode of the intake air amount control, the disturbance estimate c1' is calculated with an identification algorithm expressed by equations (24) to (28) in FIG. 24. In the equation (25), Pdov' represents a predetermined identification gain, and e_dov' an identification error. The identification error e_dov' is calculated by the equation (25). Further, in the equation (25), Gcyl_hat' represents an identified value of the actual intake air amount Gcyl, which is calculated by the equation (26). In the equation (26), θ' represents a vector the transposed matrix of which is represented by the equation (27), and ζ' a vector the transposed matrix of which is represented by the equation (28).

On the other hand, during the lift master mode, the disturbance estimate c1' is calculated by an equation (29) shown in FIG. 24. As is apparent from the equation (29), if the disturbance estimate c1' calculated by the equation (29) is applied to the aforementioned equation (18), Ueq'=−Urch' is obtained. As a result, the master value Cain_cmd_ms of the target cam phase as the feedback component of the cam phase control is equal to a value of 0. That is, in the lift master mode, Cain_cmd=Cain_cmd_sl holds.

As described above, in the second ACTASS controller 200, when the control mode of the intake air amount is the phase master mode, the master value Cain_cmd_ms of the target cam phase is calculated with the algorithm for the phase master mode [the equations (16) to (21), and (24) to (28)], whereas when the control mode is the lift master mode, the master value Cain_cmd_ms is calculated with the algorithm for the lift master mode [the equations (16) to (21), and (29)].

As described above, when the master value Cain_cmd_ms of the target cam phase is calculated with the algorithm for the phase master mode, it is possible to secure both the follow-up property of the actual intake air amount Gcyl to the target intake air amount Gcyl_cmd and the disturbance-suppressing capability at respective high levels with the aforementioned filter-type two-degree-of-freedom sliding mode control algorithm. Particularly, by setting target value filter-setting parameter POLE_f in the range of $-1 < POLE\_f < 0$, as desired, as described above, it is possible to freely specify the follow-up property, and by setting the switching function-setting parameter POLE' in the range of $-1 < POLE' < 0$, as desired, it is possible to freely specify the disturbance-suppressing capability.

Figure 25:
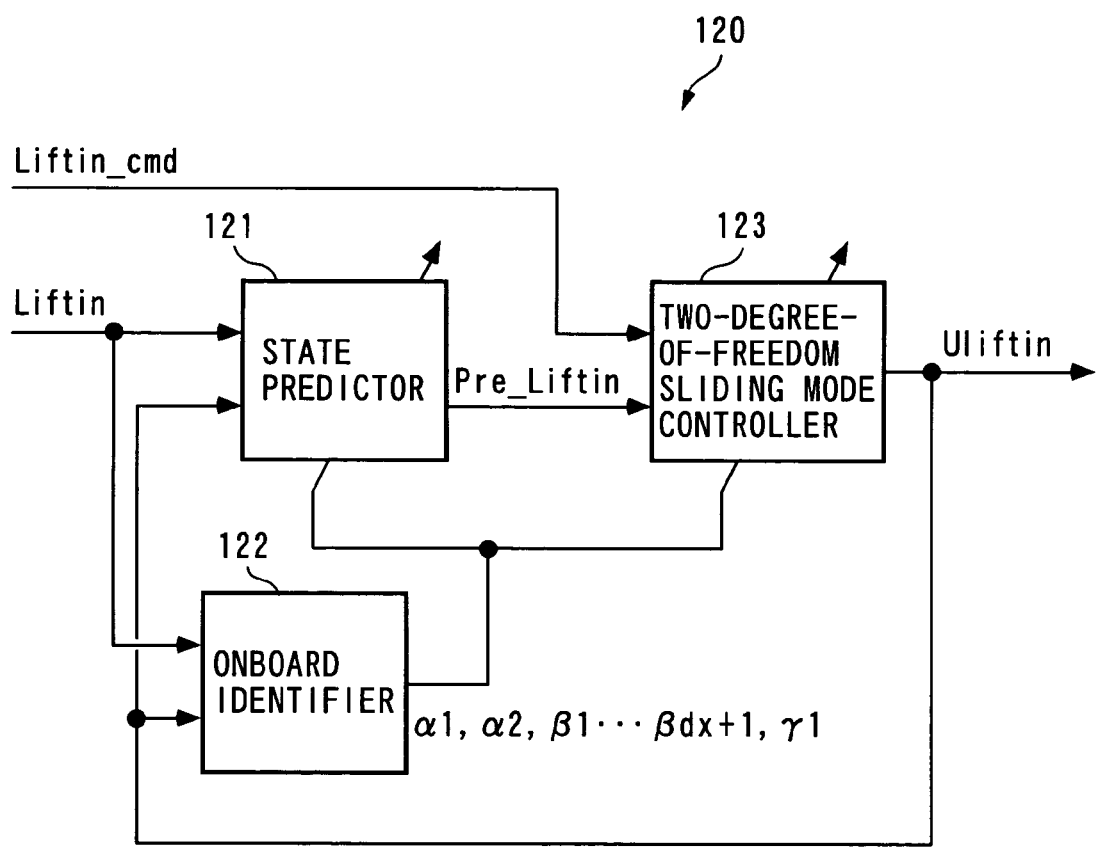
FIG. 25 is a block diagram schematically showing the configuration of a valve lift controller.

Then, a description will be given of the above-described valve lift controller 120. The valve lift controller 120 calculates the lift control input Uliftin with a control algorithm, described hereinbelow, such that the valve lift Liftin is caused to converge to the target valve lift Liftin_cmd, and is comprised of a state predictor 121, an onboard identifier 122, and a two-degree-of-freedom sliding mode controller 123, as shown in FIG. 25.

The state predictor 121 calculates a predicted valve lift Pre_Liftin, which is a predicted value of the valve lift Liftin, with a prediction algorithm described hereinafter.

More specifically, an equation (30) shown in FIG. 26 is used as a plant model. In the equation (30), dx represents a dead time determined by characteristics of a plant. Further, a1", a2", b1", and b2" represent model parameters, which are sequentially identified by the onboard identifier 122, as described hereinafter. Furthermore, a symbol n represents a discretized time, and discrete data with the symbol (n) indicates that it is data sampled in synchronism with a predetermined control period ΔT2 (e.g. 2 msec) shorter than the control period of discrete data with the symbol (k) described above. This applies to other discrete data in equations described hereinafter. Further, in the following, the symbol (n) indicating that data therewith is discrete data is omitted when deemed appropriate. It should be noted that the control period ΔT2 corresponds to a calculation period for the control input-calculating means.

Then, matrices A and B are defined using the model parameters a1", a2", b1", and b2" by equations (31) and (32) shown in FIG. 26, and the aforementioned equation (30) is modified, whereby there is obtained an equation (33) shown in FIG. 26.

Although it is possible to calculate the predicted valve lift Pre_Liftin using the equation (33), shortage of the order of the model, a nonlinear characteristic of a controlled object, and so forth can cause a steady-state deviation and modeling errors in the predicted valve lift Pre_Liftin.

To avoid the above problem, the state predictor 121 according to the present embodiment calculates the predicted valve lift Pre_Liftin using an equation (34) shown in FIG. 26 in place of the equation (33). This equation (34) is obtained by adding to the right side of the equation (33), a compensation value $\gamma 1$ for compensating for the steady-state deviation and the modeling errors, and replacing Liftin on the left side of the equation (33) by Pre_Liftin.

Next, a description will be given of the onboard identifier 122. The onboard identifier 122 identifies, with a sequential identification algorithm described hereinbelow, a vector $\theta x$ of matrix components $\alpha 1$, $\alpha 2$, and $\beta j$ of the model parameters and the compensation value $\gamma 1$, in the aforementioned equation (34).

More specifically, the vector $\theta x$ is calculated by equations (35) to (40) shown in FIG. 27. The transposed matrix of the vector $\theta x$ is defined by the equation (39). Further, in the equation (35), KP represents a vector of a gain coefficient, and the vector KP of the gain coefficient is calculated by the equation (36). In the equation (36), P represents a square matrix of order (dx+4) defined by the equation (37), and $\zeta x$ represents a vector the transposed matrix of which is defined by the equation (40). Further, an identification error ide in the equation (35) is calculated by the equation (38).

In the identification algorithm configured as above, one of the following four identification algorithms is selected according to settings of the weighting parameters $\lambda 1$ and $\lambda 2$ in the equation (37):

$\lambda 1=1$, $\lambda 2=0$: fixed gain algorithm;
$\lambda 1=1$, $\lambda 2=1$: least-squares method algorithm;
$\lambda 1=1$, $\lambda 2=\lambda$: progressively decreasing gain algorithm; and
$\lambda 1=\lambda$, $\lambda 2=1$: weighted least-squares method algorithm, wherein $\lambda$ represents a predetermined value set such that $0<\lambda<1$ holds.

It should be noted that in the present embodiment, the weighted least-squares method algorithm is employed so as to optimally secure both the accuracy of identification and the convergence rate of the vector $\theta x$ to an optimal value.

Next, a description will be given of the two-degree-of-freedom sliding mode controller (hereinafter referred to as "the TDFSLD controller") 123. As described hereinafter, the TDFSLD controller 123 calculates the lift control input Uliftin with a target value filter-type two-degree-of-freedom sliding mode control algorithm such that the valve lift Liftin converges to the target valve lift Liftin_cmd.

More specifically, similarly to the first ACTASS controller 100, when the target value filter-type two-degree-of-freedom sliding mode control algorithm is applied to the plant model expressed by the aforementioned equation (30), equations (41) to (46) shown in FIG. 28 are derived. In the equation (41) in the figure, Liftin_cmd_f represents a filtered value of the target valve lift, and POLE_f" represents a target value filter-setting parameter, which is set to a value satisfying the relationship of $-1<\text{POLE\_f"}<0$.

Further, an equivalent control input Ueq" is calculated by the equation (43). In the equation (43), POLE" represents a switching function-setting parameter, which is set to a value satisfying the relationship of $-1<\text{POLE"}<0$.

Furthermore, a reaching law input Urch" is calculated by the equation (44). In the equation (44), Krch" represents a predetermined reaching law gain, and Pre_σ" a predicted switching function calculated by the equation (45). Further, in the equation (44), Pre_E_lf represents a follow-up error, which is calculated by the equation (46).

As described hereinabove, in the valve lift controller 120, the state predictor 121 calculates the predicted valve lift Pre_Liftin with a state-predicting algorithm having the compensation value $\gamma 1$ added thereto, and the compensation value $\gamma 1$ is sequentially identified by the onboard identifier 122, so that it is possible to accurately calculate the predicted valve lift Pre_Liftin, while compensating for the aforementioned steady-state deviation and modeling errors.

Further, the TDFSLD controller 123 is capable of causing the valve lift Liftin to converge to the target valve lift Liftin_cmd, and at the same time, as described hereinabove, specifying the convergence behavior and the convergence rate of the valve lift Liftin to the target valve lift Liftin_cmd as desired, by setting the switching function-setting parameter POLE". Moreover, since the compensation value $\gamma 1$ is contained in the equation (43) for calculating the equivalent control input Ueq", the disturbance-suppressing capability as well can be enhanced.

It should be noted that in the first ACTASS controller 100 and the valve lift controller 120, the switching function-setting parameters POLE and POLE" are set to values satisfying the relationship of $-1<\text{POLE}<\text{POLE"}<0$. This makes it possible to enhance the response of the control performed by the valve lift controller 120 than that of the control performed by the first ACTASS controller 100, thereby making it possible to enhance the stability i.e. controllability of the intake air amount control.

Further, the valve lift controller 120 calculates the lift control input Uliftin by using the data sampled in synchronism with the aforementioned control period $\Delta T2$. More specifically, the lift control input Uliftin is calculated at a calculation period $\Delta T2$ shorter than a calculation period (i.e. the control period $\Delta T1$) at which the target valve lift Liftin_cmd is calculated. This makes it possible to make the convergence rate at which the valve lift Liftin is caused to converge to the target valve lift Liftin_cmd by the valve lift controller 120 higher than the convergence rate at which the actual intake air amount Gcyl is caused to converge to the target intake air amount Gcyl_cmd by the first ACTASS controller 100. As a result, it is possible to further enhance the stability or the controllability of the intake air amount control.

Figure 29:
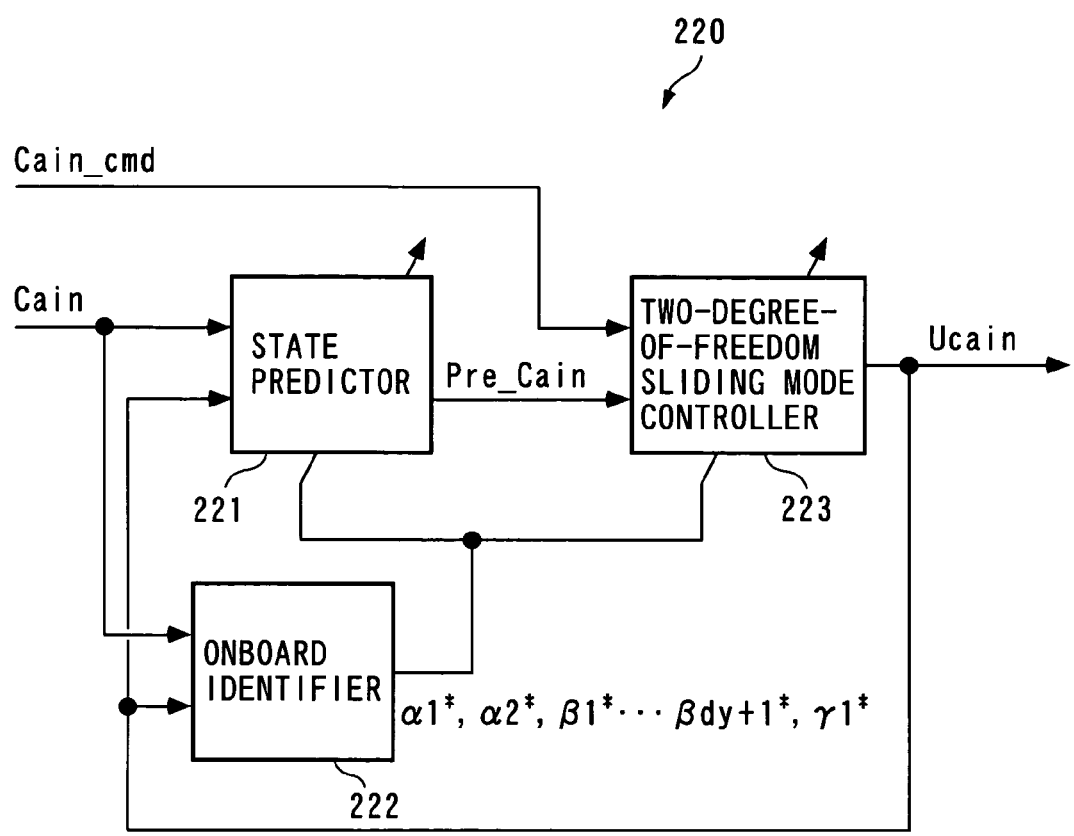
FIG. 29 is a block diagram schematically showing the configuration of a cam phase controller.

Next, a description will be given of the cam phase controller 220. Similarly to the above-described valve lift controller 120, the cam phase controller 220 calculates the cam phase control input Ucain with a control algorithm, described hereinbelow, such that the cam phase Cain is caused to converge to the target cam phase Cain_cmd, and is comprised of a state predictor 221, an onboard identifier 222, and a two-degree-of-freedom sliding mode controller 223, as shown in FIG. 29.

The state predictor 221 calculates a predicted cam phase Pre_Cain, which is a predicted value of the cam phase Cain, with a prediction algorithm similar to that for the state predictor 121, i.e. an equation (51) shown in FIG. 30. The equation (51) is derived as follows: An equation (47) shown in FIG. 30 is used as a plant model. In the equation (47), dy represents a dead time determined by characteristics of a plant. Further, a1*, a2*, b1*, and b2* represent model parameters, which are sequentially identified by the onboard identifier 222, as described hereinafter.

Then, the matrices A and B are defined using the model parameters a1*, a2*, b1*, and b2* by equations (48) and (49) shown in FIG. 30, and the aforementioned equation (47) is modified, whereby there is obtained an equation (50) shown in FIG. 30. Further, a compensation value $\gamma1^*$ for compensating for the steady-state deviation and the modeling errors is added to the right side of the equation (50), and Cain on the left side of the equation (50) is replaced by Pre_Cain, whereby an equation (51) shown in FIG. 30 is derived.

Next, a description will be given of the onboard identifier 222. The onboard identifier 222 identifies, with the same sequential identification algorithm as that for the onboard identifier 222, a vector $\theta^*$ of matrix components $\alpha1^*$, $\alpha2^*$, and $\beta j^*$ of the model parameters and the compensation value $\gamma1^*$, in the aforementioned equation (51).

More specifically, the vector $\theta^*$ is calculated by equations (52) to (57) shown in FIG. 31. The transposed matrix of the vector $\theta^*$ is defined by the equation (56). Further, in the equation (52), KP* represents a vector of a gain coefficient, and the vector KP* of the gain coefficient is calculated by the equation (53). In the equation (53), P* represents a square matrix of order (dy+4) defined by the equation (54), and $\zeta^*$ represents a vector the transposed matrix of which is defined by the equation (57). Further, an identification error ide* in the equation (52) is calculated by the equation (55).

In the identification algorithm configured as above, it is possible to select an algorithm from the fixed gain algorithm, the least-squares method algorithm, the progressively decreasing gain algorithm, and the weighted least-squares method algorithm, according to settings of the weighting parameters $\lambda1^*$ and $\lambda2^*$ in the equation (54), as described above. In the present embodiment, the weighted least-squares method algorithm is employed for the aforementioned reason.

Next, a description will be given of two-degree-of-freedom sliding mode controller (hereinafter referred to as "the TDF-SLD controller") 223. As described hereinafter, the TDFSLD controller 223 calculates the phase control input Ucain with a target value filter-type two-degree-of-freedom sliding mode control algorithm such that the cam phase Cain converges to the target cam phase Cain_cmd.

More specifically, when a target value filter-type two-degree-of-freedom sliding mode control algorithm similar to that for the TDFSLD controller 123 is applied to the plant model expressed by the aforementioned equation (47), equations (58) to (63) shown in FIG. 32 are derived. In the equation (58) in the figure, Cain_cmd_f represents a filtered value of the target cam phase, and POLE_f* represents a target value filter-setting parameter, which is set to a value satisfying the relationship of $-1<\text{POLE\_f}^*<0$.

Further, an equivalent control input Ueq* is calculated by the equation (60). In the equation (60), POLE* represents a switching function-setting parameter, which is set to a value satisfying the relationship of $-1<\text{POLE}^*<0$.

Furthermore, a reaching law input Urch* is calculated by the equation (61). In the equation (61), Krch* represents a predetermined reaching law gain, and Pre_$\sigma^*$ a predicted switching function calculated by the equation (62). Further, in the equation (62), Pre_E_ca* represents a follow-up error, which is calculated by the equation (63).

As described hereinabove, in the cam phase controller 220, the state predictor 221 calculates the predicted cam phase Pre_Cain with the state-predicting algorithm having the compensation value $\gamma1^*$ added thereto, and the compensation value $\gamma1^*$ is sequentially identified by the onboard identifier 222. This makes it possible to accurately calculate the predicted cam phase Pre_Cain, while compensating for the aforementioned steady-state deviation and modeling errors.

Further, the TDFSLD controller 223 can cause the cam phase Cain to converge to the target cam phase Cain_cmd, and at the same time, as described hereinabove, specify the convergence behavior and the convergence rate of the cam phase Cain to the target cam phase Cain_cmd as desired, by setting the switching function-setting parameter POLE*. Moreover, since the compensation value $\gamma1^*$ is contained in the equation (60) for calculating the equivalent control input Ueq*, the disturbance-suppressing capability as well can be enhanced.

It should be noted that in the second ACTASS controller 200 and the cam phase controller 220, the switching function-setting parameters POLE' and POLE* are set to values satisfying the relationship of $-1<\text{POLE}'<\text{POLE}^*<0$. This makes it possible to make the response of the control performed by the cam phase controller 220 higher than that of the control performed by the second ACTASS controller 200, thereby making it possible to enhance the stability i.e. controllability of the intake air amount control.

Further, the cam phase controller 220 calculates the phase control input Ucain by using the data sampled in synchronism with the aforementioned control period $\Delta T2$. More specifically, the phase control input Ucain is calculated at the calculation period $\Delta T2$ shorter than the calculation period (i.e. the control period $\Delta T1$) at which the target cam phase Cain_cmd is calculated. This makes it possible to make the convergence rate at which the cam phase Cain is caused to converge to the target cam phase Cain_cmd by the cam phase controller 220 higher than the convergence rate at which the actual intake air amount Gcyl is caused to converge to the target intake air amount Gcyl_cmd by the second ACTASS controller 200. As a result, it is possible to further enhance the stability i.e. controllability of the intake air amount control.

Hereinafter, a main control process of the engine control carried out by the ECU 2 will be described with reference to FIGS. 33(a) to 33(c). As shown in FIG. 33(a), in a step 1 (shown as S1 in abbreviated form in FIG. 33(a); the following steps are also shown in abbreviated form), an intake air amount control process is carried out at the aforementioned control period $\Delta T1$. In this process, as described hereinafter, the target valve lift Liftin_cmd, the target cam phase Cain_cmd, and so forth are calculated.

Further, as shown in FIG. 33(b), in steps 2 and 3, the lift control input Uliftin and the phase control input Ucain are calculated, as described hereinbelow. The calculating processes are performed at the control period $\Delta T2$ ($<\Delta T1$) shorter than the control period $\Delta T1$ for the above-described reason.

Furthermore, as shown in FIG. 33(c), in steps 4 and 5, a fuel control process and an ignition timing control process are executed in synchronism with generation of each pulse of the TDC signal. In the fuel control process, the fuel injection amount TOUT of the fuel injection valve 12 is calculated depending on operating conditions of the engine 3, although detailed description thereof is omitted. Further, in the ignition timing control process, ignition timing Iglog is calculated.

Figure 34:
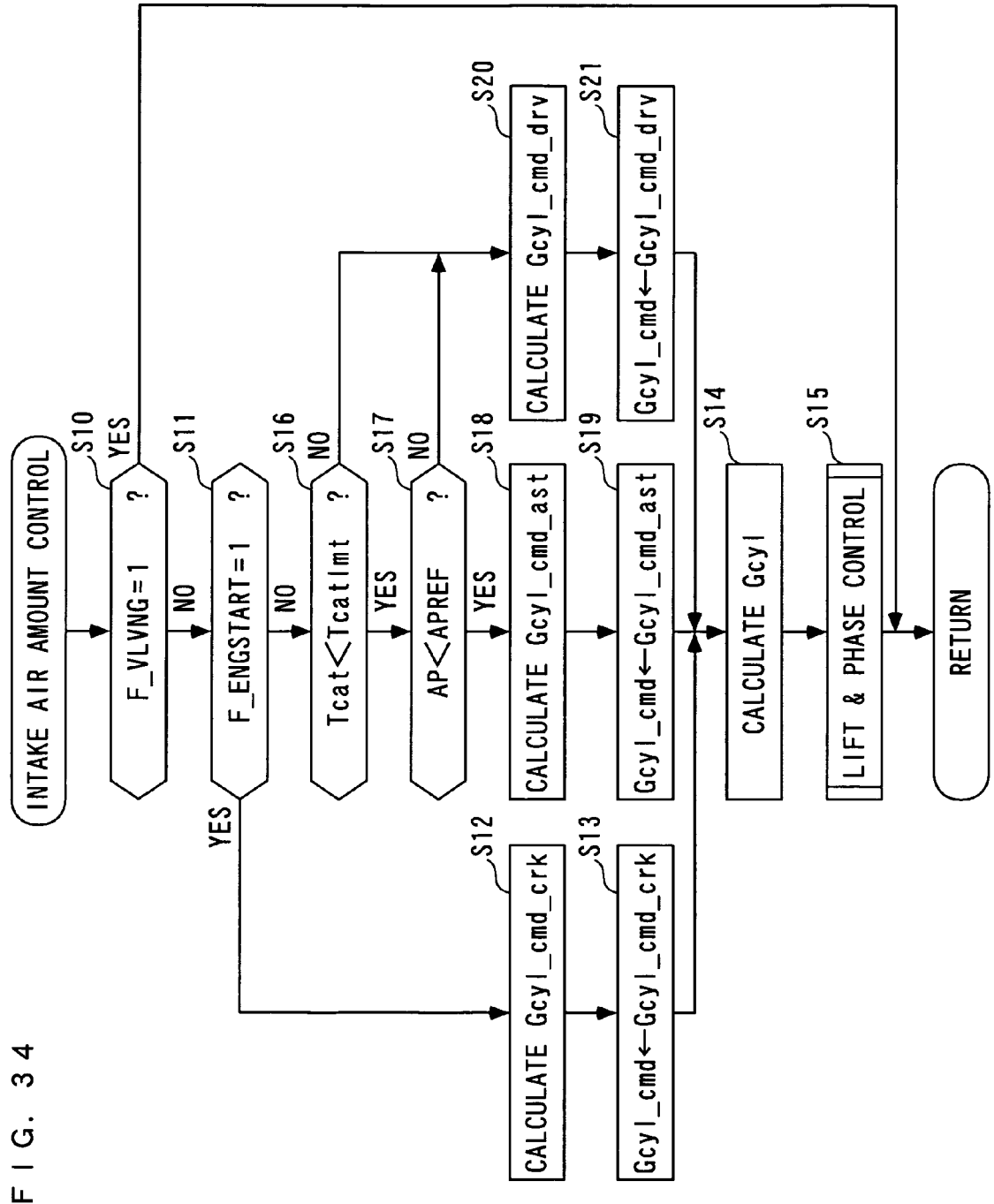
FIG. 34 is a flowchart showing details of an intake air amount control process.

Next, the aforementioned intake air amount control process will be described with reference to FIG. 34. As shown in FIG. 34, in the program for this process, first, it is determined in a step 10 whether or not an intake valve-actuating mechanism failure flag F_VLVNG is equal to 1. The intake valve-actuating mechanism failure flag F_VLVNG is set to 1 when the variable intake valve-actuating mechanism 40 is determined to be faulty, and to 0 when the same is determined to be normal.

If the answer to the above question is affirmative (YES), i.e. if the variable intake valve-actuating mechanism 40 is faulty, the program is immediately terminated. On the other hand, if the answer to the question is negative (NO), i.e. if the variable intake valve-actuating mechanism 40 is normal, the program proceeds to a step 11, wherein it is determined whether or not an engine start flag F_ENGSTART is equal to 1. The engine start flag F_ENGSTART is set by determining in a determination process, not shown, whether or not engine starting control, i.e. cranking is being executed, based on the engine speed NE and the output of the IG·SW 29. More specifically, when the engine starting control is being executed, the engine start flag F_ENGSTART is set to 1, and otherwise set to 0.

Figure 35:
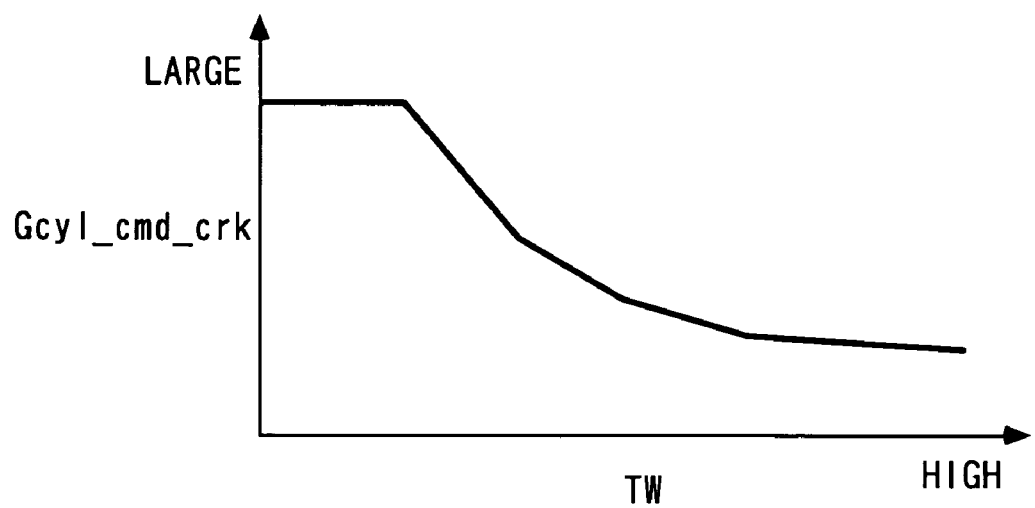
FIG. 35 is a diagram showing an example of a table for use in calculation of a start-time value of a target intake air amount.

If the answer to the question of the step 11 is affirmative (YES), i.e. if the engine starting control is being executed, the program proceeds to a step 12, wherein a start-time value Gcyl_cmd_crk of the target intake air amount is calculated by searching a table shown in FIG. 35 according to the engine coolant temperature TW. As shown in FIG. 35, in this table, the start-time value Gcyl_cmd_crk of the target intake air amount is set to a smaller value as the engine coolant temperature TW is higher. This is because as the engine coolant temperature TW is higher, the engine 3 is easier to start, and hence it is possible to reduce both the intake air amount and the fuel injection amount.

Subsequently, the program proceeds to a step 13, wherein the target intake air amount Gcyl_cmd is set to the start-time value Gcyl_cmd_crk. After that, in a step 14, the actual intake air amount Gcyl is calculated by the aforementioned equation (1). Then, the program proceeds to a step 15, wherein a lift & phase control process is carried out, as described hereinafter, followed by terminating the program.

On the other hand, if the answer to the question of the step 11 is negative (NO), i.e. if the engine starting control is not being executed, the program proceeds to a step 16, wherein it is determined whether or not an execution time period Tcat of the catalyst warmup control, which is represented by a time period elapsed immediately after termination of the start of the engine 3, is smaller than a predetermined value Tcatlmt (e.g. 30 sec). The catalyst warmup control is executed for rapidly activating catalyst in the catalytic converters 16a and 16b after the start of the engine 3.

If the answer to the question of the step 16 is affirmative (YES), i.e. if Tcat<Tcatlmt holds, the program proceeds to a step 17, wherein it is determined whether or not the accelerator pedal opening AP is smaller than a predetermined value APREF. The predetermined value APREF is for determining that the accelerator pedal is not stepped on, and is set to a value (e.g. 1°) from which it can be determined that the accelerator pedal is not stepped on.

Figure 36:
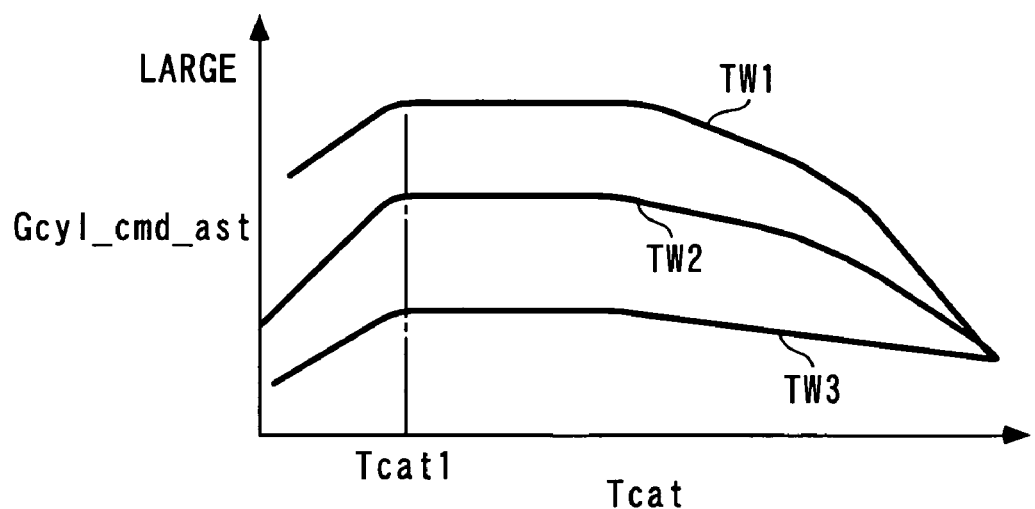
FIG. 36 is a diagram showing an example of a map for use in calculation of a catalyst warmup value of the target intake air amount.

If the answer to the question of the step 17 is affirmative (YES), i.e. if the accelerator pedal is not stepped on, it is judged that the catalyst warmup control should be executed, so that the program proceeds to a step 18, wherein a catalyst warmup value Gcyl_cmd_ast of the target intake air amount is calculated by searching a map shown in FIG. 36 according to the execution time period Tcat of the catalyst warmup control and the engine coolant temperature TW.

In the map in FIG. 36, predetermined values TW1 to TW3 of the engine coolant temperature TW are set such that the relationship of TW1<TW2<TW3 holds. In this map, the catalyst warmup value Gcyl_cmd_ast of the target intake air amount is set to a larger value as the engine coolant temperature TW is lower. This is because as the engine coolant temperature TW is lower, it takes a longer time period to activate catalyst, and hence the volume of exhaust gasses is increased to shorten the time period required for activating the catalyst. Furthermore, in the above map, until the execution time period Tcat of the catalyst warmup control has exceeded a predetermined time period Tcat1, the catalyst warmup value Gcyl_cmd_ast of the target intake air amount is set to a larger value as the execution time period Tcat is longer, whereas after the execution time period Tcat has exceeded the predetermined time period Tcat1, the catalyst warmup value Gcyl_cmd_ast is set to a smaller value as the execution time period Tcat is longer. This is because the warming up of the engine 3 proceeds along with the lapse of the execution time period Tcat, so that when the friction lowers, unless the target intake air amount Gcyl_cmd is decreased, the ignition timing is excessively retarded so as to hold the engine speed NE at a target value, which makes unstable the combustion state of the engine. To avoid the combustion state from being unstable, the map is configured as described above.

Then, the program proceeds to a step 19, wherein the target intake air amount Gcyl_cmd is set to the above catalyst warmup value Gcyl_cmd_ast. After that, the aforementioned steps 14 and 15 are carried out, followed by terminating the program.

Figure 37:
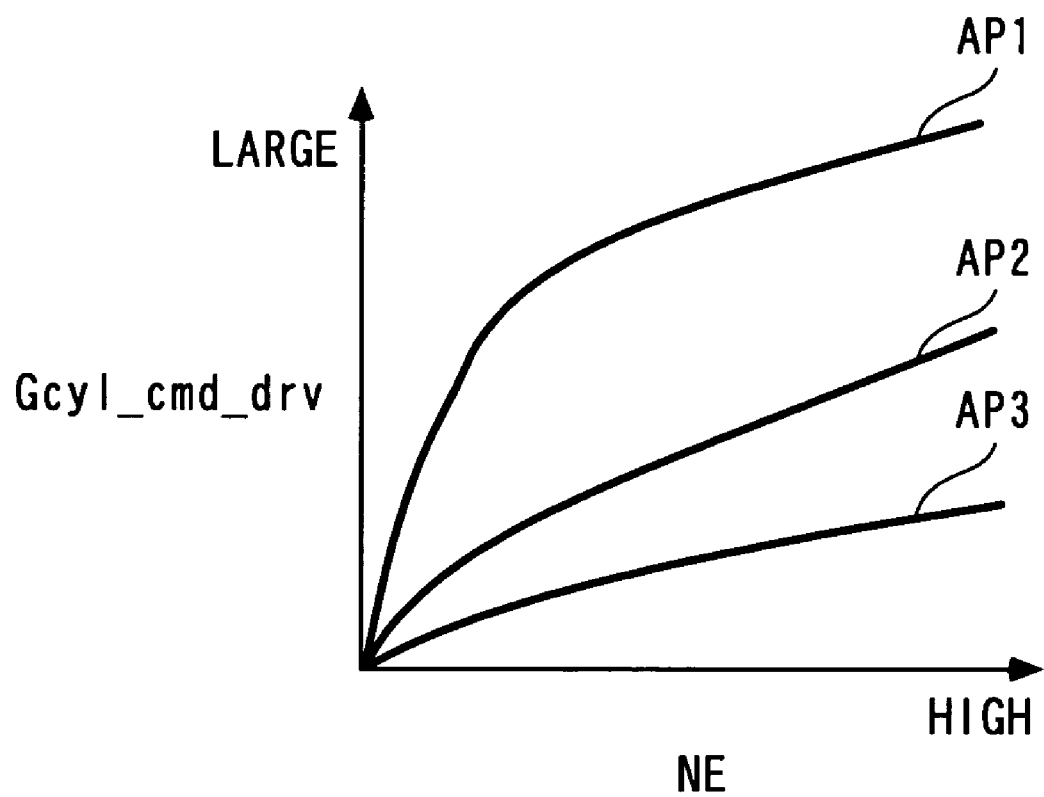
FIG. 37 is a diagram showing an example of a map for use in calculation of a normal operation value of the target intake air amount.

On the other hand, if the answer to the question of the step 16 or the step 17 is negative (NO), i.e. if Tcat≧Tcatlmt holds, or if the accelerator pedal is stepped on, the program proceeds to a step 20, wherein a normal operation value Gcyl_cmd_drv of the target intake air amount is calculated by searching a map shown in FIG. 37 according to the accelerator pedal opening AP and the engine speed NE.

In the map shown in FIG. 37, predetermined values AP1 to AP3 of the accelerator pedal opening AP are set such that the relationship of AP1>AP2>AP3 holds, and this relationship also applies to the following descriptions. In this map, the normal operation value Gcyl_cmd_drv of the target intake air amount is set to a larger value as the engine speed NE is higher or as the accelerator pedal opening AP is larger. This is because as the engine speed NE is higher or as the accelerator pedal opening AP is larger, the engine 3 is in a higher-load region, and hence a larger intake air amount is required.

Subsequently, the program proceeds to a step 21, wherein the target intake air amount Gcyl_cmd is set to the normal operation value Gcyl_cmd_drv. Then, the aforementioned steps 14 and 15 are executed, followed by terminating the program.

Figure 38:
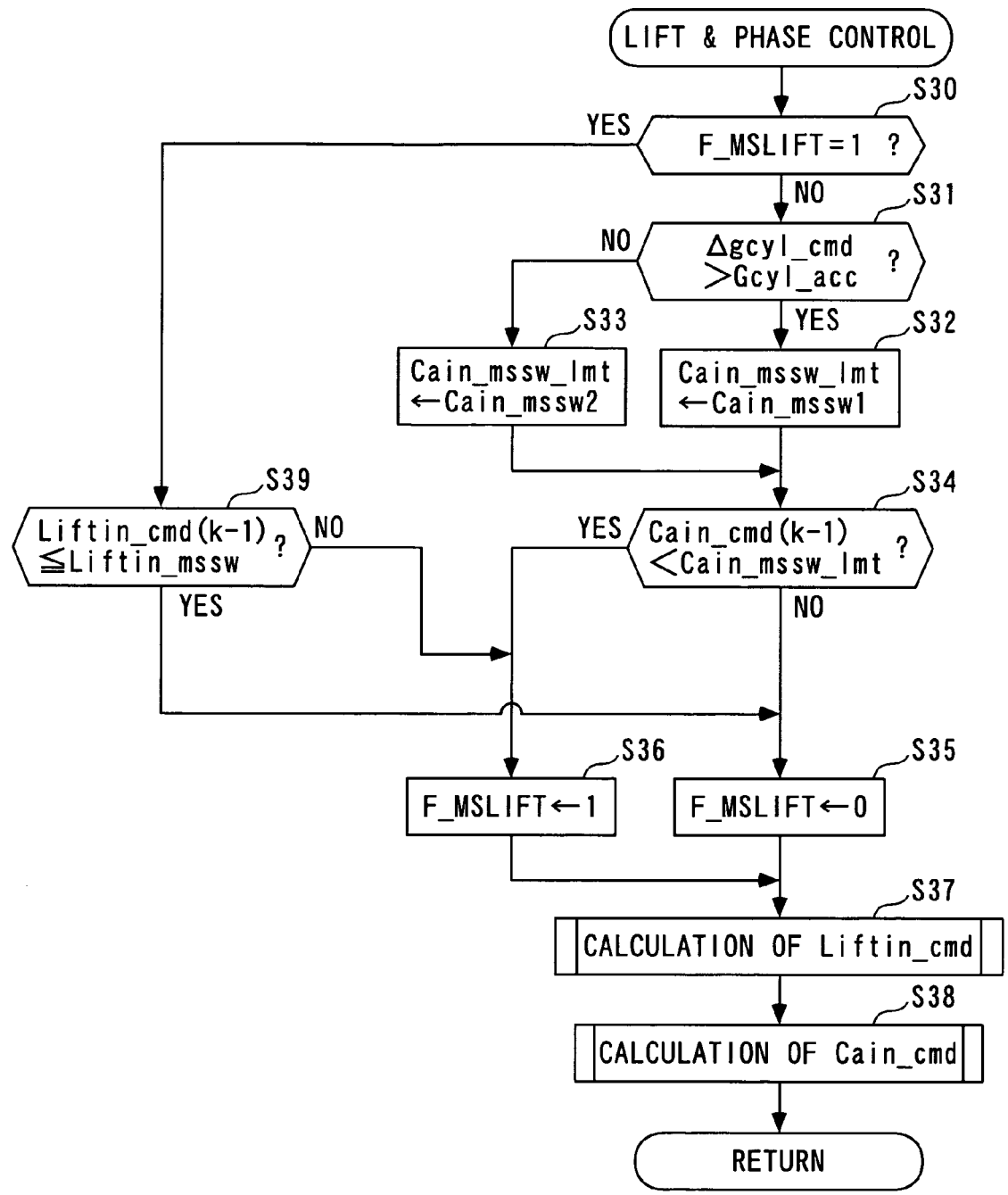
FIG. 38 is a flowchart showing details of a lift & phase control process.

Next, the lift & phase control process will be described with reference to FIG. 38. In the program for this process, first, it is determined in a step 30 whether or not the value of a lift master flag F_MSLIFT set in the immediately preceding loop is equal to 1. If the answer to this question is negative (NO), i.e. if the immediately preceding control mode is the phase master mode, the program proceeds to a step 31, wherein it is determined whether or not the difference Δgcyl_cmd is larger than a threshold value Gcyl_acc.

The difference Δgcyl_cmd is calculated as the difference [Gcyl_cmd(k)−Gcyl_cmd(k−1)] between the current value and the immediately preceding value of the target intake air amount. Further, the threshold value Gcyl_acc is a predetermined value for use in determining whether or not the engine 3 is in accelerating operation.

If the answer to the question of the step 31 is affirmative (YES), i.e. if the engine 3 is in accelerating operation, in a step 32, a threshold value Cain_mssw_lmt of the target cam phase is set to a predetermined acceleration value Cain_mssw1. On the other hand, if the answer to the question of the step 31 is negative (NO), i.e. if the engine 3 is in decelerating operation or constant speed operation, that is, non-accelerating operation, in a step 33, the threshold value Cain_mssw_lmt of the target cam phase is set to a predetermined non-acceleration value Cain_mssw2 (<Cain_mssw1) smaller than the above acceleration value Cain_mssw1.

In a step 34 following the step 32 or the step 33, it is determined whether or not the immediately preceding value Cain_cmd(k−1) of the target cam phase is smaller than the above threshold value Cain_mssw_lmt. If the answer to this question is negative (NO), i.e. if Cain_cmd(k−1)≧Cain_mssw_lmt holds, it is judged that the engine 3 is in a predetermined low-load region (predetermined first load region) where the phase master mode should be executed, so that the program proceeds to a step 35, wherein to indicate the fact, the lift master flag F_MSLIFT is set to 0.

On the other hand, if the answer to the question of the step 34 is affirmative (YES), i.e. if Cain_cmd(k−1)<Cain_mssw_lmt holds, it is judged that the engine 3 is in a predetermined high-load region (predetermined second load region) where the lift master mode should be executed, so that the program proceeds to a step 36, wherein to indicate the fact, the lift master flag F_MSLIFT is set to 1.

In a step 37 following the step 35 or the step 36, the process for calculating the target valve lift Liftin_cmd is performed, as described hereinafter. Then, in a step 38, as described hereinafter, the process for calculating the target cam phase Cain_cmd is executed, followed by terminating the program.

On the other hand, if the answer to the question of the step 30 is affirmative (YES), i.e. if the immediately preceding control mode is the lift master mode, the program proceeds to a step 31, wherein it is determined whether or not the immediately preceding value Liftin_cmd(k−1) of the target valve lift is equal to or smaller than a predetermined threshold value Liftin_mssw. If the answer to this question is affirmative (YES), i.e. if Liftin_cmd(k−1)≦Liftin_mssw holds, it is judged that the engine 3 is in the predetermined low-load region where the phase master mode should be executed, and in the aforementioned step 35, the lift master flag F_MSLIFT is set to 0. Then, the above-described steps 37 and 38 are carried out, followed by terminating the program.

On the other hand, if the answer to the question of the step 39 is negative (NO), i.e. if Liftin_cmd(k−1)>Liftin_mssw holds, it is judged that the engine 3 is in the predetermined high-load region where the lift master mode should be executed, and in the aforementioned step 36, the lift master flag F_MSLIFT is set to 1. Then, the above-described steps 37 and 38 are carried out, followed by terminating the program.

Figure 39:
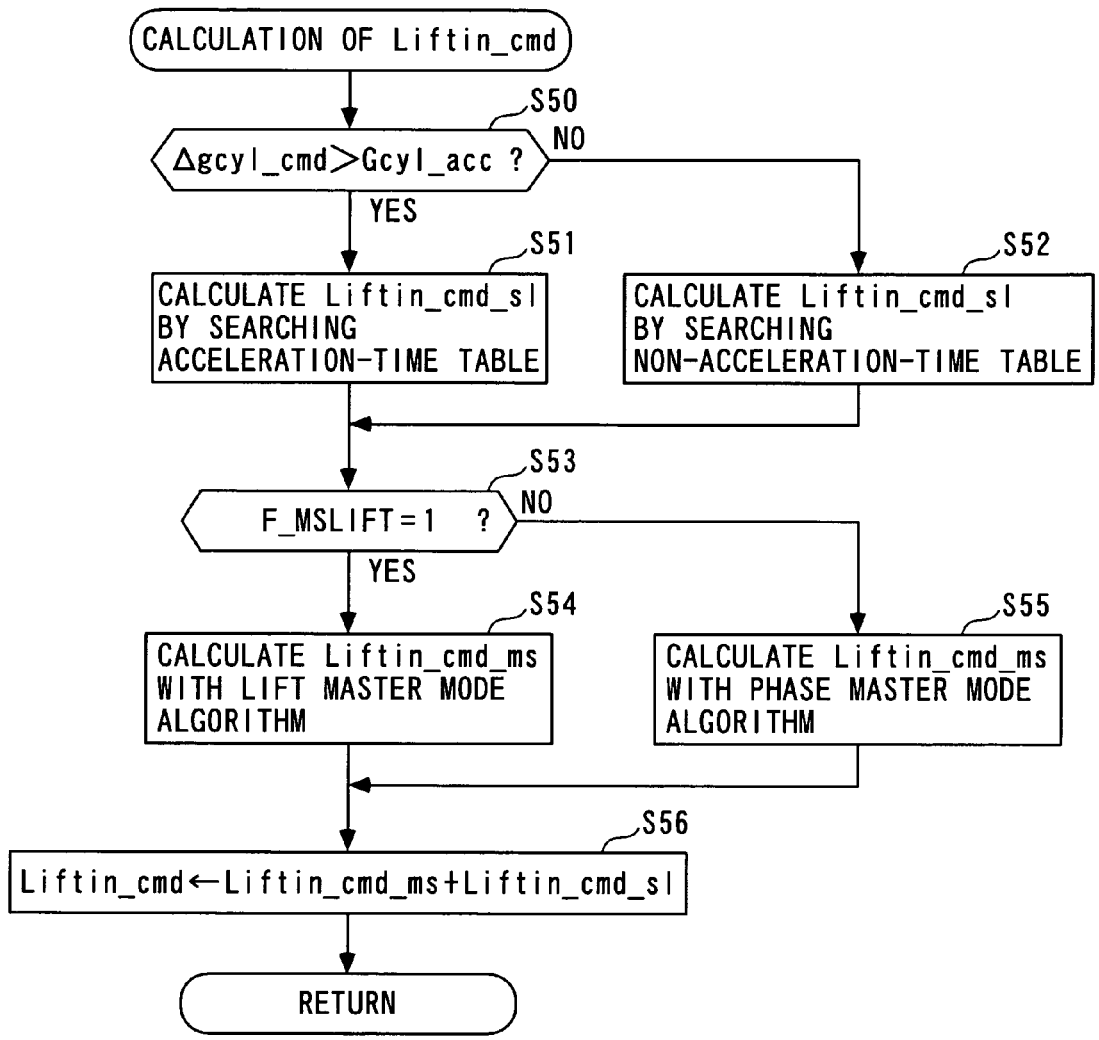
FIG. 39 is a flowchart showing details of a process for calculating a target valve lift.

Next, the process for calculating the aforementioned target valve lift Liftin_cmd will be described with reference to FIG. 39. In a program for this process, first, it is determined in a step 50, similarly to the above-described step 30, whether or not the difference Δgcyl_cmd is larger than the threshold value Gcyl_acc.

Figure 40:
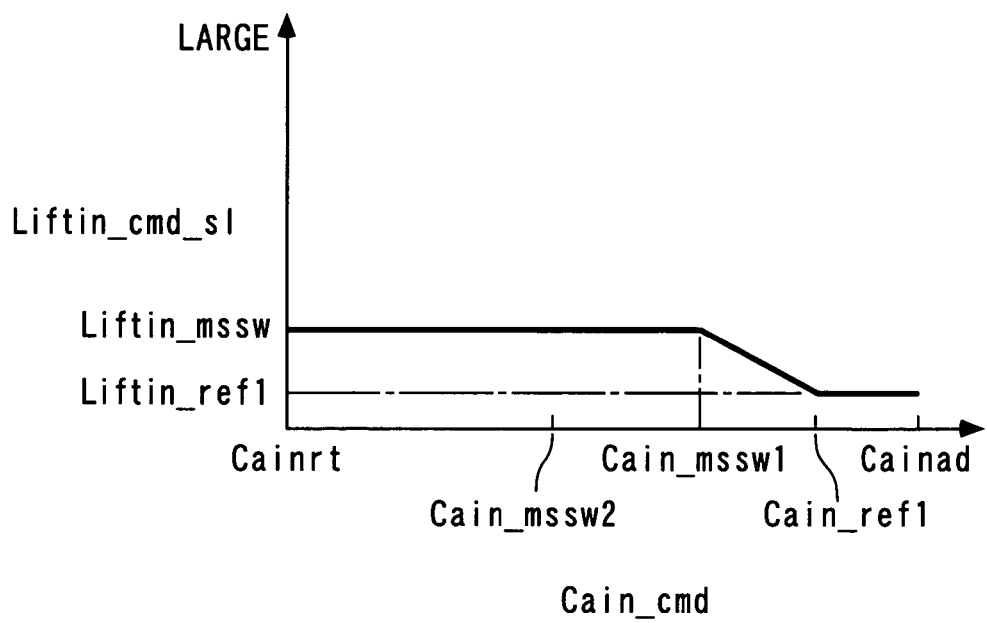
FIG. 40 is a diagram showing an example of an acceleration-time table for use in calculation of a slave value of the target valve lift.

If the answer to this question is affirmative (YES), i.e. if the engine 3 is in accelerating operation, the program proceeds to a step 51, wherein a slave value Liftin_cmd_sl of the target valve lift is calculated by searching an acceleration-time table shown in FIG. 40 according to the target cam phase Cain_cmd. It should be noted that in searching the acceleration-time table, an immediately preceding value Cain_cmd (k−1) of the target cam phase Cain_cmd is used as the target cam phase. Further, in FIG. 40, Liftin_ref1 is smaller than the above-described predetermined threshold value Liftin_mssw, and Cain_ref1 is a predetermined value set to a value satisfying the relationship of Cain_mssw1<Cain_ref1<Cainad.

As shown in FIG. 40, in the acceleration-time table, the slave value Liftin_cmd_sl is set to the aforementioned predetermined threshold value Liftin_mssw in a range where Cain_cmd<Cain_mssw1 holds, and in a range where Cain_cmd>Cain_ref1 holds, the slave value Liftin_cmd_sl is set to the predetermined value Liftin_ref1, while in a range where Cain_mssw1≦Cain_cmd≦Cain_ref1 holds, the slave value Liftin_cmd_sl is set to a smaller value as the value of the target cam phase Cain_cmd is more advanced. This is because as described above, during the accelerating operation of the engine 3, when Cain_cmd≧Cain_mssw1 holds, the control mode is set to the phase master mode, so that the target valve lift Liftin_cmd is set to a smaller value as the value of the target cam phase Cain_cmd is more advanced, i.e. as load on the engine 3 is smaller, whereby the variable intake valve-actuating mechanism 40 is controlled such that the intake air amount is decreased.

Figure 41:
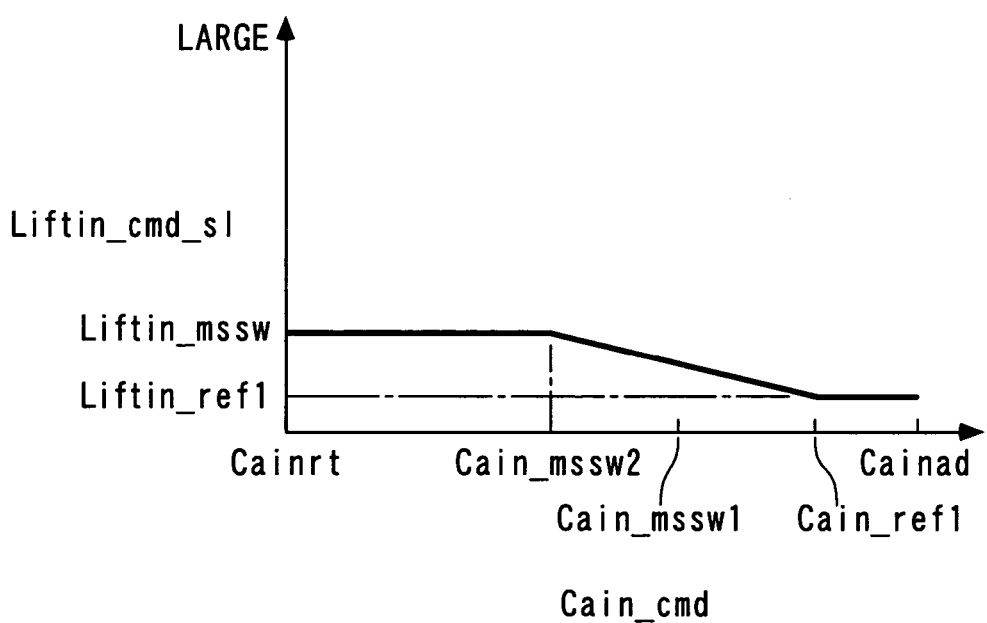
FIG. 41 is a diagram showing an example of a non-acceleration-time table for use in calculation of the slave value of the target valve lift.

On the other hand, if the answer to the question of the step 50 is negative (NO), i.e. if the engine 3 is in non-accelerating operation, the program proceeds to a step 52, wherein the slave value Liftin_cmd_sl of the target valve lift is calculated by searching a non-acceleration-time table shown in FIG. 41 according to the target cam phase Cain_cmd. It should be noted that also when the non-acceleration-time table is searched, the immediately preceding value Cain_cmd(k−1) of the target cam phase Cain_cmd is used as the target cam phase.

As shown in FIG. 41, in the non-acceleration-time table, the slave value Liftin_cmd_sl is set to the predetermined threshold value Liftin_mssw in a range where Cain_cmd<Cain_mssw2 holds, and in the range where Cain_cmd>Cain_ref1 holds, the slave value Liftin_cmd_sl is set to the predetermined value Liftin_ref1, while in a range where Cain_mssw2≦Cain_cmd≦Cain_ref1 holds, the slave value Liftin_cmd_sl is set to a smaller value as the value of the target cam phase Cain_cmd is closer to the most advanced value Cainad. This is for the same reason as the reason given in the above description of the FIG. 40 acceleration table.

Further, as is clear from comparison between the above non-acceleration-time table and the FIG. 40 acceleration-time table, the slave value Liftin_cmd_sl is set to a larger value in the acceleration-time table than in the non-acceleration-time table, in the range where Cain_mssw2≦Cain_cmd≦Cain_ref1 holds. This is because it is necessary to make the response of the engine torque control higher during the accelerating operation than during the non-accelerating operation, and hence when the control mode is the phase master mode, quicker transition to the lift master mode is to be performed with a view to enhancing the response of the intake air amount control.

In a step 53 following the step 51 or the step 52, it is determined whether or not the lift master flag F_MSLIFT is equal to 1. If the answer to this question is affirmative (YES), i.e. if the control mode is the lift master mode, the program proceeds to a step 54, wherein the master value Liftin_cmd_ms of the target valve lift is calculated with the algorithm for the lift master mode, expressed by the aforementioned equations (2) to (7) and (10) to (14).

On the other hand, if the answer to the question of the step 53 is negative (NO), i.e. if the control mode is the phase master mode, the program proceeds to a step 55, wherein the master value Liftin_cmd_ms of the target valve lift is calculated with the algorithm for the phase master mode, expressed by the aforementioned equations (2) to (7) and (15). This means that Liftin_cmd_ms is calculated as a value of 0.

In a step 56 following the step 54 or the step 55, the target valve lift Liftin_cmd is set to the sum (Liftin_cmd_ms+Liftin_cmd_sl) of the master value and the slave value thereof, followed by terminating the program.

Figure 42:
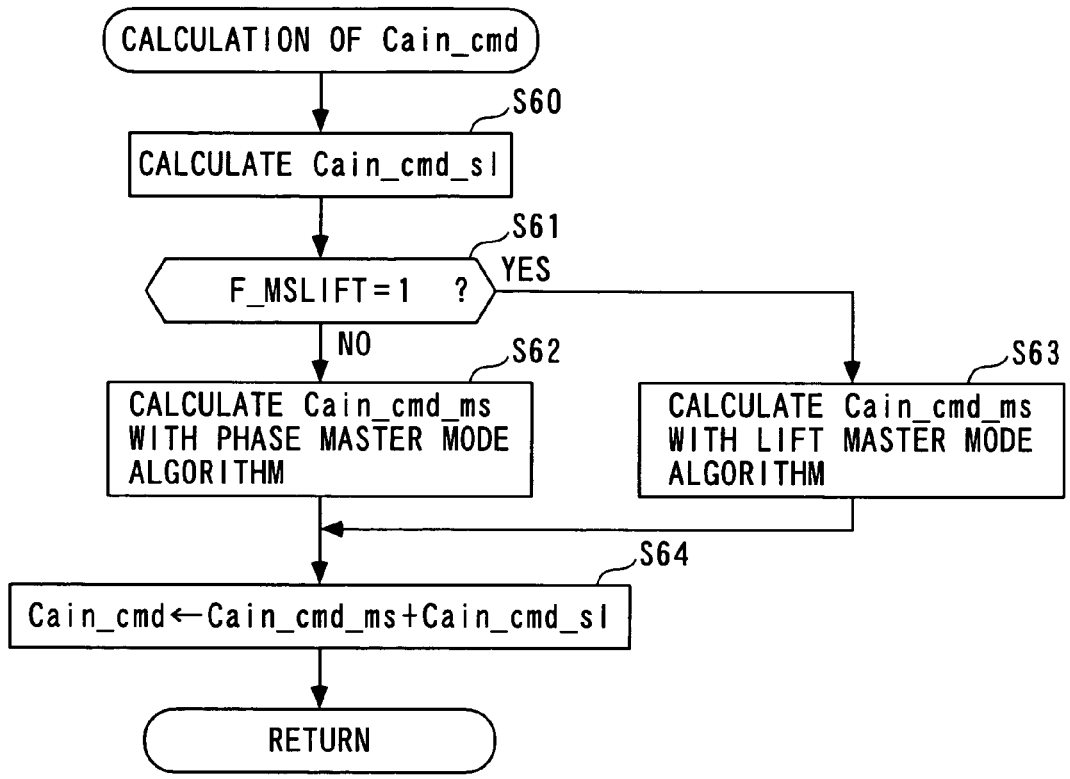
FIG. 42 is a flowchart showing details of a process for calculating a target cam phase.

Next, the process for calculating the aforementioned target cam phase Cain_cmd will be described with reference to FIG. 42. In a program for this process, first, in a step 60, the slave value Cain_cmd_sl of the target cam phase is calculated by searching a table shown in FIG. 43 according to the target valve lift Liftin_cmd. It should be noted that in searching this table, the immediately preceding value Liftin_cmd(k−1) of the target valve lift is used as the target valve lift Liftin_cmd.

Figure 43:
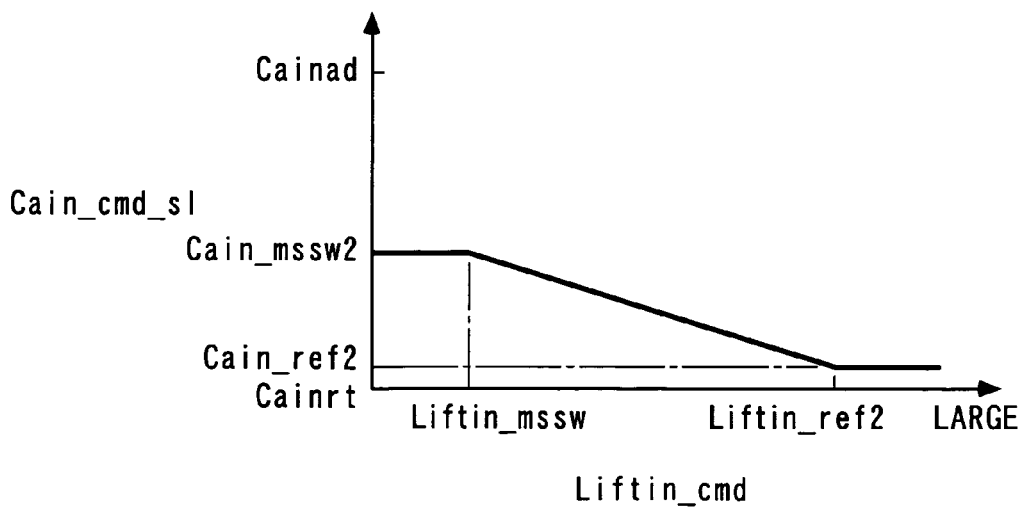
FIG. 43 is a diagram showing an example of a table for use in calculation of a slave value of the target cam phase.

Further, Liftin_ref2 in FIG. 43 is a predetermined value larger than the predetermined threshold value Liftin_mssw, and Cain_ref2 is a predetermined value set such that the relationship of Cainrt<Cain_ref2<Cain_mssw2 holds.

As shown in FIG. 43, in the above time table, the slave value Cain_cmd_sl is set to the predetermined value Cain_mssw2 in a range where Liftin_cmd≦Liftin_mssw holds, and in a range where Liftin_cmd≧Liftin_ref2 holds, the slave value Cain_cmd_sl is set the predetermined value Cain_ref2, while in a range where Liftin_mssw<Liftin_cmd<Liftin_ref2 holds, the slave value Cain_cmd_sl is set to a more retarded value as the value of the target valve lift Liftin_cmd is larger. This is because as described above, when Liftin_cmd>Liftin_mssw holds, the control mode is set to the lift master mode, so that the target cam phase Cain_cmd is set to a more retarded value as the value of the target valve lift Liftin_cmd is larger, i.e. as load on the engine 3 is larger, whereby the variable intake valve-actuating mechanism 40 is controlled such that the intake air amount is increased.

Then, the program proceeds to a step 61, wherein it is determined whether or not the lift master flag F_MSLIFT is equal to 1. If the answer to this question is negative (NO), i.e. if the control mode is the phase master mode, the program proceeds to a step 62, wherein the master value Cain_cmd_ms of the target cam phase is calculated with the algorithm for the phase master mode, expressed by the aforementioned equations (16) to (21) and (24) to (28).

On the other hand, if the answer to the question of the step 61 is affirmative (YES), i.e. if the control mode is the lift master mode, the program proceeds to a step 63, wherein the master value Cain_cmd_ms of the target cam phase is calculated with the algorithm for the lift master mode, expressed by the aforementioned equations (16) to (21) and (29). This means that the master value Cain_cmd_ms is set to a value of 0.

In a step 64 following the step 62 or the step 63, the target cam phase Cain_cmd is set to the sum (Cain_cmd_ms+Cain_cmd_sl) of the master value and the slave value thereof, followed by terminating the program.

Figure 44:
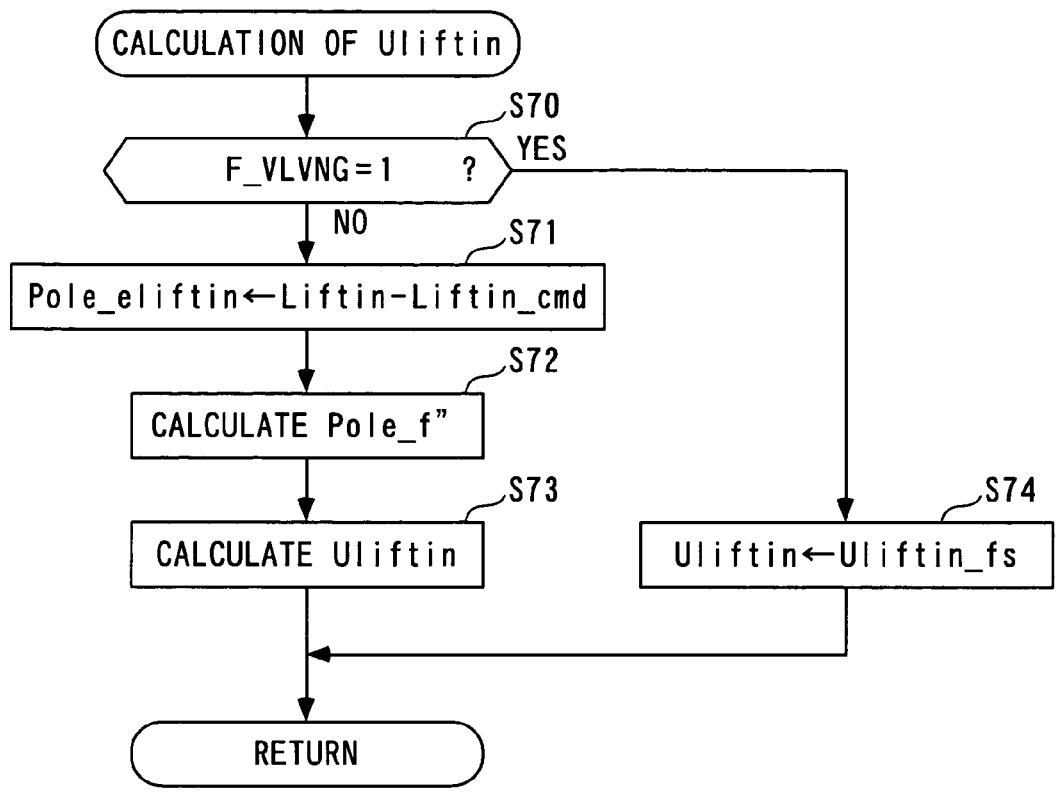
FIG. 44 is a flowchart showing details of a process for calculating a lift control input.

Next, a description will be given of the process for calculating the above-described lift control input Uliftin. Referring to FIG. 44, in a program for this process, first, it is determined in a step 70 whether or not the aforementioned intake valve-actuating mechanism failure flag F_VLVNG is equal to 1. If the answer to this question is negative (NO), i.e. if the variable intake valve-actuating mechanism 40 is normal, the program proceeds to a step 71, wherein a lift difference Pole_eliftin is set to the difference (Liftin−Liftin_cmd) between the valve lift and the target valve lift.

Figure 45:
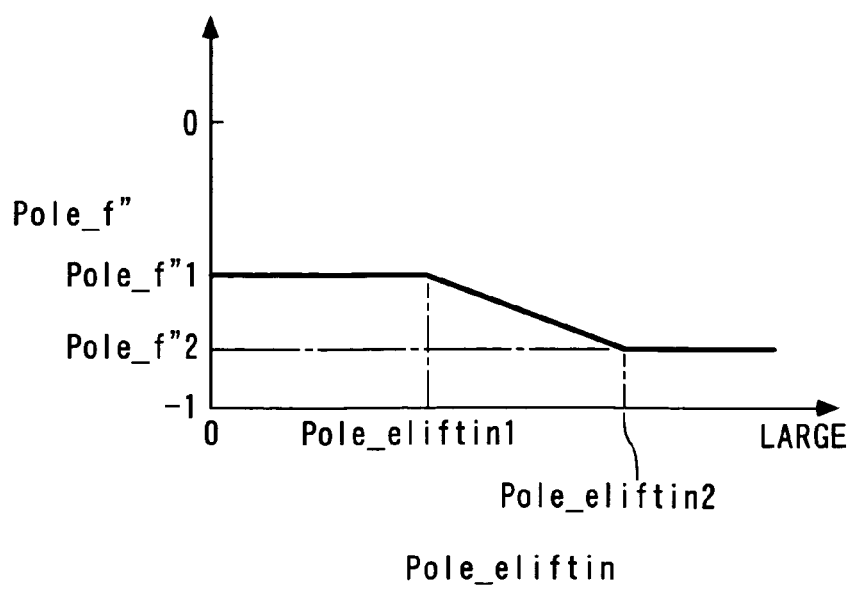
FIG. 45 is a diagram showing an example of a table for use in calculation of a target value filter-setting parameter in the process for calculating the lift control input.

Then, the program proceeds to a step 72, wherein the target value filter-setting parameter POLE_f" is calculated by searching a table shown in FIG. 45 according to the lift difference Pole_eliftin. In FIG. 45, Pole_f"1 and Pole_f"2 are predetermined values set to satisfy the relationship of −1<Pole_f"2<Pole_f"1<0, and Pole_eliftin1 and Pole_eliftin2 are predetermined values satisfying the relationship of Pole_eliftin1<Pole_eliftin2.

As shown in FIG. 45, in this table, the target value filter-setting parameter POLE_f" is set to the predetermined value Pole_f"1 in a range where Pole_eliftin<Pole_eliftin1 holds, and in a range where Pole_eliftin>Pole_eliftin2 holds, the target value filter-setting parameter POLE_f" is set to the predetermined value Pole_f"2, while in a range where Pole_eliftin1≦Pole_eliftin≦Pole_eliftin2 holds, the target value filter-setting parameter POLE_f" is set to a value closer to −1 as the lift difference Pole_eliftin is larger. This is due to the following reason:

As described hereinabove, the slave value Liftin_cmd_sl of the target valve lift is set to different values between during accelerating operation and during non-accelerating operation, by searching the respective two tables different from each other, so that when the operation of the engine 3 shifts between acceleration and non-acceleration, the target valve lift Liftin_cmd is sometimes changed drastically before and after the transition. In such a case, the valve lift Liftin, which is controlled to follow up the target valve lift Liftin_cmd, is also drastically changed to drastically change the intake air amount, resulting in occurrence of a torque step or the like. Therefore, to avoid the drastic or sudden change in the target valve lift Liftin_cmd, i.e. the valve lift Liftin, the target value filter-setting parameter POLE_f" is set to a value closer to −1 as the lift difference Pole_eliftin is larger, that is, as the degree of discrepancy between the valve lift Liftin and the target valve lift Liftin_cmd is larger. This makes it possible to avoid a sudden or drastic change in the filtered value Liftin_cmd_f of the target valve lift, thereby making it possible to avoid a sudden or drastic change in the valve lift Liftin.

Then, the program proceeds to a step 73, wherein the lift control input Uliftin is calculated with the control algorithm expressed by the aforementioned equations (34) to (46), followed by terminating the program.

On the other hand, if the answer to the question of the step 70 is affirmative (YES), i.e. if the variable intake valve-actuating mechanism 40 is faulty, the program proceeds to a step 74, wherein the lift control input Uliftin is set to a predetermined failure-time value Uliftin_fs, followed by terminating the program. The failure-time value Uliftin_fs is set to a value which can control the valve lift Liftin to a predetermined minute value (value enabling creep running e.g. in a vehicle with an automatic transmission).

Figure 46:
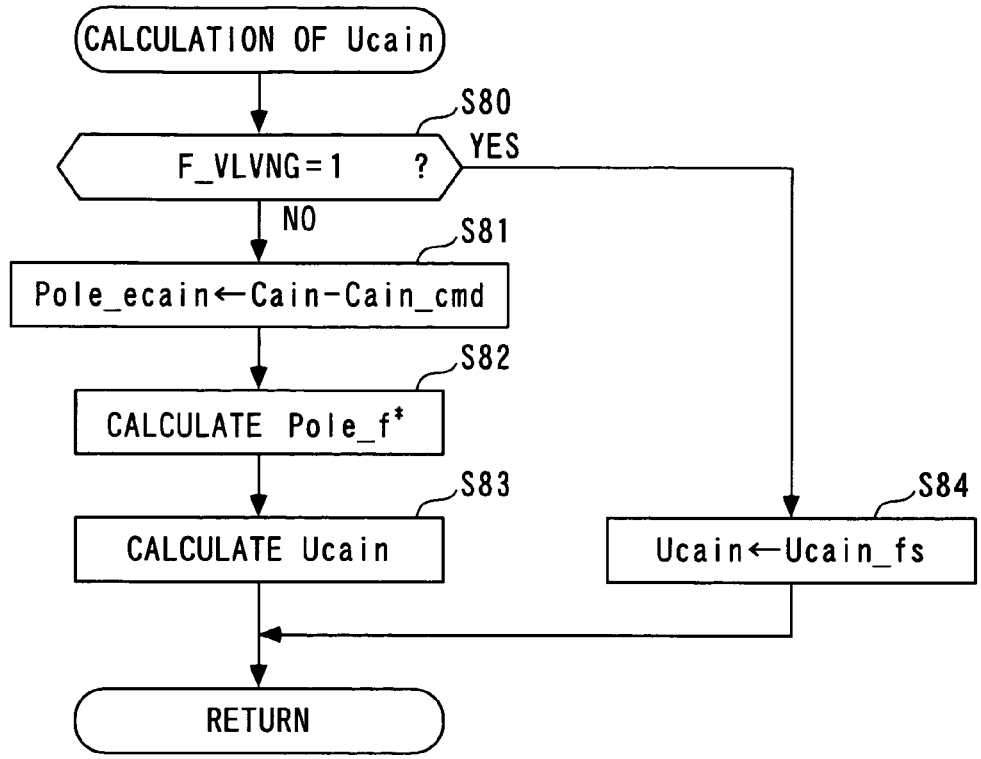
FIG. 46 is a flowchart showing details of a process for calculating a phase control input.

Next, a description will be given of the process for calculating the aforementioned phase control input Ucain. Referring to FIG. 46, in a program for this process, first, it is determined in a step 80 whether or not the aforementioned intake valve-actuating mechanism failure flag F_VLVNG is equal to 1. If the answer to this question is negative (NO), i.e. if the variable intake valve-actuating mechanism 40 is normal, the program proceeds to a step 81, wherein a phase difference Pole_ecain is set to the difference between the cam phase and the target cam phase (Cain−Cain_cmd).

Figure 47:
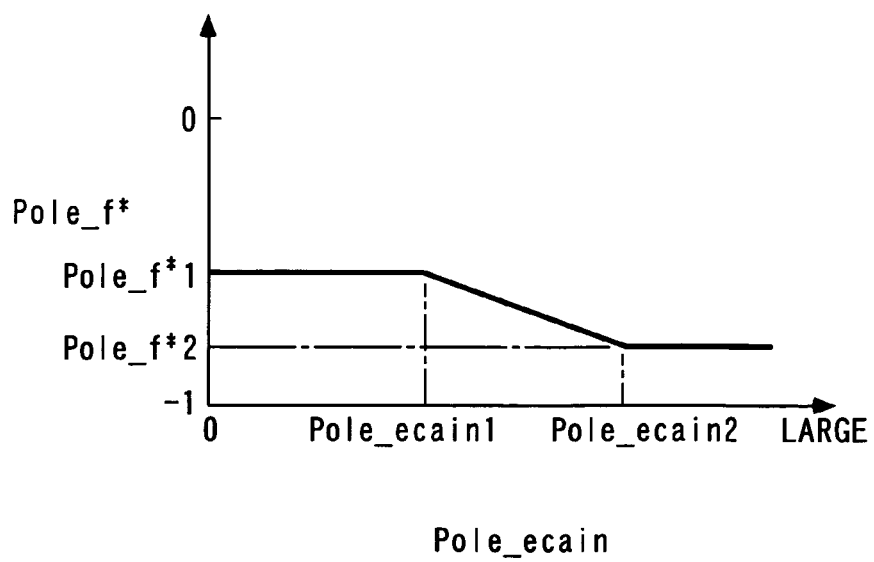
FIG. 47 is a diagram showing an example of a table for use in calculation of a target value filter-setting parameter in the process for calculating the phase control input.

Then, the program proceeds to a step 82, wherein the target value filter-setting parameter POLE_f* is calculated by searching a table shown in FIG. 47 according to the above phase difference Pole_ecain. In FIG. 47, Pole_f*1 and Pole_f*2 are predetermined values set to satisfy the relationship of −1<Pole_f*2<Pole_f*1<0, and Pole_ecain1 and Pole_ecain2 are predetermined values satisfying the relationship of Pole_ecain1<Pole_ecain2.

In this table, the target value filter-setting parameter POLE_f* is set to the predetermined value Pole_f*1 in a range where Pole_ecain<Pole_ecain1 holds, and in a range where Pole_ecain>Pole_ecain2 holds, the target value filter-setting parameter POLE_f* is set to the predetermined value Pole_f*2, while in a range where Pole_ecain1≦Pole_ecain≦Pole_ecain2 holds, the target value filter-setting parameter POLE_f* is set to a value closer to −1 as the phase difference Pole_ecain is larger. This is due to the following reason:

As described hereinabove, when the operation of the engine 3 shifts from the non-acceleration to the acceleration, the target valve lift Liftin_cmd is sometimes changed drastically before and after the transition. In such a case, since the slave value Cain_cmd_sl of the target cam phase is set according to the target valve lift Liftin_cmd, the target cam phase Cain_cmd is also changed drastically to drastically change the cam phase Cain as well, which is controlled to follow up the target cam phase Cain_cmd. This causes a sudden or drastic change in the intake air amount, which sometimes results in a torque step or the like. To avoid such an inconvenience, the target value filter-setting parameter POLE_f* is set to a value closer to −1 as the lift difference Pole_ecain is larger, that is, as the degree of discrepancy between the cam phase Cain and the target cam phase Cain_cmd is larger. As a result, when the operation of the engine 3 has shifted from the non-acceleration to the acceleration, it is possible to avoid a sudden or drastic change in the target cam phase Cain_cmd, thereby making it possible to avoid a sudden or drastic change in the cam phase Cain.

Then, the program proceeds to a step 83, wherein the phase control input Ucain is calculated with the control algorithm expressed by the aforementioned equations (51) to (63), followed by terminating the program.

On the other hand, if the answer to the question of the step 80 is affirmative (YES), i.e. if the variable intake valve-actuating mechanism 40 is faulty, the program proceeds to a step 84, wherein the phase control input Ucain is set to a predetermined failure-time value Ucain_fs, followed by terminating the program. The failure-time value Ucain_fs is set to a value which controls the cam phase Cain to a most retarded value Cainrt.

Figure 48:
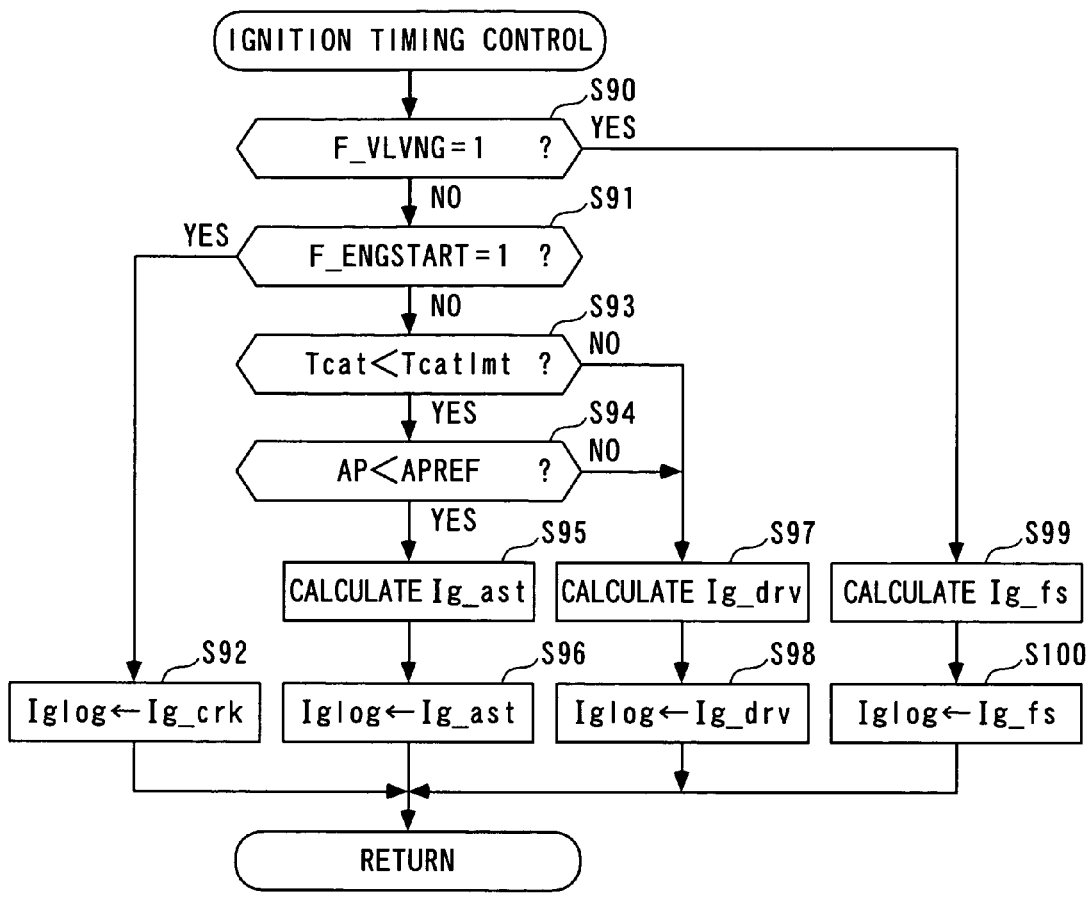
FIG. 48 is a flowchart showing details of an ignition timing control process.

Next, the above-mentioned ignition timing control process will be described with reference to FIG. 48. As shown in FIG. 48, in a program for this process, first, in a step 90, it is determined whether or not the intake valve-actuating mechanism failure flag F_VLVNG is equal to 1, as described above. If the answer to this question is negative (NO), i.e. if the variable intake valve-actuating mechanism 40 is normal, the program proceeds to a step 91, wherein it is determined whether or not an engine start flag F_ENGSTART is equal to 1.

If the answer to the above question is affirmative (YES), i.e. if the engine starting control is being executed, the program proceeds to a step 92, wherein the ignition timing Iglog is set to a predetermined start-time value Ig_crk (e.g. BTDC 10°), followed by terminating the program.

On the other hand, if the answer to the question of the step 91 is negative (NO), i.e. if the engine starting control is not being executed, the program proceeds to a step 93, wherein as described above, it is determined whether or not the execution time period Tcat of the catalyst warmup control is smaller than the aforementioned predetermined value Tcatlmt. If the answer to this question is affirmative (YES), i.e. if Tcat<Tcatlmt holds, the program proceeds to a step 94, wherein it is determined whether or not the accelerator pedal opening AP is smaller than the predetermined value APREF, as described above.

If the answer to this question is affirmative (YES), i.e. if the accelerator pedal is not stepped on, it is judged that the catalyst warmup control should be executed, so that the program proceeds to a step 95, wherein a catalyst warmup value Ig_ast is calculated. The catalyst warmup value Ig_ast is specifically calculated with a response-specifying control algorithm (a sliding mode control algorithm or a back stepping control algorithm) expressed by equations (64) to (66) shown in FIG. 49.

It should be noted that discrete data with a symbol (m) indicates that it is data sampled (or calculated) in synchronism with input of each TDC signal pulse. The symbol m indicates a position in the sequence of sampling cycles of respective discrete data. It should be noted that in the following description, the symbol (m) provided for the discrete data is omitted as deemed appropriate.

In the equation (64) in FIG. 49, ig_ast_base represents a predetermined catalyst warmup reference ignition timing (e.g. BTDC 5°), and $Krch^\#$ and $Kadp^\#$ represent feedback gains. Further, $\sigma^\#$ represents a switching function calculated by the equations (65) and (66). In the equation (65), $POLE^\#$ represents a response-specifying parameter set to satisfy the relationship of $-1<POLE^\#<0$, and Enast represents a follow-up error calculated by the equation (66). In the equation (66), NE_ast represents a predetermined catalyst warmup target engine speed (e.g. 1800 rpm). With the above-described control algorithm, the catalyst warmup value Ig_ast is calculated as a value for causing the engine speed NE to converge to the catalyst warmup target engine speed NE_ast.

Then, the program proceeds to a step 96, wherein the ignition timing Iglog is set to the above-described catalyst warmup value Ig_ast, followed by terminating the program.

On the other hand, if the answer to the question of the step 93 or the step 94 is negative (NO), i.e. if Tcat≧Tcatlmt holds, or if the accelerator pedal is stepped on, the program proceeds to a step 97, wherein a normal operation value Ig_drv is calculated by searching a map shown in FIG. 50 according to the accelerator pedal opening AP and the engine speed NE.

In this map, the normal operation value Ig_drv is set to a less advanced value, as the accelerator pedal opening AP is larger. This is to avoid knocking which is liable to occur when the engine 3 is in a high-load region. Moreover, the normal operation value Ig_drv is set to a more advanced value, as the engine speed NE is higher, in a low engine speed region, whereas in a high engine speed region, it is set to a less advanced value, as the engine speed NE is higher. This is to raise the temperature of combustion gases to thereby enhance combustion efficiency by setting ignition timing to a more advanced value, as the engine speed NE is higher, since knocking is not liable to occur in the low engine speed region. On the other hand, in the high engine speed region where knocking is liable to occur, the normal operation value Ig_drv is set as described above so as to avoid occurrence of knocking by setting the ignition timing to a less advanced value, as the engine speed NE is higher.

Then, the program proceeds to a step 98, wherein the ignition timing Iglog is set to the above-described normal operation value Ig_drv, followed by terminating the program.

On the other hand, if the answer to the question of the step 90 is affirmative (YES), i.e. if the variable intake valve-actuating mechanism 40 is faulty, the program proceeds to a step 99, wherein a failure-time value Ig_fs is calculated. The failure-time value Ig_fs is specifically calculated with a response-specifying control algorithm (a sliding mode control algorithm or a back stepping control algorithm) expressed by equations (67) to (69) shown in FIG. 49.

In the equation (67) in FIG. 49, ig_fs_base represents a predetermined failure-time reference ignition timing (e.g. TDC+0°), and $Krch^{\#\#\#}$ and $Kadp^{\#\#\#}$ represent feedback gains. Further, $\sigma^{\#\#\#}$ represents a switching function calculated by the equations (68) and (69). In the equation (68), $POLE^{\#\#}$ represents a response-specifying parameter set to satisfy the relationship of $-1<POLE^{\#\#}<0$, and Enfs represents a follow-up error calculated by the equation (69). In the equation (69), NE_fs represents a predetermined failure-time target engine speed (e.g. 2000 rpm). With the above-described control algorithm, the failure-time value Ig_fs is calculated as a value for causing the engine speed NE to converge to the failure-time target engine speed NE_fs.

Then, the program proceeds to a step 100, wherein the ignition timing Iglog is set to the above-described failure-time value Ig_fs, followed by terminating the program.

According to the intake air amount control system 1 configured as above, the target valve lift Liftin_cmd is compared with the predetermined threshold value Liftin_mssw, or the target cam phase Cain_cmd is compared with the threshold value Cain_mssw_lmt, whereby the lift master mode or the phase master mode is selected as the control mode for the intake air amount control. More specifically, when Liftin_cmd>Liftin_mssw holds, or when Cain_cmd≦Cain_mssw_lmt holds, that is, when the load on the engine 3 is within the predetermined high-load region, the lift master mode is selected, and otherwise, i.e. when the load on the engine 3 is within the predetermined low-load region, the phase master mode is selected.

In the lift master mode, the target valve lift Liftin_cmd is calculated as the sum of the master value Liftin_cmd_ms of the target valve lift, calculated with the algorithm for the lift master mode [the equations (2) to (7) and (10) to (14)], and the slave value Liftin_cmd_sl of the target valve lift, calculated by searching the associated table, whereby the actual intake air amount Gcyl is controlled such that it converges to the target intake air amount Gcyl_cmd. Furthermore, the master value Cain_cmd_ms of the target cam phase is set to a value of 0, and the slave value Cain_cmd_sl thereof is calculated by searching the associated table according to the target valve lift Liftin_cmd. As described above, if the lift master mode is selected because of the load on the engine 3 being within the predetermined low-load region, the valve lift control makes it possible to control the actual intake air amount Gcyl such that the actual intake air amount converges to the target intake air amount Gcyl_cmd. This makes it possible to reduce dead time in the intake air amount control, thereby enhancing the response of the intake air amount control. Moreover, since the target cam phase Cain_cmd, i.e. the slave value Cain_cmd_sl thereof is set according to the target valve lift Liftin_cmd, the cam phase Cain can be controlled such that it does not interact with the valve lift control. That is, in the high-load region requiring high responsiveness of the intake air amount control, it is possible to secure such high responsiveness, while avoiding interaction between the cam phase control and the valve lift control.

On the other hand, in the phase master mode, the target cam phase Cain_cmd is calculated as the sum of the master value Cain_cmd_ms of the target cam phase, calculated with the algorithm for the phase master mode [the equations (16) to (21) and (24) to (28)], and the slave value Cain_cmd_sl of the target cam phase, calculated by searching the associated table, whereby the actual intake air amount Gcyl is controlled such that it converges to the target intake air amount Gcyl_cmd. Furthermore, the master value Liftin_cmd_ms of the target valve lift is set to a value of 0, and the slave value Liftin_cmd_sl thereof is calculated by searching the associated table according to the target cam phase Cain_cmd. As described above, when the load on the engine 3 is within the predetermined low-load region, and the phase master mode is selected, the cam phase control makes it possible to control the actual intake air amount Gcyl such that it converges to the target intake air amount Gcyl_cmd. This makes it possible to finely control the intake air amount by a very small amount of change, thereby making it possible to enhance the accuracy of the control. Moreover, since the target valve lift Liftin_cmd, i.e. the slave value Liftin_cmd_sl thereof is set according to the target cam phase Cain_cmd, the valve lift Liftin can be controlled such that it does not interact with the cam phase control. That is, in the low-load region where high accuracy of the intake air amount control is required, it is possible to secure high control accuracy as described above, while avoiding interaction between the cam phase control and the valve lift control.

Further, in the tables illustrated in FIGS. 40 and 41, the relationship between the slave value Liftin_cmd_sl of the target valve lift and the target cam phase Cain_cmd is set such that the increasing and decreasing directions of the intake air amount determined by the slave value Liftin_cmd_sl of the target valve lift become equal to the respective increasing and decreasing directions of the intake air amount determined by the target cam phase Cain_cmd, and in the FIG. 43 table, the relationship between the slave value Cain_cmd_sl of the target cam phase and the target valve lift Liftin_cmd is set such that the increasing and decreasing directions of the intake air amount determined by the slave value Cain_cmd_sl of the target cam phase become equal to the respective increasing and decreasing directions of the intake air amount determined by the target valve lift Liftin_cmd. This makes it possible to more positively avoid interaction between the cam phase control and the valve lift control.

Furthermore, generally, as the valve-opening timing of the intake valve 4 becomes earlier, the internal EGR amount becomes larger to lower the combustion speed. In contract, in the tables in FIGS. 40 and 41, the slave value Liftin_cmd_sl of the target valve lift is set such that it becomes smaller as the value of the target cam phase Cain_cmd is more advanced, i.e. as the target cam phase Cain_cmd assumes a value that makes earlier the valve-opening timing of the intake valve 4, so that the valve lift Liftin is controlled to a smaller value as the valve-opening timing of the intake valve 4 is made earlier. This makes it possible to increase the fluidity of the mixture within the cylinders, thereby making it possible to compensate for the above-mentioned lowered combustion speed to thereby obtain stable combustion state of the engine 3. Moreover, when the valve-opening timing of the intake valve 4 is more advanced, the valve lift Liftin is controlled such that it is necessarily made smaller, and hence when the intake air amount control system 1 is applied to an engine configured such that the intake valve 4 and the exhaust valve 7 are brought into abutment with each other when they are simultaneously opened, it is possible to reliably avoid the abutment.

Further, the threshold value Cain_mssw_lmt compared with the target cam phase Cain_cmd is set to a smaller value during the accelerating operation of the engine 3 than during the non-accelerating operation thereof, and hence the relationship of Cain_cmd≦Cain_mssw_lmt is more readily satisfied, so that the control mode is quickly switched from the phase master mode to the lift master mode. This means that when the engine 3 is in accelerating operation and the load on the engine 3 is high, it is possible to quickly execute transition to the lift master mode, whereby it is possible to secure high responsiveness of the intake air amount control quickly and properly.

Furthermore, the slave value Liftin_cmd_sl of the target valve lift Liftin_cmd is set to a larger value during the accelerating operation of the engine 3 than during the non-accelerating operation of the engine 3, and hence the relationship of Liftin_cmd>Liftin_mssw is more readily satisfied, in the step 39, so that when the control mode is the lift master mode, a region where the control mode is held in the lift master mode is expanded. With this configuration, when the engine 3 is in accelerating operation and the load on the engine 3 is high, it is possible to expand a region for executing the lift master mode, whereby it is possible to secure high responsiveness of the intake air amount control quickly and properly. Further, for the same reason, in the step 60, the slave value Cain_cmd_sl of the target cam phase is set to a smaller value during the accelerating operation than during the non-accelerating operation, whereby in the step 34, the relationship of Cain_cmd≦Cain_mssw_lmt is more readily satisfied, so that as described above, the control mode is quickly switched from the phase master mode to the lift master mode.

Further, when the control mode of the intake air amount is the lift master mode, the master value Cain_cmd_ms of the target cam phase is set to a value of 0, and when the control mode is the phase master mode, the master value Liftin_cmd_ms of the target valve lift is set to a value of 0, so that e.g. when the control mode is switched from the phase master to the lift master mode, the master value Liftin_cmd_ms of the target valve lift assumed before the switching of the control mode is set to a value of 0, and hence a value of 0 is used as an initial value of the master value Liftin_cmd_ms of the target valve lift, whereby it is possible to avoid a sudden change in the target valve lift Liftin_cmd. Inversely, also when the control mode is switched from the lift master mode to the phase master mode, a value of 0 is used as an initial value of the master value Cain_cmd_ms of the target cam phase after the switching, whereby it is possible to avoid a sudden change in the target cam phase Cain_cmd. As described above, it is possible to avoid a sudden change in the state of control of the intake air amount, thereby making it possible to avoid occurrence of a torque step or the like.

Furthermore, since the two master values Liftin_cmd_ms and Cain_cmd_ms are both calculated with the aforementioned target value filter-type two-degree-of-freedom control algorithms, it is possible to properly set the convergence rate of the actual intake air amount Gcyl to the target intake air amount Gcyl_cmd with the target value filter algorithm, and properly set the convergence behavior of the actual intake air amount Gcyl to the target intake air amount Gcyl_cmd with sliding mode control algorithms.

Further, the calculation period, i.e. the control period $\Delta T1$ at which the target cam phase Cain_cmd and the target valve lift Liftin_cmd are calculated is set to the predetermined value which can properly reflect the dynamic characteristic of the intake air amount on the plant model [equations (8) and (22)], so that it is possible to accurately control a transitional change in the intake air amount by using the target cam phase Cain_cmd and the target valve lift Liftin_cmd. Further, the calculation period, i.e. the control period $\Delta T2$ at which the lift control input Uliftin and the phase control input Ucain are calculated is set to a value shorter than the calculation period $\Delta T1$ at which the target valve lift Liftin_cmd and the target cam phase Cain_cmd are calculated, and therefore the convergence rate at which the valve lift Liftin is caused to converge to the target valve lift Liftin_cmd by the valve lift controller 120, and the convergence rate at which the cam phase Cain is caused to converge to the target cam phase Cain_cmd by the cam phase controller 220 can be made higher than the convergence rate at which the actual intake air amount Gcyl is caused to converge to the target intake air amount Gcyl_cmd by the first and second ACTASS controllers 100 and 200, thereby making it possible to enhance the stability i.e. the controllability of the intake air amount control.

It should be noted that in the first and second ACTASS controllers 100 and 200, the respective master values Liftin_cmd_ms and Cain_cmd_ms of the target valve lift and the target cam phase may be calculated with simple target value filter-type two-degree-of-freedom sliding mode control algorithms expressed by equations (70) to (77) shown in FIG. 51, and equations (78) to (85) shown in FIG. 52 in place of the control algorithms expressed by the equations (2) to (7), (10) to (15), (16) to (21), and (24) to (29). It should be noted that Uadp in the equation (71) represents an adaptive law input calculated by the equation (73), and Kadp in the equation (73) represents a feedback gain. Similarly, Uadp' in the equation (79) represents an adaptive law input calculated by the equation (81), and Kadp' in the equation (81) represents a feedback gain.

In this case, when the control mode is the lift master mode, the master value Liftin_cmd_ms of the target valve lift is calculated by the equations (70) to (74), (76), and (77), whereas when the control mode is the phase master mode, it is calculated as a value of 0 by the equations (70) to (73), and (75) to (77). Further, when the control mode is the phase master mode, the master value Cain_cmd_ms of the target cam phase is calculated by the equations (78) to (82), (84), and (85), whereas when the control mode is the lift master mode, it is calculated as a value of 0 by the equations (78) to (81), and (83) to (85). When the simple target value filter-type two-degree-of-freedom sliding mode control algorithms expressed by the equations (70) to (77) and the equations (78) to (85) are used, there is no need to calculate the aforementioned disturbance estimates c1 and c1', which makes it possible to dispense with the adaptive disturbance observers 108 and 208, thereby making it possible to reduce computation load on the ECU 2.

Figure 53:
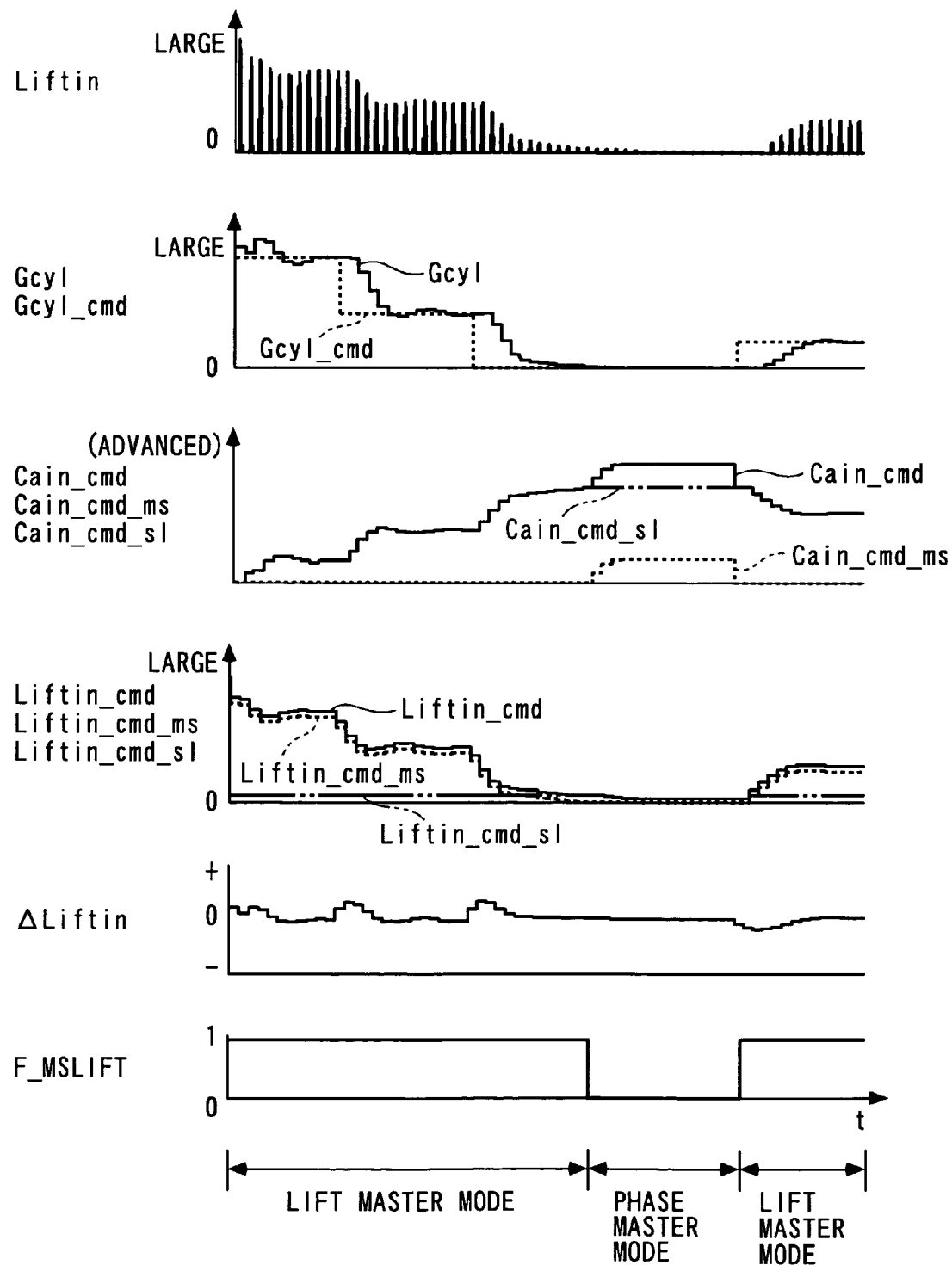
FIG. 53 is a timing diagram showing an example of control operations executed when the intake air amount is controlled by the variations of the control algorithms for the first and second ACTASS controllers, shown in FIGS. 51 and 52.

It is apparent from FIG. 53 that even when the simple target value filter-type two-degree-of-freedom sliding mode control algorithms expressed by the equations (70) to (77) and the equations (78) to (85) are used, it is possible to control the actual intake air amount Gcyl such that it is caused to follow up the target intake air amount Gcyl_cmd. It is understood that particularly when the target intake air amount Gcyl_cmd is set to a large value, i.e. when the load on the engine 3 is high, by selecting the lift master mode as the control mode, it is possible to enhance the follow-up property of the actual intake air amount Gcyl to a large change in the target intake air amount Gcyl_cmd.

On the other hand, it is understood that particularly when the target intake air amount Gcyl_cmd is set to a small value, i.e. when the load on the engine 3 is low, if the phase master mode is selected as the control mode, it is possible to control the amount $\Delta$Liftin [=Liftin(k)−Liftin (k−1)] of a change in the valve lift Liftin to a small value. This makes it possible to avoid adverse influence of variations between individual units of the variable valve lift mechanism 50 and aging thereof.

Although in the above-described embodiment, the algorithm which calculates the slave value Cain_cmd_sl of the target cam phase by searching the associated table according to the target valve lift Liftin_cmd is employed as the predetermined first control algorithm for controlling the cam phase Cain, by way of example, the predetermined first control algorithm is not necessarily limited to this, but it may be any suitable control algorithm for controlling the cam phase Cain so as to assist the valve lift control. For example, an algorithm may be used which calculates the slave value Cain_cmd_sl of the target cam phase by searching a map or a table according to parameters indicative of load on the engine, such as the engine speed NE and the accelerator pedal opening AP.

Further, although in the above-described embodiment, the algorithm for calculating the slave value Liftin_cmd_sl of the target valve lift by searching the associated table according to the target cam phase Cain_cmd is employed as the predetermined second control algorithm for controlling the valve lift Liftin, by way of example, the predetermined second control algorithm is not necessarily limited to this, but it may be any suitable control algorithm for controlling the valve lift Liftin so as to assist the cam phase control. For example, an algorithm which calculates the slave value Liftin_cmd_sl of the target valve lift by searching a map or a table according parameters indicative of load on the engine, such as the engine speed NE and the accelerator pedal opening AP, can be used.

Furthermore, although in the above-described embodiment, the target value filter-type two-degree-of-freedom control algorithms are employed as two-degree-of-freedom control algorithms, by way of example, the two-degree-of-freedom control algorithms are not necessarily limited to this, but they may be any suitable control algorithms containing feedback control algorithms. For example, feedback compensation-type two-degree-of-freedom control algorithms may be employed.

Further, although in the above-described embodiment, the target cam phase Cain_cmd and the target valve lift Liftin_cmd are employed as parameters indicative the states of control of the cam phase and the valve lift, respectively, this is not limitative, but the cam phase Cain and the valve lift Liftin may be employed in place of the target cam phase Cain_cmd and the target valve lift Liftin_cmd. More specifically, the slave value Liftin_cmd_sl of the target valve lift may be calculated by searching an associated table in which values of the slave value Liftin_cmd_sl are set according to the cam phase Cain, in place of the tables shown in FIGS. 40 and 41, and the slave value Cain_cmd_sl of the target cam phase may be calculated by searching an associated table in which values of the slave value Cain_cmd_sl are set according to the valve lift Liftin, in place of the FIG. 43 table. Furthermore, the slave values Liftin_cmd_sl and Cain_cmd_sl may be calculated by searching an associated table configured according to one of the parameters of the engine speed NE, the accelerator pedal opening AP, the target intake air amount Gcyl_cmd, and the actual intake air amount Gcyl, or a map configured according to two of the parameters.

Furthermore, although in the above-described embodiment, the engine speed NE and the accelerator pedal opening AP (or the target intake air amount Gcyl_cmd) are employed as the load parameter and the first load parameter, by way of example, the load parameter and the first load parameter are not necessarily limited to this, but they may be any suitable parameters indicative of load on the engine 3. For example, the actual intake air amount Gcyl and the like may be used as the load parameter and the first load parameter.

Further, although in the above-described embodiment, the target valve lift Liftin_cmd and the target cam phase Cain_cmd are employed as the second load parameter, by way of example, the second load parameters are not necessarily limited to this, but they may be any suitable parameters indicative of load on the engine 3. For example, the valve lift Liftin and the cam phase Cain may be used as the second load parameters, and further the engine speed NE, the accelerator pedal opening AP, the target intake air amount Gcyl_cmd, and the actual intake air amount Gcyl may be used.

Further, when the determination in the step 34 is performed, the cam phase Cain and the predetermined value Cain_mssw_lmt may be compared with each other, and when the determination in the step 39 is performed, the valve lift Liftin and the predetermined threshold value Liftin_mssw may be compared with each other.

Further, the method of determining whether or not the engine 3 is in the accelerating state is by no means limited to the example employed in the above-described embodiment, in which the difference Δgcyl_cmd is compared with the predetermined value Gcyl_acc (step 31). It may be any suitable method capable of determining whether or not the engine 3 is in acceleration. For example, in the step 31 in the above-described embodiment, the difference between the current value and the immediately preceding value of the actual intake air amount Gcyl may be compared with a predetermined value.

Further, to the control algorithms for the first and second ACTASS controllers 100 and 200, the state predictor and the onboard identifier may be added similarly to the valve lift controller 120 and the cam phase controller 220. Further, a parameter scheduler or the like may be added.

Furthermore, although in the above-described embodiment, the valve lift mechanism capable of steplessly (continuously) changing the valve lift is employed as the variable valve lift mechanism, by way of example, the variable valve lift mechanism is not necessarily limited to this, but it may be any suitable valve lift mechanism which is capable of changing the valve lift. For example, a valve lift mechanism capable of changing the valve lift in a plurality of steps may be employed as the variable valve lift mechanism.

Further, although in the above-described embodiment, the cam phase mechanism capable of steplessly (continuously) changing the cam phase is employed as the variable cam phase mechanism, by way of example, the variable cam phase mechanism is not necessarily limited to this, but it may be any suitable valve lift mechanism which is capable of changing the cam phase. For example, a cam phase mechanism capable of changing the cam phase in a plurality of steps may be employed as the variable cam phase mechanism.

INDUSTRIAL APPLICABILITY

The intake air amount control system according to the present invention can be applied not only to the internal combustion engine for automotive vehicles as in the above-described embodiment but also to internal combustion engines for various kinds of industrial machines, such as those installed on boats and so forth.

The invention claimed is:

1. An intake air amount control system for an internal combustion engine, which variably controls a cam phase of an intake cam shaft for opening and closing an intake valve, relative to a crankshaft by a variable cam phase mechanism, and variably controls a valve lift of the intake valve by a variable valve lift mechanism, to thereby control an amount of intake air drawn into a cylinder of the engine, comprising:

target intake air amount-setting means for setting a target intake air amount to which the amount of intake air is to be controlled, according to a load parameter indicative of load on the engine;

intake air amount-detecting means for detecting the amount of intake air;

first control value-calculating means for calculating a first control value for use in feedback controlling one of the cam phase and the valve lift to converge toward one of a corresponding target cam phase and a target valve lift such that the detected intake air amount converges to the target intake air amount, wherein a rate at which one of the cam phase and the valve lift is controlled to converge toward one of the corresponding target cam phase and the target valve lift is higher than a rate at which the detected intake air amount is caused to converge to the target intake air amount; and second control value-calculating means for calculating a second control value for use in controlling the other of the cam phase and the valve lift based on the first control value calculated by said first control value-calculating means.

2. An intake air amount control system as claimed in claim 1, wherein the first control value includes a feedback control value for causing the intake air amount to converge to the target intake air amount, and wherein said first control value-calculating means calculates the feedback control value with a two-degree-of-freedom control algorithm.

3. An intake air amount control system as claimed in claim 1 or 2, further comprising control input-calculating means for calculating a control input to one of the variable cam phase mechanism and the variable valve lift mechanism according to the first control value, and calculating a control input to the other of the variable cam phase mechanism and the variable valve lift mechanism according to the second control value, and wherein a calculation period at which said first control value-calculating means and said second control value-calculating means calculate is set to be longer than a calculation period at which said control input-calculating means calculates.

4. An intake air amount control system for an internal combustion engine, which variably controls a cam phase of an intake cam shaft for opening and closing an intake valve, relative to a crankshaft by a variable cam phase mechanism, and variably controls a valve lift of the intake valve by a variable valve lift mechanism, to thereby control an amount of intake air drawn into a cylinder of the engine, comprising:

target intake air amount-setting means for setting a target intake air amount to which the amount of intake air is to be controlled, according to a first load parameter indicative of load on the engine;

intake air amount-detecting means for detecting the amount of intake air;

first control means for controlling the valve lift such that the detected intake air amount converges to the target intake air amount, and controlling the cam phase with a predetermined first control algorithm so as to assist the valve lift control;

second control means for controlling the cam phase such that the detected intake air amount converges to the target intake air amount, and controlling the valve lift with a predetermined second control algorithm so as to assist the cam phase control; and control selection means for selecting one of said first control means and said second control means according to a second load parameter indicative of load on the engine, and causing control to be executed by the selected one of said first control means and said second control means.

5. An intake air amount control system as claimed in claim 4, wherein the predetermined first control algorithm for said first control means is an algorithm which controls the cam phase according to a state of control of the valve lift, and wherein the predetermined second control algorithm for said second control means is an algorithm which controls the valve lift according to a state of control of the cam phase.

6. An intake air amount control system as claimed in claim 4 or 5, wherein said control selection means selects said second control means when the load on the engine indicated by the second load parameter is in a predetermined first load region, and selects said first control means when the load on the engine indicated by the second load parameter is in a predetermined second load region higher than the predetermined first load region.

7. An intake air amount control system as claimed in claim 6, wherein said control selection means comprises:

acceleration determining means for determining whether or not the engine is in an accelerating state;

load region-determining means for determining that the load on the engine is in the predetermined second load region when the second load parameter is smaller than a predetermined threshold value, while determining that the load on the engine is in the predetermined first load region when the second load parameter is not smaller than the predetermined threshold value; and threshold value-setting means for setting the predetermined threshold value to a larger value when the engine is determined to be in the accelerating state by said acceleration determining means, than otherwise.

8. An intake air amount control system as claimed in claim 6, wherein said control selection means comprises:

acceleration determining means for determining whether or not the engine is in an accelerating state;

second load parameter-setting means for setting the second load parameter to a larger value when the engine is determined to be in the accelerating state by said acceleration determining means, than otherwise; and load region-determining means for determining that the load on the engine is in the predetermined first load region when the set second load parameter is not larger than a predetermined threshold value, while determining that the load on the engine is in the predetermined second load region when the second load parameter is larger than the predetermined threshold value.

9. An intake air amount control system as claimed in claim 4 or 5, wherein each of said first control means and said second control means comprises:

cam phase control value-calculating means for calculating a cam phase control value for use in controlling said cam phase; and valve lift control value-calculating means for calculating a valve lift control value for use in controlling said valve lift, wherein said cam phase control value-calculating means calculates the cam phase control value as a sum of a cam phase feedback control value for causing the intake air amount to converge to the target intake air amount, and a cam phase-setting value set according to the valve lift control value, wherein said valve lift control value-calculating means calculates the valve lift control value as a sum of a valve lift feedback control value for causing the intake air amount to converge to the target intake air amount, and a valve lift-setting value set according to the cam phase control value, wherein said cam phase control value-calculating means of said first control means sets the cam phase feedback control value to a value of 0 when said first control means is selected by said control selection means, and wherein said valve lift control value-calculating means of said second control means sets the valve lift feedback control value to a value of 0 when said second control means is selected by said control selection means.

10. An intake air amount control system as claimed in claim 9, wherein said cam phase control value-calculating means calculates the cam phase feedback control value with a two-degree-of-freedom control algorithm, and wherein said valve lift control value-calculating means calculates the valve lift feedback control value with a two-degree-of-freedom control algorithm.

11. An intake air amount control system as claimed in claim 9, wherein said cam phase control value-calculating means sets the cam phase-setting value to such a value as makes earlier the valve-opening timing of the intake valve as the valve lift control value is such a value as makes the valve lift smaller, and wherein said valve lift control value-calculating means sets the valve lift-setting value to such a value as makes the valve lift smaller as the cam phase control value is such a value as makes earlier the valve-opening timing of the intake valve.

12. An intake air amount control system as claimed in claim 9, further comprising control input-calculating means for calculating a control input to said variable cam phase mechanism according to the cam phase control value, and calculating a control input to said variable valve lift mechanism according to the valve lift control value, and wherein a calculation period at which said cam phase control value-calculating means and said valve lift control value-calculating means calculate is set to be longer than a calculation period at which said control input-calculating means calculates.

* * * * *